US010686922B2

(12) United States Patent
Hoellwarth

(10) Patent No.: US 10,686,922 B2
(45) Date of Patent: *Jun. 16, 2020

(54) HEAD-MOUNTED DISPLAY APPARATUS FOR RETAINING A PORTABLE ELECTRONIC DEVICE WITH DISPLAY

(71) Applicant: Apple Inc., Cupertino, CA (US)

(72) Inventor: Quin C. Hoellwarth, Eagle, ID (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,320

(22) Filed: Jun. 3, 2019

(65) Prior Publication Data

US 2019/0289107 A1    Sep. 19, 2019

Related U.S. Application Data

(60) Continuation of application No. 16/418,906, filed on May 21, 2019, now Pat. No. 10,530,915, which is a
(Continued)

(51) Int. Cl.
*H04M 1/05* (2006.01)
*G06F 3/01* (2006.01)
(Continued)

(52) U.S. Cl.
CPC .............. *H04M 1/05* (2013.01); *A45F 5/00* (2013.01); *G02B 27/0093* (2013.01);
(Continued)

(58) Field of Classification Search
CPC .. H04M 1/05; H04M 1/0266; H04M 1/72569; H04W 4/80; A45F 5/00;
(Continued)

(56) References Cited

U.S. PATENT DOCUMENTS 4,575,722 A    3/1986  Anderson
4,757,714 A    7/1988  Purdy et al.
(Continued)

FOREIGN PATENT DOCUMENTS

DE    10047237 A1    7/2002
DE    10103922 A1    7/2002
(Continued)

OTHER PUBLICATIONS

Gausemier et al., "A solution elements based cooperative assembly system for mechatronic virtual prototyping" Computer Supported Cooperative Work in Design 2004. Proceedings. The 8th International Conference on, vol. 2, pp. 487-491 vol. 2, 2004.
(Continued)

*Primary Examiner* — Stephen G Sherman
(74) *Attorney, Agent, or Firm* — Joseph F. Guihan

(57) ABSTRACT

Head-mounted display systems and methods of operation that allow users to couple and decouple a portable electronic device such as a handheld portable electronic device with a separate head-mounted device (e.g., temporarily integrates the separate devices into a single unit) are disclosed. The portable electronic may be physically coupled to the head-mounted device such that the portable electronic device can be worn on the user's head. The portable electronic device may be operatively coupled to the head-mounted device such that the portable electronic device and head mounted device can communicate and operate with one another. Each device may be allowed to extend its features and/or services to the other device for the purpose of enhancing, increasing and/or eliminating redundant functions between the head-mounted device and the portable electronic device.

20 Claims, 25 Drawing Sheets

Related U.S. Application Data continuation of application No. 16/213,728, filed on Dec. 7, 2018, now Pat. No. 10,530,914, which is a continuation of application No. 15/819,593, filed on Nov. 21, 2017, now Pat. No. 10,306,038, which is a continuation of application No. 15/814,195, filed on Nov. 15, 2017, now Pat. No. 10,306,037, which is a continuation of application No. 15/684,754, filed on Aug. 23, 2017, now Pat. No. 10,306,036, which is a continuation of application No. 15/451,230, filed on Mar. 6, 2017, now Pat. No. 9,749,451, which is a continuation of application No. 15/274,901, filed on Sep. 23, 2016, now Pat. No. 9,646,574, which is a continuation of application No. 15/246,340, filed on Aug. 24, 2016, now Pat. No. 9,646,573, which is a continuation of application No. 15/215,122, filed on Jul. 20, 2016, now Pat. No. 9,595,237, which is a continuation of application No. 14/862,036, filed on Sep. 22, 2015, now Pat. No. 9,429,759, which is a division of application No. 14/604,059, filed on Jan. 23, 2015, now Pat. No. 9,482,869, which is a continuation of application No. 12/242,911, filed on Sep. 30, 2008, now Pat. No. 8,957,835.

(51) Int. Cl.
| | | |
|---|---|---|
| *G02B 27/01* | (2006.01) | |
| *G06F 3/041* | (2006.01) | |
| *G02B 27/00* | (2006.01) | |
| *H04M 1/02* | (2006.01) | |
| *H04M 1/725* | (2006.01) | |
| *G02B 27/02* | (2006.01) | |
| *G06F 3/0362* | (2013.01) | |
| *G06T 19/00* | (2011.01) | |
| *H04B 1/3827* | (2015.01) | |
| *H04N 5/225* | (2006.01) | |
| *G09G 5/00* | (2006.01) | |
| *G09G 5/14* | (2006.01) | |
| *G09G 5/391* | (2006.01) | |
| *G06F 3/16* | (2006.01) | |
| *G09G 5/377* | (2006.01) | |
| *H04W 4/80* | (2018.01) | |
| *A45F 5/00* | (2006.01) | |
| *G06F 1/16* | (2006.01) | |

(52) U.S. Cl.
CPC ....... *G02B 27/017* (2013.01); *G02B 27/0172* (2013.01); *G02B 27/0176* (2013.01); *G02B 27/022* (2013.01); *G02B 27/028* (2013.01); *G06F 1/163* (2013.01); *G06F 1/1632* (2013.01); *G06F 3/012* (2013.01); *G06F 3/013* (2013.01); *G06F 3/0362* (2013.01); *G06F 3/041* (2013.01); *G06F 3/0412* (2013.01); *G06F 3/16* (2013.01); *G06T 19/006* (2013.01); *G09G 5/005* (2013.01); *G09G 5/14* (2013.01); *G09G 5/377* (2013.01); *G09G 5/391* (2013.01); *H04B 1/385* (2013.01); *H04M 1/0266* (2013.01); *H04M 1/72569* (2013.01); *H04N 5/2252* (2013.01); *H04W 4/80* (2018.02); *G02B 2027/014* (2013.01); *G02B 2027/0132* (2013.01); *G02B 2027/0156* (2013.01); *G02B 2027/0169* (2013.01); *G02B 2027/0178* (2013.01); *G09G 2320/10* (2013.01); *G09G 2340/0407* (2013.01); *H04B 2001/3866* (2013.01)

(58) Field of Classification Search
CPC .............. G02B 27/0093; G02B 27/017; G02B 27/0172; G02B 27/0176; G02B 27/022; G02B 27/028; G02B 2027/0132; G02B 2027/014; G02B 2027/0156; G02B 2027/0169; G02B 2027/0178; G06F 1/163; G06F 1/1632; G06F 3/012; G06F 3/013; G06F 3/0362; G06F 3/041; G06F 3/0412; G06F 3/16; G06T 19/006; G09G 5/005; G09G 5/14; G09G 5/377; G09G 5/391; G09G 2320/10; G09G 2340/0407; H04B 1/385; H04B 2001/3866; H04N 5/2252
USPC .......................................................... 345/8
See application file for complete search history.

(56) References Cited

U.S. PATENT DOCUMENTS

| | | |
|---|---|---|
| 5,003,300 A | 3/1991 | Wells |
| 5,451,976 A | 9/1995 | Ito |
| 5,632,742 A | 5/1997 | Frey et al. |
| 5,696,521 A | 12/1997 | Robinson |
| 5,905,450 A | 5/1999 | Kim et al. |
| 6,046,712 A | 4/2000 | Beller et al. |
| 6,101,038 A | 8/2000 | Hebert et al. |
| 6,320,559 B1 | 11/2001 | Yasukawa et al. |
| 6,323,846 B1 | 11/2001 | Westerman et al. |
| 6,392,798 B1 | 5/2002 | Newkirk |
| 6,421,031 B1 | 7/2002 | Ronzani et al. |
| 6,450,639 B1 | 9/2002 | Abraham |
| 6,480,174 B1 | 11/2002 | Kaufmann et al. |
| 6,611,653 B1 | 8/2003 | Kim et al. |
| 6,717,737 B1 | 4/2004 | Haglund |
| 6,734,834 B1 | 5/2004 | Baram |
| 6,760,772 B2 | 7/2004 | Zou et al. |
| 6,911,172 B2 | 6/2005 | Swab et al. |
| 6,916,096 B2 | 7/2005 | Eberl et al. |
| 6,971,072 B1 | 11/2005 | Stein |
| 7,059,728 B2 | 6/2006 | Alasaarella et al. |
| 7,145,726 B2 | 12/2006 | Geist |
| 7,199,934 B2 | 4/2007 | Yamasaki |
| 7,245,273 B2 | 7/2007 | Eberl et al. |
| 7,313,246 B2 | 12/2007 | Miller et al. |
| 7,487,118 B2 | 2/2009 | Crutchfield, Jr. et al. |
| 7,494,216 B2 | 2/2009 | Jannard et al. |
| 7,500,747 B2 | 3/2009 | Howell et al. |
| 7,528,977 B2 | 5/2009 | Hull et al. |
| 7,530,019 B2 | 5/2009 | Kjeldsen et al. |
| 7,532,381 B2 | 5/2009 | Miles |
| 7,542,012 B2 | 6/2009 | Kato et al. |
| 7,593,757 B2 | 9/2009 | Yamasaki |
| 7,595,933 B2 | 9/2009 | Tang |
| 7,631,968 B1 | 12/2009 | Dobson et al. |
| 7,675,683 B2 | 3/2010 | Dobson et al. |
| 7,676,403 B2 | 3/2010 | Crutchfield, Jr. et al. |
| 7,792,552 B2 | 9/2010 | Thomas et al. |
| 7,806,525 B2 | 10/2010 | Howell et al. |
| 8,109,629 B2 | 2/2012 | Howell et al. |
| 8,301,285 B2 | 10/2012 | Zhang et al. |
| 8,312,660 B1 | 11/2012 | Fujisaki |
| 8,386,958 B1 | 2/2013 | Zavitaev |
| 8,430,310 B1 | 4/2013 | Ho et al. |
| 8,434,863 B2 | 5/2013 | Howell et al. |
| 8,465,151 B2 | 6/2013 | Howell et al. |
| 8,584,388 B1 | 11/2013 | Fujisaki |
| 8,605,008 B1 | 12/2013 | Prest et al. |
| 8,676,273 B1 | 3/2014 | Fujisaki |
| 8,814,691 B2 | 8/2014 | Haddick et al. |
| 8,950,902 B2 | 2/2015 | Nichol et al. |
| 8,957,835 B2 | 2/2015 | Hollewarth |
| 9,024,845 B2 | 5/2015 | Kim et al. |
| 9,094,816 B2 | 7/2015 | Maier et al. |
| 9,204,245 B2 | 12/2015 | Holman et al. |
| 9,341,843 B2 | 5/2016 | Border et al. |
| 9,370,704 B2 | 6/2016 | Marty |
| 9,429,759 B2 | 8/2016 | Hoellwarth |

(56) References Cited

U.S. PATENT DOCUMENTS

| | | |
|---|---|---|
| 9,443,415 B2 | 9/2016 | Nepo |
| 9,482,869 B2 | 11/2016 | Hoellwarth |
| 9,529,200 B2 | 12/2016 | Thurber et al. |
| 9,575,319 B2 | 2/2017 | Thurber et al. |
| 9,575,321 B2 | 2/2017 | Osterhout et al. |
| 9,581,816 B2 | 2/2017 | Wengrovitz et al. |
| 9,595,237 B2 | 3/2017 | Hollewarth |
| 9,635,534 B2 | 4/2017 | Maier et al. |
| 9,645,395 B2 | 5/2017 | Bolas et al. |
| 9,646,573 B2 | 5/2017 | Hoellwarth |
| 9,646,574 B2 | 5/2017 | Hoellwarth |
| 9,690,119 B2 | 6/2017 | Garofolo et al. |
| D792,400 S | 7/2017 | Osterhout |
| 9,696,546 B2 | 7/2017 | Nutaro |
| 9,749,451 B2 | 8/2017 | Hoellwarth |
| 9,766,463 B2 | 9/2017 | Border et al. |
| 9,820,658 B2 | 11/2017 | Tran |
| 9,829,711 B2 | 11/2017 | Thurber et al. |
| 9,934,366 B1 | 4/2018 | Zanuzoski |
| 10,062,182 B2 | 8/2018 | Haddick et al. |
| 10,121,247 B2 | 11/2018 | Meier et al. |
| 10,152,141 B1 | 12/2018 | Lohse et al. |
| 2002/0082879 A1 | 6/2002 | Miller et al. |
| 2002/0101568 A1 | 8/2002 | Eberl et al. |
| 2002/0140633 A1 | 10/2002 | Rafii et al. |
| 2002/0151283 A1 | 10/2002 | Pallakoff |
| 2002/0186180 A1 | 12/2002 | Duda |
| 2002/0196202 A1 | 12/2002 | Bastian et al. |
| 2003/0001823 A1 | 1/2003 | Oya et al. |
| 2003/0020950 A1 | 1/2003 | Hunter |
| 2003/0032449 A1 | 2/2003 | Giobbi |
| 2003/0062675 A1 | 4/2003 | Moro et al. |
| 2003/0142081 A1 | 7/2003 | Iizuka et al. |
| 2004/0027312 A1 | 2/2004 | Owada et al. |
| 2004/0056870 A1 | 3/2004 | Shimoyama et al. |
| 2004/0113867 A1 | 6/2004 | Tomine et al. |
| 2004/0130504 A1 | 7/2004 | Ebersole |
| 2005/0096096 A1 | 5/2005 | Birli et al. |
| 2005/0206583 A1 | 9/2005 | Lemelson et al. |
| 2005/0248717 A1 | 11/2005 | Howell et al. |
| 2005/0264752 A1 | 12/2005 | Howell et al. |
| 2005/0278750 A1 | 12/2005 | Grossman et al. |
| 2006/0017657 A1 | 1/2006 | Yamasaki |
| 2006/0052146 A1 | 3/2006 | Ou |
| 2006/0061544 A1 | 3/2006 | Min et al. |
| 2006/0061555 A1 | 3/2006 | Mullen |
| 2006/0098087 A1 | 5/2006 | Brandt et al. |
| 2006/0119539 A1 | 6/2006 | Kato et al. |
| 2006/0119576 A1 | 6/2006 | Richardson et al. |
| 2006/0197750 A1 | 9/2006 | Kerr et al. |
| 2007/0069976 A1 | 3/2007 | Willins et al. |
| 2007/0097108 A1 | 5/2007 | Brewer |
| 2007/0162853 A1 | 7/2007 | Weber et al. |
| 2007/0176786 A1 | 8/2007 | Yamamoto |
| 2007/0195012 A1 | 8/2007 | Ichikawa et al. |
| 2007/0201737 A1 | 8/2007 | Cai |
| 2007/0237491 A1 | 10/2007 | Kraft |
| 2007/0243863 A1 | 10/2007 | Hong et al. |
| 2007/0268316 A1 | 11/2007 | Kajita et al. |
| 2007/0296646 A1 | 12/2007 | Yamamoto et al. |
| 2008/0002964 A1 | 1/2008 | Edwards |
| 2008/0088529 A1 | 4/2008 | Tang |
| 2008/0088936 A1 | 4/2008 | Tang et al. |
| 2008/0088937 A1 | 4/2008 | Tang |
| 2008/0157991 A1 | 7/2008 | Raghunath et al. |
| 2008/0180537 A1 | 7/2008 | Weinberg et al. |
| 2008/0249895 A1 | 10/2008 | Mariotti |
| 2008/0255889 A1 | 10/2008 | Geisler et al. |
| 2008/0276178 A1 | 11/2008 | Fadell et al. |
| 2008/0276196 A1 | 11/2008 | Tang |
| 2009/0033588 A1 | 2/2009 | Kajita et al. |
| 2009/0102746 A1 | 4/2009 | Fischer et al. |
| 2009/0128448 A1 | 5/2009 | Riechel |
| 2009/0245681 A1 | 10/2009 | Kobayashi |
| 2009/0280910 A1 | 11/2009 | Gagner et al. |
| 2010/0171680 A1 | 7/2010 | Lapidot et al. |
| 2010/0261526 A1 | 10/2010 | Anderson et al. |
| 2010/0331721 A1 | 12/2010 | Eply |
| 2011/0090135 A1 | 4/2011 | Tricoukes |
| 2011/0227487 A1 | 9/2011 | Nichol et al. |
| 2012/0046776 A1 | 2/2012 | Zhang et al. |
| 2013/0250618 A1 | 9/2013 | Nichol et al. |
| 2015/0198811 A1 | 7/2015 | Hoellwarth |
| 2016/0350906 A1 | 12/2016 | Meier et al. |
| 2017/0193182 A1 | 7/2017 | Mihai |
| 2018/0097920 A1 | 4/2018 | Hoellwarth et al. |

FOREIGN PATENT DOCUMENTS

| | | |
|---|---|---|
| JP | 4679700 B2 | 2/2002 |
| WO | 2002031577 A1 | 4/2002 |
| WO | 2002031578 A1 | 4/2002 |
| WO | 2002033472 A2 | 4/2002 |
| WO | 2006086699 A2 | 8/2006 |

OTHER PUBLICATIONS

Ogi et al., "Invisible interface for the immersive virtual world" Immersive Projection Technology and Virtual Environments 2001. Springer, Vienna, 2001. 237-246.

Henrysson et al., "Face to Face Collaborative AR on Mobile Phones" Mixed and Augmented Reality, 2005. Proceedings. Fourth IEEE and ACM International Symposium on. IEEE, 2005. <https://ir.canterbury.ac.nz/bitstream/handle/10092/2339/12602118_2005-ISMAR-ARMobilePhones.pdf;sequence=1>.

Billinghurst et al., "Wearable Devices: New Ways to Manage Information" Computer 32.1 (1999): 57-64. <https://s3.amazonaws.com/academia.edu.documents/42448318/published-1999-32-1.pdf?AWSAccessKeyId=AKIAIWOWYYGZ2Y53UL3A&Expires=1505430351&Signature=bAvZJO26Nj2EgKS2NHbUJ1BRoDI%3D&response-content-disposition=inline%3B%20filename%3DWearable_devices_new_ways_to_manage_info.pdf>.

Vallino, "Interactive Augmented Reality" Diss. University of Rochester. Dept. of Computer Science, 1998. <https://www.researchgate.net/profile/James_Vallino/publication/48304573_Interactive_Augmented_Reality/links/550d8e190cf2ac2905a7dfb9.pdf>.

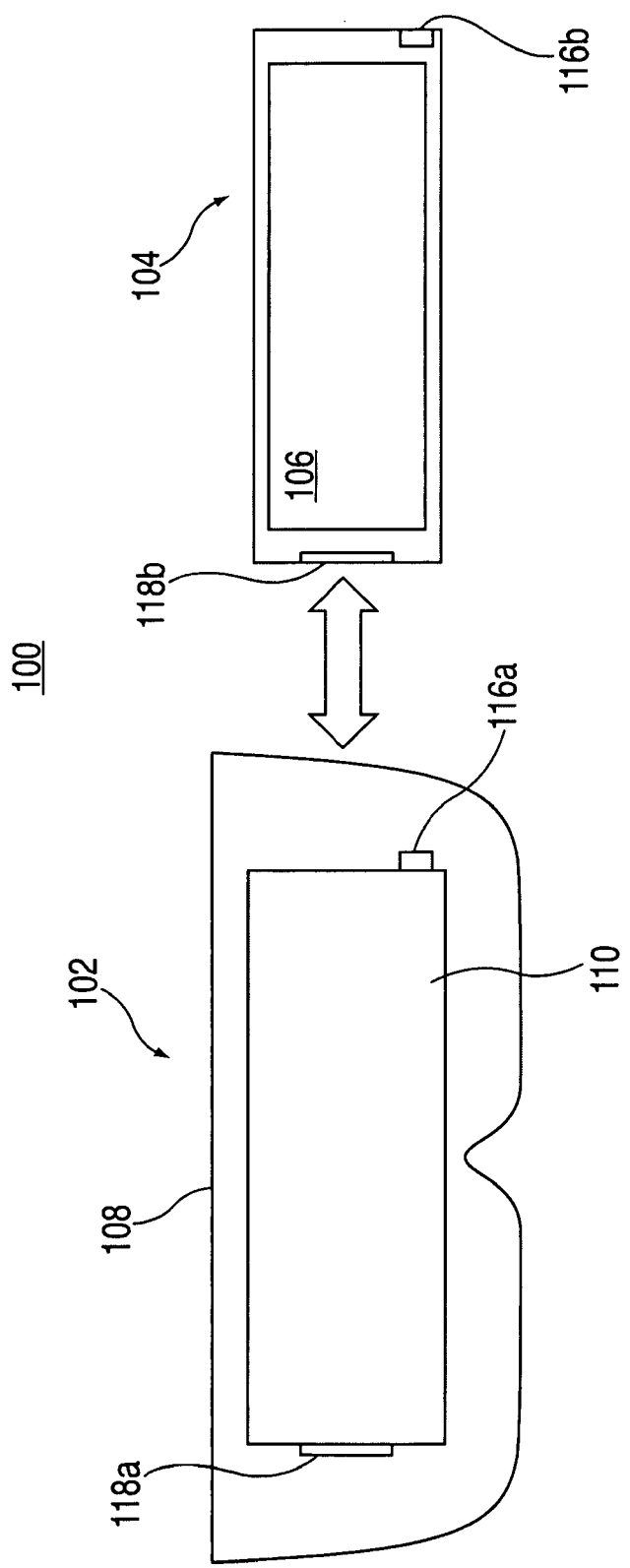

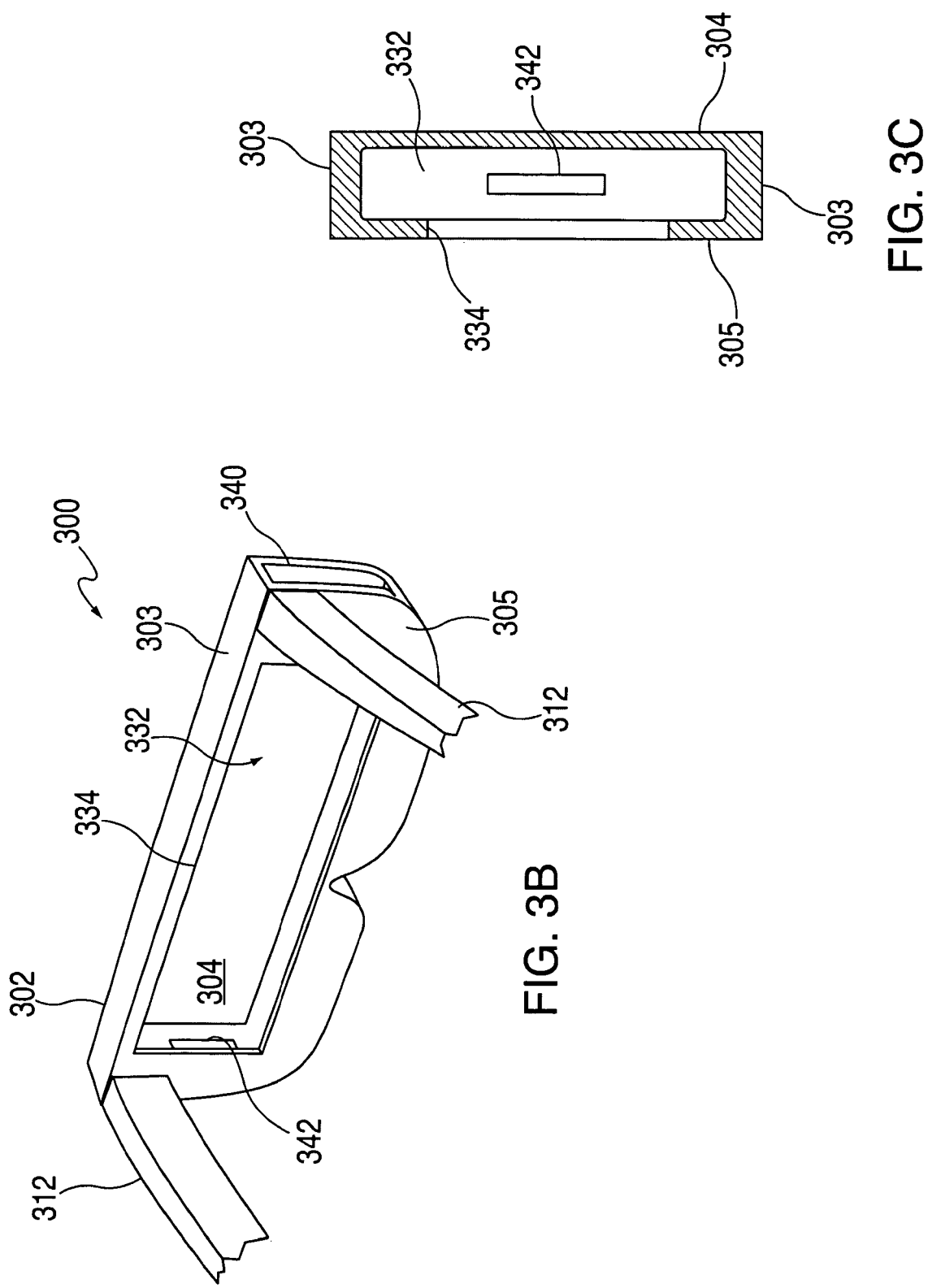

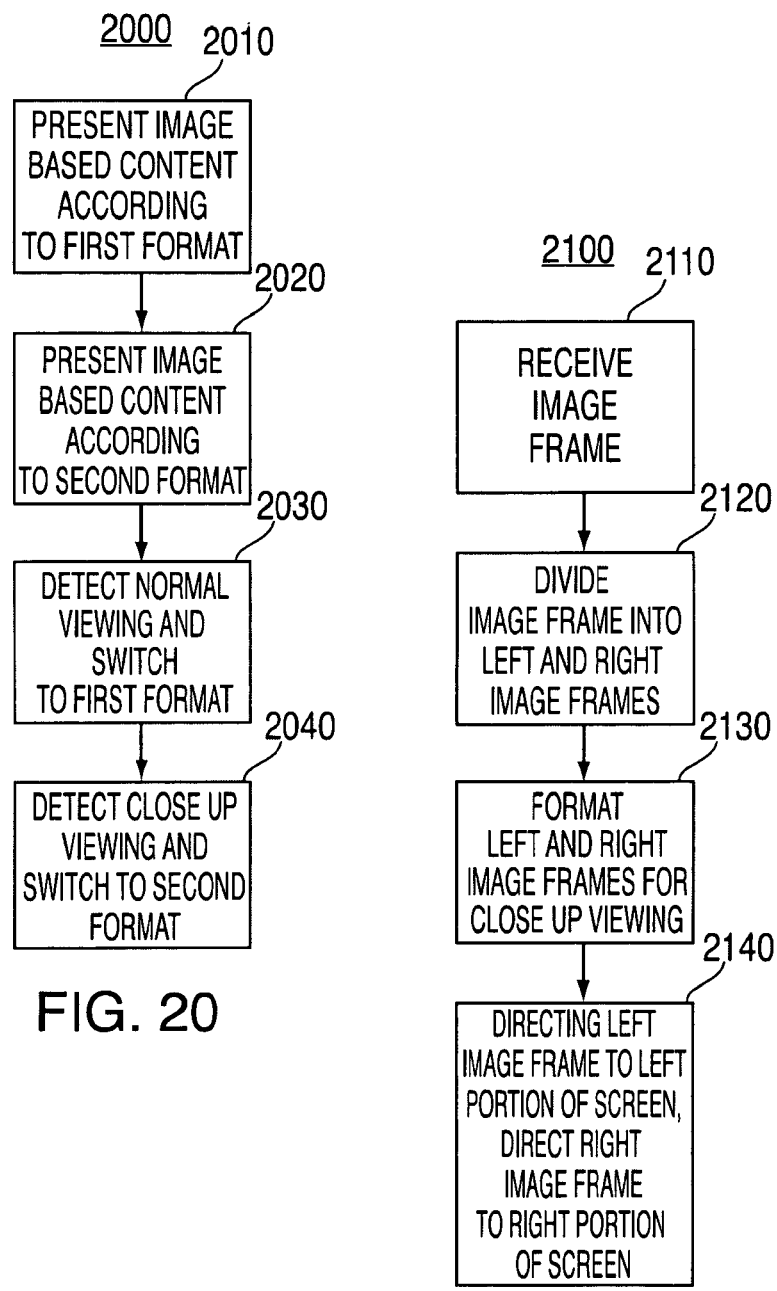

HEAD-MOUNTED DISPLAY APPARATUS FOR RETAINING A PORTABLE ELECTRONIC DEVICE WITH DISPLAY

This application is a continuation of patent application Ser. No. 16/418,906, filed May 21, 2019, which is a continuation of patent application Ser. No. 16/213,728, filed Dec. 7, 2018, which is a continuation of patent application Ser. No. 15/819,593, filed Nov. 21, 2017, which is a continuation of patent application Ser. No. 15/814,195, filed Nov. 15, 2017, which is a continuation of patent application Ser. No. 15/684,754, filed Aug. 23, 2017, which is a continuation of patent application Ser. No. 15/451,230, filed Mar. 6, 2017, which is a continuation of patent application Ser. No. 15/274,901, filed Sep. 23, 2016, which is a continuation of patent application Ser. No. 15/246,340, filed Aug. 24, 2016, which is a continuation of patent application Ser. No. 15/215,122, filed Jul. 20, 2016, which is a continuation of patent application Ser. No. 14/862,036, filed Sep. 22, 2015, which is a division of patent application Ser. No. 14/604,059, filed Jan. 23, 2015, which is a continuation of patent application Ser. No. 12/242,911, filed Sep. 30, 2008, which are hereby incorporated by reference herein in their entireties. This application claims the benefit of and claims priority to patent application Ser. No. 16/418,906, filed May 21, 2019, patent application Ser. No. 16/213,728, filed Dec. 7, 2018, patent application Ser. No. 15/819,593, filed Nov. 21, 2017, patent application Ser. No. 15/814,195, filed Nov. 15, 2017, patent application Ser. No. 15/684,754, filed Aug. 23, 2017, patent application Ser. No. 15/451,230, filed Mar. 6, 2017, patent application Ser. No. 15/274,901, filed Sep. 23, 2016, patent application Ser. No. 15/246,340, filed Aug. 24, 2016, patent application Ser. No. 15/215,122, filed Jul. 20, 2016, patent application Ser. No. 14/862,036, filed Sep. 22, 2015, patent application Ser. No. 14/604,059, filed Jan. 23, 2015, and patent application Ser. No. 12/242,911, filed Sep. 30, 2008.

BACKGROUND OF THE INVENTION

This invention is directed to a head-mounted device constructed to receive a portable electronic device having a screen.

Using head-mounted devices, a user may view media provided by a portable electronic device. For example, a user may couple a personal electronic device, such as the iPod™ available from Apple Inc. of Cupertino, Calif., or the iPhone™ also available from Apple Inc. of Cupertino, Calif., to the head-mounted device via a cable or wire. Such a configuration can allow the user to view media on a private display, while the media is provided by a personal handheld device.

Sometimes, however, a wired connection may be inconvenient and cumbersome for the user in certain situations (e.g., the user must separately hold multiple devices and deal with cables).

In addition to being unwieldy, the coupled system often utilizes redundant features, which are not necessary when using the devices together. By way of example, each device utilizes a display screen, which adds cost, size, weight, and complexity to the entire system.

Accordingly, there is a need for an improved head-mounted display system, particularly a system that temporarily integrates or merges both mechanically and electronically a head-mounted device with a portable electronic device.

SUMMARY OF THE INVENTION

In accordance with the invention, a head-mounted display system and method of operation are provided in which the system can allow users to couple and decouple a portable electronic device with a head-mounted device. The portable electronic device may for example be physically and/or operatively coupled and decoupled with the head-mounted device. In some embodiments, the two devices may be considered temporarily integrated.

In accordance with one embodiment of the invention, there is provided a head-mounted device that is worn on a user's head. The head-mounted device may include a frame that is configured to physically receive and carry a portable electronic device. The frame may place a display screen of the portable electronic device in front of the user's eyes. The display screen of the portable electronic device may act as the primary display screen of the head-mounted device such that the display screen of the portable electronic device is primarily used to view image based content when the head-mounted display device is worn on the user's head.

In accordance with another embodiment of the invention, there is provided a method of controlling a portable electronic device having a screen capable of presenting image based content, wherein the portable electronic device presents the image based content in a normal viewing mode that substantially fills the screen during normal use of the portable electronic device. The method may include detecting a connection with a head-mounted device that is capable of being worn on a user's head, wherein the connection indicates that the portable electronic device is operatively coupled and physically carried by the head-mounted device. The method may also include switching to a head-mounted mode on the screen of the portable electronic device.

In accordance with yet another embodiment of the invention, there is provided a method for displaying image based content on a head-mounted device. The method may include coupling a portable electronic device to the head-mounted device such that a screen of the portable electronic device faces a user. The method may also include providing an instruction to play back image based content stored on the portable electronic device, wherein the image based content is displayed on the screen of the portable electronic device. The method may also include adjusting the image based content displayed on the screen for close up viewing.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 1 shows a simplified diagram of a head-mounted display system in accordance with embodiments of the invention;

FIGS. 3A-3C show perspective views of a head-mounted device in accordance with embodiments of the invention;

FIG. 20 shows a process for displaying images on a screen of a portable electronic device in accordance with embodiments of the invention; and FIG. 21 shows a process for displaying one or more image frames on a screen of a portable electronic device coupled to a head-mounted display apparatus in accordance with embodiments of the invention.

DETAILED DESCRIPTION OF THE INVENTION

Figure 2A:
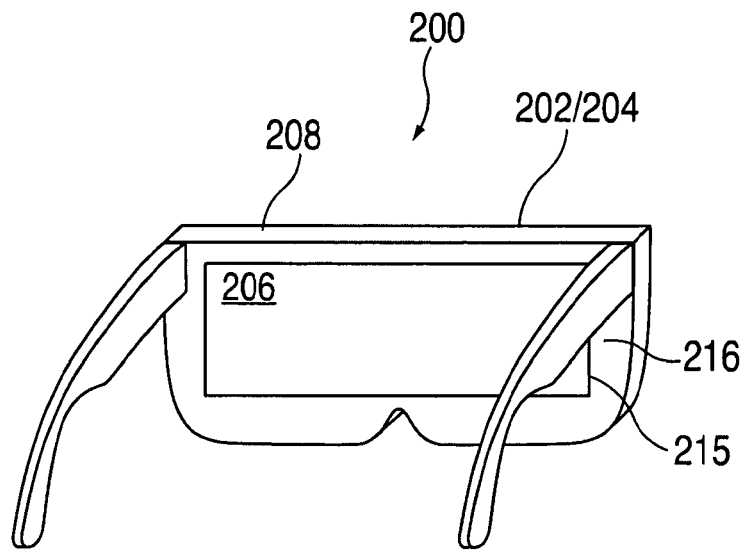
FIGS. 2A and 2B show simplified schematic diagrams of a head-mounted display system in accordance with embodiments of the invention.

This invention generally pertains to head-mounted display systems and methods of operation that allow users to couple and decouple a portable electronic device such as a handheld portable electronic device with a separate head-mounted device (e.g., temporarily integrates the separate devices into a single unit). The head-mountable device may be configured to be worn on a user's head. The portable electronic device, on the other hand, may be configured to provide specific features/applications for use by a user. Examples of portable electronic devices include media devices, personal digital assistants ("PDAs"), telephones, and the like.

One aspect of the invention relates to physically coupling (e.g., mechanically) the portable electronic device to the head-mounted device such that the portable electronic device can be worn on the user's head. In some embodiments, the head-mounted device may include a support structure that supports, secures, and carries the portable electronic device (e.g., physically integrated as a single unit). The support structure may also help place a display of the portable electronic device relative to a user's eyes when the integrated system is worn on the user's head. In one example, the support structure helps define a docking area for receiving and retaining the portable electronic device.

Another aspect of the invention relates to operatively coupling (e.g., electronically) the portable electronic device to the head-mounted device such that the portable electronic device and head mounted device can communicate and operate with one another. The head mounted device may include, for example, interface mechanisms that enable communication and operatibility between the portable electronic device and the head-mounted device. The interface mechanisms may, for example, include electrical mechanisms such as connectors or chips that provide wired or wireless communications. In some embodiments, the head-mounted device may include a connector that receives a corresponding connector of the portable electronic device. The connector may, for example, be located within a docking area of the head mounted device such that the portable electronic device operatively connects when the portable electronic device is placed within the docking area. The interface mechanisms may also include optical interface mechanisms, such as lenses, etc., that provide optical communications for proper viewing of a display of the portable electronic device.

Another aspect of the invention relates to allowing each device to extend its features and/or services to the other device for the purpose of enhancing, increasing and/or eliminating redundant functions between the head-mounted device and the portable electronic device physically and/or operatively coupled thereto. In some embodiments, the head mounted device utilizes components of the portable electronic device while in other embodiments, the portable electronic device utilizes components of the head mounted device. In one example, the head-mounted device utilizes the display of the portable electronic device as the primary display for displaying media (e.g., image based content). That is, the head-mounted device does not include a main viewing display screen and instead utilizes the screen of the portable electronic device to act as the main or primary display when the portable electronic device is coupled thereto.

Embodiments of the invention are discussed below with reference to FIGS. 1-21. However, those skilled in the art will readily appreciate that the detailed description given herein with respect to these figures is for explanatory purposes, as the invention extends beyond these limited embodiments.

FIG. 1 shows a simplified diagram of a head-mounted display system 100, in accordance with one embodiment of the present invention. The head-mounted display system 100 can include head-mounted device 102 and portable electronic device 104 that are separate devices which can be temporarily coupled together to form an integrated unit, which can be worn on a user's head.

Portable electronic device 104 may be widely varied. For example, portable electronic device 104 may be configured to provide specific features and/or applications for use by a user. Portable electronic device 104 may be a light weight and small form factor device so that it can easily be supported on a user's head. In most embodiments, the portable electronic device includes a display 106 for viewing image based content.

In one embodiment of the present invention, portable electronic device 104 may be a handheld electronic device such as a portable media player, cellular telephone, internet-capable device, a personal digital assistant ("PDA"), any other portable electronic device, or any combination thereof. In another embodiment of the present invention, portable electronic device 104 can be a device that has the combined functionalities of a portable media player and a cellular telephone, such as an iPhone™ sold by Apple Inc. of Cupertino, Calif. In yet another embodiment of the present invention, the portable electronic device 104 can be a dedicated media player such as an iPod™ sold by Apple Inc. of Cupertino, Calif. Examples of iPods™ may include Touch™, Nano™, Classic™, and the like.

Head-mounted device 102 may be configured to be worn on a user's head. The head-mounted device 102 may be configured to receive and carry portable electronic device 104 in order to create head-mounted display system 100. In some embodiments, head-mounted device 102 may include a frame or carrier 108 that supports and holds the portable electronic device 104 thereby allowing portable electronic device 104 to be worn on a user's head (e.g., glasses/goggles form factor). As should be appreciated, because portable electronic device 104 can be carried by head-mounted device 102, the user can relax while viewing image based content on the head-mounted device because he does not have to hold onto the portable electronic device.

The frame or carrier 108 may for example be configured to be situated in front of a user's face. As a result, screen 106 of the portable electronic device 104 may be oriented towards the user's eyes when head-mounted display system 100 (the head-mounted device 102 including the portable electronic device 104) is worn on the user's head. In one embodiment, the head-mounted device 102 may not include a main viewing display but may rather rely on screen 106 as the primary display and/or the only display of system 100. A primary display may be the primary component used for displaying image based content (e.g., media such as movies, TV shows, and graphical user interfaces associated with various software applications) when the system is worn on the user's head. By using such a configuration, head-mounted display system 100 may reduce redundancies, which can add cost, weight and complexity to the system.

The frame or carrier 108 may define or include a docking area 110 for receiving and retaining the portable electronic device 104. The docking area 110 may be widely varied. The docking area 110 define an area into which a portion or the entire portable electronic device 104 may be placed. The docking area 110 may also include one or more retention features for holding and securing the portable electronic device within the docking area. The docking area may be defined by walls that surround some portion of the portable electronic device (e.g., exterior surfaces). The retention features may for example include rails, channels, snaps, detents, latches, catches, magnets, friction couplings, doors, locks, flexures, and the like.

In one embodiment, the system 100 may include a detection mechanism 116a and/or 116b that provides inputs to the portable electronic device when it is carried by the head mounted device so that the portable electronic device is configured for head-mounted use. By way of example, the detection mechanism 116 may be an electrical connection, a sensor such as a proximity sensor or infrared ("IR") detector and/or the like. In one example, once the portable electronic device is placed relative to the head mounted device, the portable electronic device goes into a head mounted mode (i.e., configures the display screen for HMD viewing).

The head-mounted display system 100 can include a communication interface that provides data and/or power communications between the portable electronic device 104 and the head-mounted device 102. The communication interface may be wired or wireless. In some embodiments, the head mounted device 102 may include a connector 118a that mates with a corresponding connector 118b of the portable electronic device when the portable electronic device is placed within the docking area 110.

The protocol under which the devices 102 and 104 communicate via the communication interface may be widely varied. By way of example, the communication protocol may be a master/slave communication protocol, server/client communication protocol, peer/peer communication protocol, and the like. Using a master/slave communication protocol, one of the devices is a master and the other is a slave. The master controls the slave. Using a client/server communication protocol, a server program responds to requests from a client program. The server program may operate on the portable electronic device or the head mounted device. Using a peer to peer communication protocol either of the two devices can initiate a communication session.

Generally, the communication session begins when the two devices are coupled together and powered up. In some cases, the devices may go immediately into a HMD mode when connected. For example, based on a default settings, the portable electronic device may be configured for close up head mounted viewing (either directly or via instructions from the head mounted device 102). Further, input devices, output devices, sensors, and other electrical systems on both devices may be activated or deactivated based on the default settings. Alternatively, the user may be prompted with a control menu for setting up the system when they are operatively coupled together via the communication interface 107.

Head-mounted display system 100 can include a variety of features, which can be provided by one or both devices of the system when they are connected and in communications with one another. For example, each device may include one or more of the following components: processors, display screen, controls (e.g., buttons, switches, touch pads, and/or screens), camera, receiver, antenna, microphone, speaker, batteries, optical subassembly, sensors, memory, communication systems, input/output ("I/O") systems, connectivity systems, cooling systems, connectors, and/or the like. If activated, these components may be configured to work together or separately depending on the needs of the system. In some cases, features may be turned off entirely if not needed by the system.

In some embodiments, the head-mounted device 102 may provide additional features for the head-mounted display system 100. In one example, the head-mounted device 102 can provide additional functionality to the portable electronic device 104. For instance, the head-mounted device 102 may include buttons, switches, dials, touch devices, or any other suitable controls. These controls may match or mimic the controls found on the portable electronic device. In addition, the head-mounted device 102 can include a battery to extend the life of the portable electronic device 104. Furthermore, the head-mounted device 102 can include a cooling system for cooling down the portable electronic device 104. Moreover, the head-mounted-device 102 can include memory, for example, to store image based content, which can be displayed on the screen 106 of the portable electronic device 104. Persons skilled in the art will appreciate that any other suitable functionality may be extended including additional circuitry, processors, input/output, optics, and/or the like.

In some embodiments, the system including one or both of the head-mounted device 102 and the portable electronic device can include sensors to detect various signals. For example, accelerometers on the head-mounted device and/or the portable electronic device can be used to detect the user's head movements. In this example, the head-mounted device 102 can associate a particular head movement with a command for controlling an operation of the head-mounted display system 100. As yet another example, the head-mounted system 100 can utilize a proximity sensor on one or both of the head mounted device and portable electronic device to detect and identify the relationship between the two devices or to detect and identify things in the outside environment. As yet another example, the head-mounted system 100 can utilize a microphone on one or both of the head mounted device and portable electronic device to detect and identify voice commands that can be used to control the portable electronic device 104. As yet another example, the head-mounted system 100 can utilize a camera on one or both of the head mounted device and portable electronic device to capture images and/or video. The image based content may for example be viewed on the display of the head mounted display system. In one embodiment, the image based content may be viewed in addition or alternatively to image based media content playing on the display. In one example, the captured content may be viewed in a picture in picture window along with the media based content.

While the two devices 102 and 104 may provide redundant features to the system 100, in one embodiment, at least some of the redundancies are reduced or eliminated. For example, if the portable electronic device includes a camera then the head mounted device may not. Additionally or alternatively, if the portable electronic device does not include a microphone then the head mounted device may include one. As should be appreciated, this may reduce cost and complexity of the system 100. It may also keep the form factor of both devices 102 and 104 small and lightweight. In addition, it can extend the functionalities of each device.

In some embodiments, the head-mounted device 102 may not include a primary display but rather rely on a screen 106 of the portable electronic device 104 as the primary display and/or the only display of the system 100. A primary display may, for example, be the primary component used for viewing image based content when the system is worn on the user's head. Image based content may for example include but not limited to media such as movies, TV shows, and graphical user interfaces associated with various software applications.

In accordance with one embodiment, when the portable electronic device 104 is used in the head mounted device 102, the size and possibly the resolution of the image based content being displayed on the screen 106 may be adjusted for close up viewing (e.g., via the detection mechanism or the connection interface). For example, the image based content may be displayed in a viewing region that is configured smaller than the actual screen size (e.g., due to how close it is placed to the user's eyes) and/or the resolution may be increased/decreased relative to normal portable electronic device viewing to provide the best close up viewing experience. In one implementation, the viewing region is configured to fill the entire field of view of the user. In another implementation, the viewing region is configured to be less than the field of view of the user.

In one embodiment, the displayed content may be split into multiple images frames. For example, the displayed content may be split into two image frames (e.g., a left and right image frame for the left and right eye of the user). With two image frames, the system can perform stereoscopic imaging. Stereoscopic imaging attempts to create depth to the images by simulating the angular difference between the images viewed by each eye when looking at an object, due to the different positions of the eyes. This angular difference is one of the key parameters the human brain uses in processing images to create depth perception or distance in human vision. In one example, a single source image, which can be provided by the HMD, PED or external medium, is processed (e.g., either by the HMD or PED) to generate left image data and right image data for viewing. This can be accomplished by the portable electronic device and/or the head mounted device depending on the needs of the system.

The image frame(s) can also have different aspect ratios depending on the primary application of the displayed content. For example, an aspect ratio of 4×3 (i.e., similar to a television screen) may be used for television programs, whereas an aspect ratio of 16×9 (i.e., similar to a movie theatre screen) may be used for watching feature films.

Figure 2B:
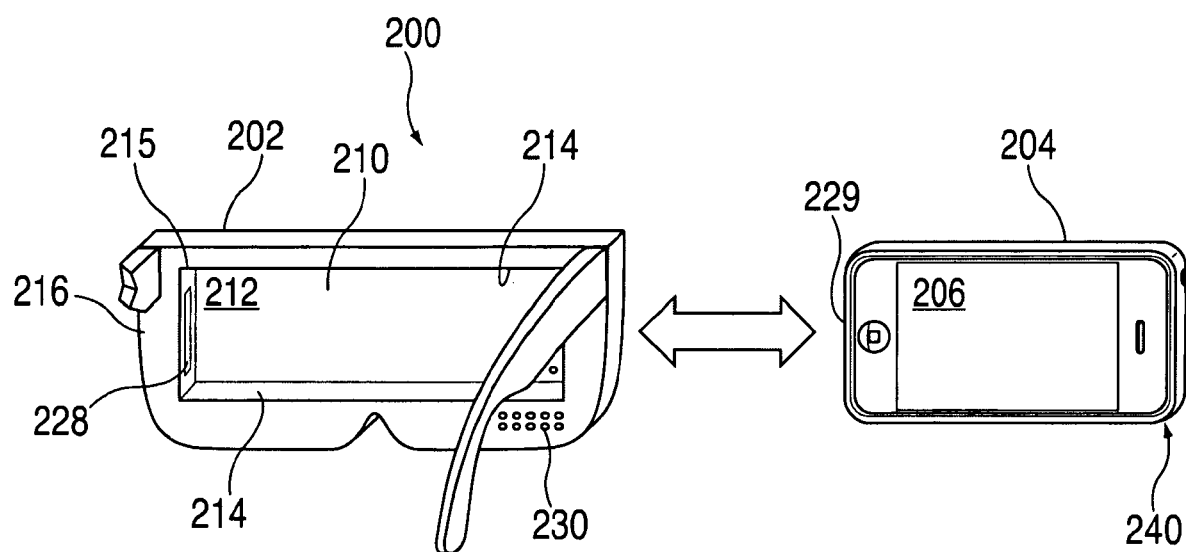

FIGS. 2A and 2B show simplified schematic diagrams of a head-mounted display system 200 in accordance with one embodiment of the present invention. Head-mounted display system 200 may generally correspond to the head-mounted display system described in FIG. 1. Head-mounted display system 200 includes head-mounted device 202 that receives a portable electronic device 204 having a display screen 206. That is, portable electronic device 204 may be coupled to head-mounted device 202 (as shown in FIG. 2B) and removed from head-mounted device 202 (as shown in FIG. 2A). When coupled, portable electronic device 204 is carried by head-mounted device 202, and as a result may be worn on the user's head.

Portable electronic device 204 can be, for example, a portable media player, cellular telephone, internet-capable device, personal organizer, any other portable electronic device, or any combination thereof. In one embodiment of the present invention, the portable electronic device 204 can be a device that has the combined functionalities of a portable media player and a cellular telephone, such as an iPhone™ sold by Apple Inc. In another embodiment of the present invention, the portable electronic device can be a dedicated media player such as an iPod™ sold by Apple Inc. Examples of iPods™ include for example the Touch™, Nano™, Classic™, and the like.

The display screen 206 of the portable electronic device 204 is typically oriented towards the user's eyes when the head mountable device 202 including the portable handheld device 204 is worn on the user's head (towards the eyes of the user). As such, the display screen 206 may be used to view content when being worn. In one particular embodiment, the head mountable device 202 does not include its own main display and rather relies on the display 206 of the portable electronic device 204 coupled thereto to provide image based content (thereby reducing redundancies, which can add cost and complexity to the system).

The head mountable device 202 typically includes a frame member 208. The frame member 208 may be supported on a user's head in a variety of ways including for example, ear support bars as in glasses, bands as in goggles, helmets, straps, hats and the like. The frame member 208 may have a docking area or mounting region 210 for placement of the portable electronic device 204 relative to the head mountable device 202. The frame member 208 may be configured to support the portable electronic device 202 when it is mounted in the mounting region 210.

The frame member 208 is typically worn in front of the users face. The mounting region 210 is therefore configured to place the display screen 206 in the correct position for viewing relative to a user's eyes (e.g., in front of the users eyes as well as some of the distance from the user's eyes).

The mounting region 210 may be widely varied. In one embodiment, the mounting region 210 includes a cavity 212. The cavity may for example have walls shaped similarly to the outer shape of the portable electronic device 204. In some cases, the cavity 212 may only include walls that surround multiple but not all sides of the portable electronic device 204 (e.g., at least two sides, three sides, fours sides, five sides,). The cavity 212 may form a void if five sides are used. In other cases, the cavity 212 may include walls on all sides (e.g., six sides). In any of these implementations, the walls may include open areas depending on the needs of the system. Alternatively, the cavity 212 may be formed with corners that match the corners of the portable electronic device 204.

The manner in which the portable electronic device 204 is placed within the cavity 212 may be widely varied. In one implementation, the portable electronic device 204 may be rotated into the cavity (e.g., by inserting a first end into the cavity 212 and thereafter rotating about the contact point). In another implementation, the portable electronic device 204 may be press fit into the cavity 212 (e.g., by pushing the portable electronic device into the shaped cavity). In yet another implementation, the portable electronic device 204 may be slid into the cavity (e.g., through a slot in one of its sides).

The head mountable device 202 can include one or more retaining features 214 for helping secure the portable electronic device 204 within the mounting region 210 of the head mountable device 202. The retaining features 214 may for example include doors, tabs, slots, detents, lips, snaps, flexures, friction couplings, clips, latches, catches, and/or the like.

The frame may include an opening 215 which provides access for viewing the display screen 206 when the portable electronic device is placed within the cavity 212. The opening 215 may be widely varied. In one embodiment it coincides with the shape/dimensions of the display screen 206. In another embodiment, it may be smaller than the shape/dimensions of the display screen 206. In either embodiment, it may include a bezel 216 that covers or overlays select portions of the portable electronic device 204 when the portable electronic device 204 is mounted within the head mountable device 202. That is, the bezel 216, which may be a separate component or a portion of one of the walls, can form or define the viewing region (blocking some of the device housing and/or the display screen). The bezel 216 may for example extend around all or some of the edge of the opening 215. In some cases, the opening 215 may include a transparent window disposed therein.

Shielding portions of the display screen 206 may be advantageous for enhancing the viewing experience and possibly reducing the energy burden of the portable electronic device (e.g., the shielded display pixels can be turned off). By way of example, the shielding portions may be black. The shielding portion may in some cases form a retaining structure. For example, it may be a fixed wall that forms a lip that covers a front portion of the portable electronic device when it is mounted or it may be a door that swings from an open position allowing the portable electronic device 204 to be inserted or removed and a closed position that locks the portable electronic device 204 in place.

The display screen 206 of the portable electronic device 204 may be widely varied and as such so may the head mountable device 202 configured for receiving the portable electronic device 204 (as mentioned above). In one implementation, the display screen 206 may for example be a full screen display that extends from edge to the edge of the portable electronic device 204. In another implementation, the display screen 206 may for example be a substantially full screen display such that a majority of the display screen 206 fills the front surface of the portable electronic device 204. In another implementation, the display screen 206 may for example be a partial screen display. For example, the partial screen display may only be oriented in an upper half of the portable electronic device 204. Further, the display screen 206 may be symmetrically centered on the front face of the portable electronic device 204 or alternatively it may be offset towards one side. In all of these implementations, the entire screen or portions of the screen can be covered to provide the desired screen size/shape for the viewing experience.

When coupled, the distance of the display screen 206 relative to the user's eyes may be widely varied. In small form factor head mountable devices (e.g., low profile), the display screen 206 of the portable electronic device 204 may be placed fairly close to the user's eyes. The placement of the screen 206 may be controlled by the surfaces of mounting region 210 and more particularly the walls of the cavity 212.

Because the screen 206 may be so large compared to the viewing distance, the system 200 may be configured to modify the image based content displayed on the display screen 206 so that is can be easily viewed. For example, the system 200 may adjust the size of the displayed content to be less than the size of the display screen (see, e.g., FIG. 11A). The system 200 may also adjust the resolution of the viewable content. For example, the resolution may be increased/decreased to compensate for how close the eyes are to the display screen 206.

It should also be emphasized that the system 200 is not limited to displaying one image frame. In some cases, it may be beneficial to provide multiple redundant image frames (dual image frames) in order to implement stereo like viewing (see for example FIGS. 11B-11F). In cases such as these, the image frames may be displayed at two locations within the display screen 206. The timing or image characteristics of the dual image frames relative to one another may be varied to provide an enhanced viewing effect.

While in most cases, the single image frame or dual image frame are typically centered within the screen 206, in some cases, it may be desirable to adjust the position of the displayed content within the display screen 206 in order to better align the image/content to the user (e.g., align or center the displayed image relative to where the eyes should be or to where the eyes actually are). The alignment may be based on a particular location relative to the head mountable device 202 and/or based on the position of the user's eyes relative to the screen 206. For example, the image frames(s) may be centered relative to a nose support of the frame member 208, and/or the head mountable device 202 may include a means for discerning the location of the eyes (e.g., optical sensor). As shown by arrows in FIG. 11C, the position of the dual images may be adjusted together.

Figure 11A:
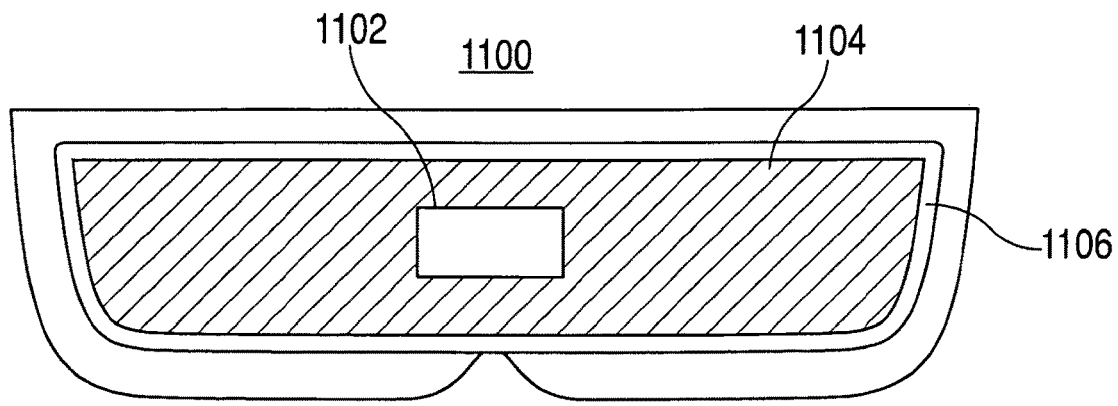
FIGS. 11A-11F show several examples of creating image frames within a display screen in a head-mounted display system in accordance with embodiments of the invention.
Figure 11B:
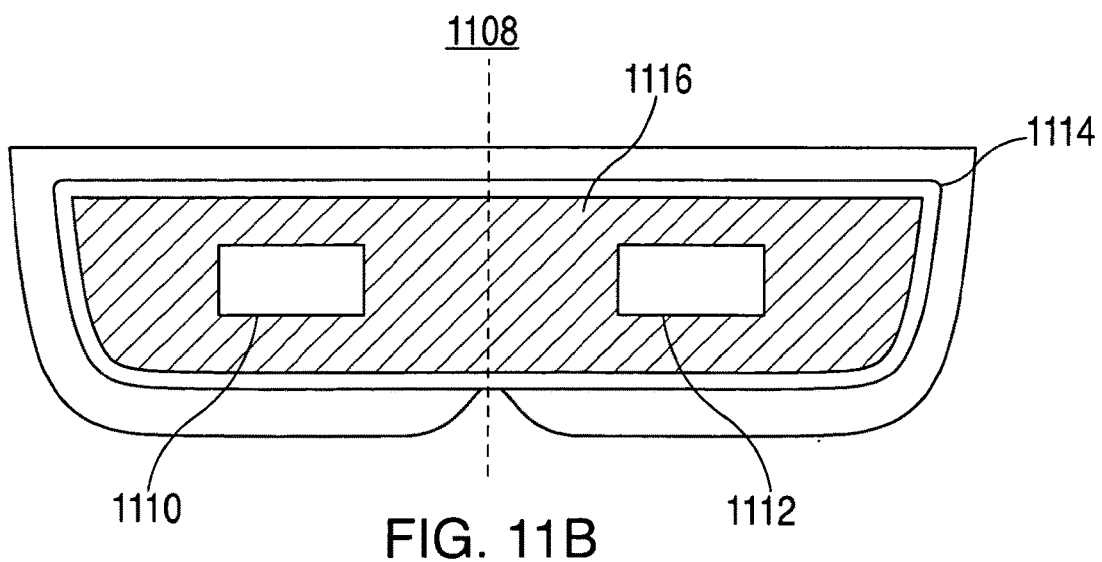
Figure 11C:
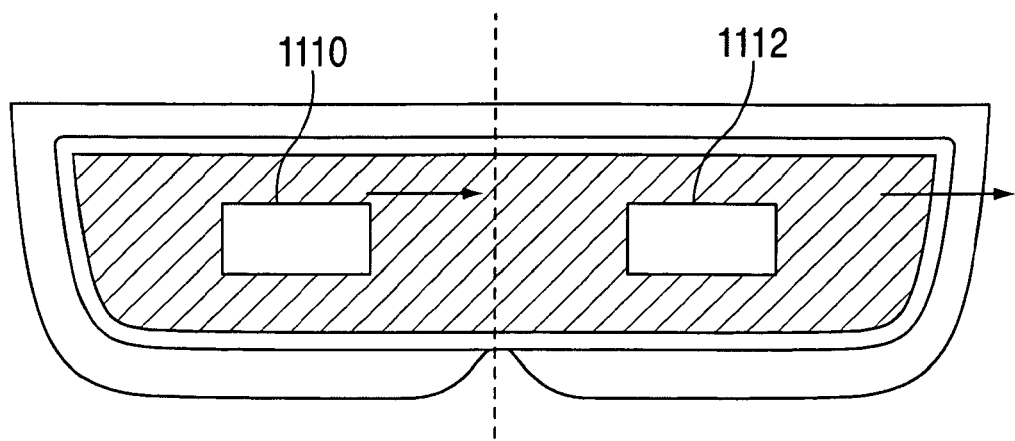
Figure 11D:
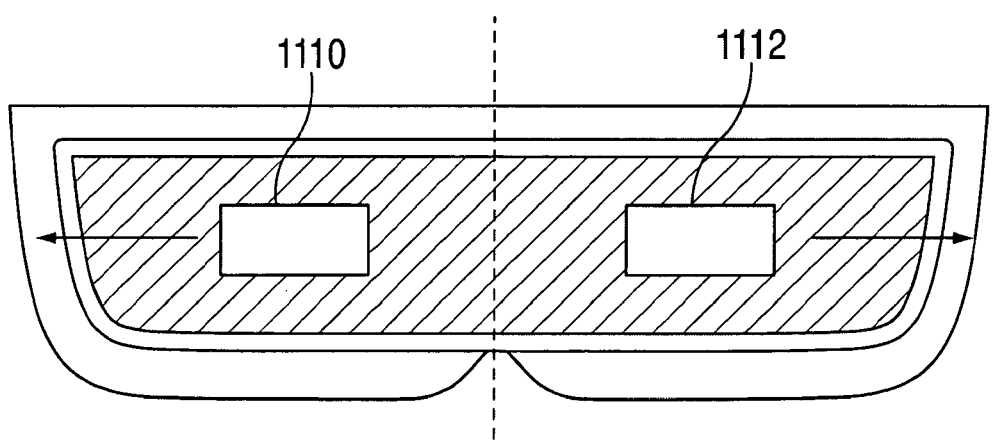

Furthermore, as shown by the arrows in FIG. 11D, the position of the dual images may be adjusted relative to one another. For example, one may be adjusted upward while the other is adjusted to the right. Furthermore, although not shown, the orientation of each image frame may also be adjusted together or separately (rotation).

Although not shown, the system 200 may include an optical subassembly for helping properly display the one or more image frames to the user. That is, the optical subassembly may help transform the image frame(s) into an image(s) that can be viewed by the human eye. Optical subassembly may for example focus the images from the respective image frame(s) onto the user's eyes at a comfortable viewing distance.

The optical subassembly may be disposed between the display screen 206 and the user's eyes. The optical subassembly may be positioned in front of, behind or within the opening 215 that provides viewing access to the display screen 206. The optical subassembly may be supported by the frame member 208. For example, it may be attached to the frame member via any suitable means including for example screws, adhesives, clips, snaps, and the like.

The optical subassembly may be widely varied. The optical subassembly may include various optical components that may be static or dynamic components depending on the needs of the system. The optical components may include, for example, but not limited to lenses, light guides, light sources, mirrors, diffusers, and the like. The optical sub assembly may be a singular mechanism or it may include dual features, one for each eye/image area. In one implementation, the optical sub assembly can be formed as a panel that overlays the access opening 215. The panel may be curvilinear and/or rectilinear. For example, it may be a thin flat panel that can be easily carried by the frame member 208 and easily supported on a user's head. If dynamic, the optical subassembly 219 may be manually or automatically controlled.

Specific examples of optical sub assemblies may include aspherical and diffractive optical arrangements. Aspherical optical arrangements may include various types of prism and/or lens arrangements (e.g., coaxial arrangement of lenses, a coaxial arrangement of a set of lenses arranged along a common axis, a concave mirror arrangement, a free shaped prism arrangement). Diffractive optical arrangements may include various types of arrangements that bend and spread light (e.g., a light-guided optical element, or a binocular light-guided optical element, both of which can be made of planar transparent glass or plastic).

In some embodiments, the optical subassembly may include one or more optical modules that may be operative to adjust or modify the displayed media based on any suitable criteria (e.g., as standalone modules or using circuit board). For example, optical modules may be operative to resize or otherwise modify an image such that the image appears to be displayed at a greater distance than the distance between optical modules and the user's eyes (e.g., the image appears to be viewed from 4 meters and not 20 mm). As another example, optical modules may be operative to generate media displays that correspond to standard definition or high definition images. In some embodiments, left and right optical modules may generate and display different images associated with the received media. For example, optical modules (e.g., upon receiving appropriate instructions from the HMD or PED), may offset left and right images so that the user is given the illusion of viewing media in three dimensions. The optical modules may identify the appropriate left and right images using any suitable approach, including for example receiving separate left and right images from the media source, or generating left and right images from the single media provided by the media source. As another example, left and right optical modules may adjust the images displayed to account for limitations or corrections (e.g., by glasses or contact lens) of the user's eyesight. For example, if a user is myopic in one eye, the optical module associated with that eye may modify the image displayed to correct the user's myopia. The system may determine the correction required for each eye, if any, using any suitable approach. For example, the user may enter a glasses or contact lens prescription that indicates the required correction. As another example, each optical module may automatically analyze the user's eyes, and determine the adjustment needed based on the analysis. This may allow users who normally wear glasses to use system without their glasses, which may lead to discomfort.

The system 200 may include a detection mechanism for alerting the portable electronic device 204 that it has been mounted or is otherwise carried by a head mountable device 202. Once detected, the portable electronic device 204 can be placed in a head mounted display (HMD) mode. The HMD mode may be based as a default and/or on user preferences. The HMD mode can be set up to configure the portable electronic device 204 for HMD viewing. For example, the HMD mode may adjust the image/content so that it can be viewed up close (as mentioned above). If user preferences are used, the user may be able to make adjustments as needed. Since adjustments may be difficult for the user, in some cases, the HMD and/or portable electronic device may include mechanisms for automatically configuring the image location and size. For example, either device may include sensors for detecting the distance to the eyes and the position of the eyes. As should be appreciated, each user's eyes are oriented differently. For example some eyes are located close together while others are more spread out. The optimal viewing positions of the displayed images can be determined and then the viewing positions can be adjusted. The same can be done for resolution. Although, allowing the user to adjust resolution may be beneficial as this is a more difficult measurement to make since eyes can focus differently. By way of example, the portable electronic device 204 and/or the HMD 202 may include cameras that can reference where the eyes are located relative to the HMD 202. Alternatively, the portable electronic device may become a slave to the head mountable device such that the head mountable device controls the operation of the portable electronic device once it is inserted into the head mountable device.

The system 200 can include a communication interface that provides data and/or power communications between the portable electronic device 204 and the HMD 202. The communication interface may be wired or wireless.

If wired, the HMD 202 may include a connector 228 that receives a corresponding connector 229 of the portable electronic device 204 when the portable electronic device 204 is supported/carried by the head mountable device 202. In most cases, the connectors mate when the device is placed within the mounting region 210, and more particularly when placed within the cavity 212. By way of example, the connectors may mate as the portable electronic device is rotated, slid, or pressed into the HMD 202. The connectors may be male/female. For example, the portable electronic device may include a female connector while the HMD 202 may include a male connector. In this particular case, the male connector is inserted into the female connector when the devices are coupled together. The connectors may be widely varied. The connectors may be low profile connectors. The connectors may for example correspond to USB and/or FireWire. The connector may also be a 30 pin connector used in iPods™ and iPhones™ manufactured by Apple Inc. of Cupertino, Calif. In some cases, the cavity/connector combination may generally define a docking station for the portable electronic device.

If wireless, the devices 202 and 204 may each include a wireless chip set that transmits and/or receives (transceiver) the desired signals between the devices 202 and 204. Examples of wireless signal protocols include Bluetooth™, 802.11, RF, and the like. Wireless connections may require that wireless capabilities be activated for both the head-mounted device and the portable electronic device. However, such a configuration may not be possible or may be intermittent when the devices are being used in certain locations as for example on an airplane.

As a result of operatively coupling the device 204 through wired and/or wireless means, features of the HMD 202 may be extended to the portable electronic device 204 and features of the portable electronic device 204 may be extended to the head mountable device 202. Furthermore, redundant features may be removed from the system 200. For example, the HMD 202 may be configured without a display and instead utilize the display of the portable electronic device 204.

The number of additional features 230 provided by the HMD 202 may be widely varied. The features may be disposed internally or externally. In one example, the head-mounted device 202 can provide additional functionality to the portable electronic device 204. For example, the HMD 202 may include additional controls in the form of buttons, switches, dials, touch devices, etc. In addition, the head-mounted device 202 can include a battery to extend the life of the portable electronic device 204. Furthermore, the head-mounted device 202 can include a cooling system for cooling down the portable electronic device 204. Moreover, the head mounted device 202 can include memory as for example to store image based content, which can be displayed on the screen 206 of the portable electronic device 204. The head-mounted device 202 can also include sensors to detect various signals.

The head-mounted display system 200 can include several modes of operation. For example, the head-mounted display system 200 can operate in an internal viewing mode, which allows the user to watch image based content playing on the portable electronic device. As another example, the head-mounted display system can operate in a picture in picture ("PIP") mode. In the PIP mode, a PIP image frame can be partially overlaid on top of the standard viewing image frame(s).

As yet another example, the head-mounted display system can operate in an external viewing mode, which allows the user to view the outside world. The head-mounted display system 200 can provide external viewing of the user's surroundings using any suitable approach. For example using a camera of the portable electronic device 204 or using a separate camera disposed on the outside of the head mountable device 202. In the illustrated embodiment, the portable electronic device includes a camera on its backside opposite the display screen and the head mounted device includes an aperture within the mounting region that provides camera access to outside the head mounted device. In this manner, the camera may capture image based data that is in front of the user and further image frames corresponding to image based content received from the camera can be displayed in the standard image frame(s).

In some embodiments, the head-mounted display system 200 can detect when the user has selected an option to view external image based content (e.g., the user may have selected a control, issued a voice command, or made a head movement). In some embodiments, the head-mounted display system 200 can provide external viewing based on an indication received from the user's surroundings. For example, sensors on the head-mounted display system can detect objects or sound around the user and enable external viewing.

The head-mounted display system 200 can make adjustments in response to detecting objects or sound. For example, arrows can be displayed on the display screen of the head-mounted display that corresponds to the direction of detected sound. As another example, the head-mounted display system 200 can automatically pause or stop the stored image based content that is currently playing. As yet another example, the head-mounted display system 200 can lower the volume of the stored image based content so that the user can hear the external sounds. In some cases, along with lowering the volume of the stored image based content, the head-mounted display system 200 can provide close captioning of the stored image based content.

In some embodiments, the display screen 206 can be utilized to extend the view of the displayed content. For example, because the screen 206 is larger than the reduced sized image frame(s), portions of the screen 206 surrounding the image frame(s) may be used to extend the feel of the displayed images to produce enhanced viewing effects. The extended portions may be colors associated with the edge of the displayed image. The secondary effect may be continuous or segmented. It may extend from all edges or just corners. Its characteristics including speed can also be adjusted to produce distinct effects. Alternatively or additionally, the images may be made larger and smaller to produce a viewing effect. Other examples include shaking, shifting, etc. See, for example, FIG. 11F, which shows a display screen broken up into a set of dual primary image regions (showing the desired content) and a set of secondary visual effect regions, which surround at least a portion of each of the primary image regions, and which extend and provide enhancements to the images displayed in the primary image regions.

The head-mounted device 204 can also serve a secondary purpose for the portable electronic device. For example, the head-mounted device 204 can serve as a case for the portable electronic device 202. As another example, the head-mounted device 204 can serve as a display stand for the portable electronic device 202.

These and other embodiments will be described in greater detail below.

Figure 3A:
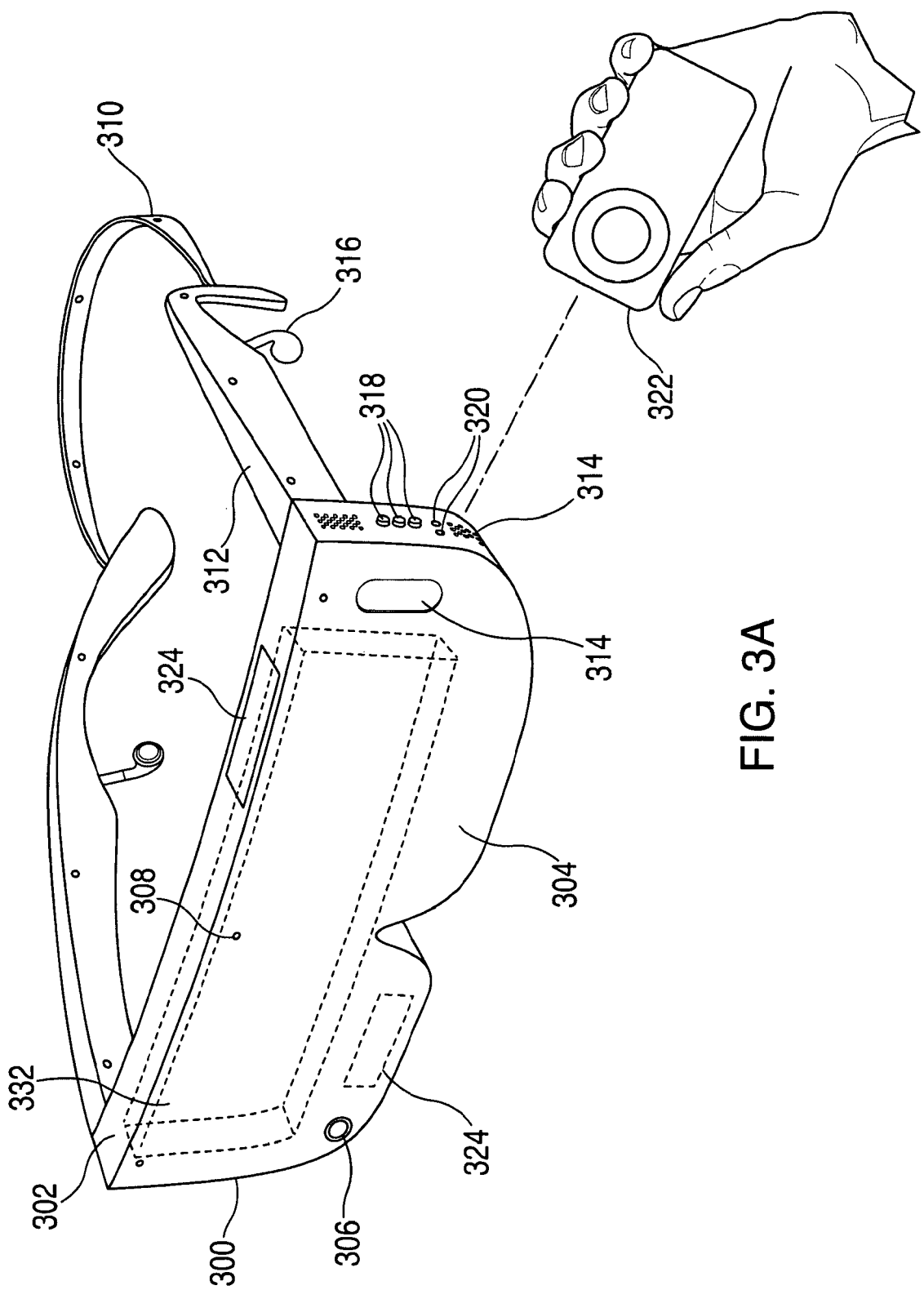

FIGS. 3A-3C show various views of a head-mounted device in accordance with one embodiment of the invention. The head-mounted device 300 may generally correspond to the head-mounted device 102 of FIG. 1 or head-mounted device 204 of FIG. 2. Head-mounted device 300 can include any suitable component.

The head mounted device 300 may include a face plate 302. Face plate 302 may be typically worn in front of the user's face. Faceplate 302 may be supported on a user's head using a variety of components including, for example, eyeglass temples 312. Alternatively, goggle bands, helmets, straps, hats and the like may be used.

Faceplate 302 can form the outer surface of head-mounted device 300. Faceplate 302 can be constructed into any suitable shape and dimension. In the example shown in FIGS. 3A and 3B, faceplate 302 generally has an outer shape configured to cover a user's eyes when worn. It may also include a nose recess such that it can be supported on a user's nose. This may serve as a reference surface for placing head-mounted device 300 relative to a user's eyes.

Faceplate 302 can be formed from any suitable material or materials. In some embodiments, the faceplate can be formed from lightweight materials that afford user comfort (e.g., plastic) while maintaining strength to support a portable electronic device. In some embodiments, the faceplate can be formed from a material capable of withstanding impacts or shocks to protect the components of head-mounted device 300. Examples of materials include composite material, glass, plastic (ABS, polycarbonate), ceramic, metal (e.g., polished aluminum), metal alloys (e.g., steel, stainless steel, titanium, or magnesium-based alloys), or any other suitable material. In some embodiments, the outer surface of frame 302 can be treated to provide an aesthetically pleasing finish (e.g., a reflective finish, or added logos or designs) to enhance the appearance of head-mounted device 300.

Face plate 302 may be a skeletal structure with minimal structure such as walls thereby keeping it light weight and/or it may be configured more like a housing that can enclose various components. Face plate 302 may include main body 303, which helps form the side surface of the head mounted device 300. Face plate 302 may also include a front panel 304 and/or a back panel 305 that can be integral with or coupled to main body 303 to form the front and back surfaces of head-mounted device 300. Thus, main body 303, front panel 304, back panel 305 can cooperate to form the outer structure of head-mounted device 300.

Main body 303, front panel 304 and back panel 305 can be formed from any suitable material as mentioned above. In some embodiments, the three structures are formed from similar materials. In other embodiments, the three structures are formed from dissimilar materials. Each has needs that may be taken into account when designing the head mounted device. For example, the main body may be formed from a structure material with a structural configuration thereby providing central support to the head mounted device 300 while the front and back panels may be formed a material capable of withstanding impacts or shocks to protect the components of head-mounted device 300.

Main body 303, front panel 304 and back panel 305 can be constructed into any suitable shape. In one example, the main body takes the shape of the eyes and nose area of the face and the front and back panels 304 and 305 are substantially planar surfaces. As another example, front and back panels 304 and 305 can be curved surfaces that generally follow the contours of a user's face.

In one embodiment, the main body, front and/or back panels 303, 304, and 305 may cooperate to form an internal cavity 332 for placement of a portable electronic device relative to head-mounted device 300. For example, the main body, front and back panels can form side walls that surround the portable electronic device thereby helping to retain the portable electronic device within the head-mounted device 300. Cavity 332 may be configured to place the screen of the portable electronic device in the correct position for viewing relative to a user's eyes (e.g., in front of the users eyes and/or some distance away from the user's eyes). In one embodiment, main body 303 of head-mounted device 300 may be configured to provide the main support of a portable electronic device when the portable electronic device is held within the cavity 332.

Cavity 332 can be defined by walls that may have a shape similar to the outer shape of the portable electronic device. In one example, the inner shape of the cavity 332 substantially conforms to the outer shape of a portable electronic device. Cavity 332 may receive the entire portable electronic device or only a portion of the device. For example, cavity 332 may include walls that surround multiple but not all sides of the portable electronic device (e.g., at least two sides, three sides, fours sides, or five sides). Thus, cavity 332 may receive only a display portion of the portable electronic device while leaving the rest of the portable electronic device outside of the head-mounted device. In some cases, the cavity 332 may form a void if five or six sides are used. In any of these implementations, the walls of cavity 332 may include open areas depending on the needs of the system. Persons skilled in the art will appreciate that cavity 332 may match with the portable electronic device in any suitable manner.

In some embodiments, head-mounted device 300 can include an adjustable mating mechanism such that the portable electronic device can fit regardless of the size of the device or the presence or absence of a case used for the device (e.g., soft or hard case). For example, the shape and dimensions of the cavity may be physically adjusted so as to fit different portable electronic devices. Moreover, the cavity may be oversized and include a separate insert for placement therein. The inner shape of the insert can be designed for a particular portable electronic device while the outer shape may correspond to the shape of the cavity. As another example, cavity 332 can be made from a deformable material that can conform to the shape of the portable electronic device (e.g., foam). In addition, the material can also be suitable for pooling heat away from the portable electronic device.

As shown in FIGS. 3B and 3C, the back panel 305 can include an opening 334 that coincides with a display screen of the portable electronic device (e.g., thereby allowing at least the desired viewing portion of the display screen to be viewed while the portable electronic device is disposed within the cavity 330). In one embodiment, the opening 332 is sized similarly to the portable electronic device. In another embodiment, the opening 332 is sized similarly to the display screen of the portable electronic device (which is typically smaller than the overall dimensions of the portable electronic device. In another embodiment, the opening 332 is sized smaller than the display screen of the portable electronic device. For example, it may be configured to be the size necessary for viewing smaller image frames that are displayed within the display screen (whether singular or double). In fact, if dual image frames are used, then the opening may be configured as dual openings rather than one larger opening.

Although not shown in FIGS. 3A-3C, in some cases, the HMD 300 can include an optical sub assembly that is disposed between the display screen and the user's eyes in the region of the opening 332. The optical sub assembly may for example be disposed behind, within or in front of the opening 332. The optical subassembly may be supported by some portion of the main body 303 front panel 304 and/or back panel 305. In some cases, the optical sub assembly may simply be a transparent window. In other cases, however, the optical sub assembly may also be a more complicated system of optical components that enhance and improved the viewing experience (i.e., help focus the user's eyes on the image frames being displayed on the display screen of the portable electronic device).

The manner in which the portable electronic device may be placed within the cavity 330 of the head-mounted device 300 may be widely varied. For example, the portable electronic device can slide into, be clipped on, be rotated into, and/or be press fit into the head-mounted device. In the illustrated embodiment, the face plate 302 includes a slot 340 such that the portable electronic device can be slid into the cavity 330. The slot 340 may for example be positioned on the right (as shown), left, top and bottom side of the frame 302. In alternate embodiments, the portable electronic device may be rotated or press fit into the cavity 330 through the opening used for viewing the display screen or if the opening is smaller than the portable electronic device, the back panel may open like a door (e.g., a door that swings from an open position allowing portable electronic device to be inserted or removed and a closed position that locks portable electronic device in place).

Head-mounted device 300 may include one or more retaining features for securing the portable electronic device within the head-mounted device. The retaining features may, for example, include doors, tabs, slots, detents, snaps, flexures, friction couplings, latches, catches, and/or the like. In some cases, the cavity may provide the retaining structure by being dimensioned to snuggly receive the portable electronic device (e.g., friction coupling). In some cases, the cavity may include a biasing element such as flexures or foam that squeezes the portable electronic device when contained within the cavity. In some cases, the slot may include a door that locks the portable electronic device within the cavity.

Head mounted device 300 may include an internal connector 342 disposed within the cavity 330. The connector 342 may be configured to receive a corresponding connector of the portable electronic device when the portable electronic device is positioned within the cavity 330. For example, the connectors may mate as the portable electronic device is slid into the cavity 330. The walls of the cavity may properly align the connectors during insertion. Once engaged, the head mounted device 300 and the portable electronic device may be operatively coupled together such that they can communicate and possibly share functionality. The connector 342 may be widely varied. The connector may generally provide data connections. The connector may also provide power connections. By way of example, the connector may include for example, universal serial bus ("USB"), Firewire, or other similar connectors. In one example, the connector is a 30 pin connector such as those used in iPods™ and iPhones™ manufactured by Apple Inc. of Cupertino, Calif.

Alternatively or additionally, the data and/or power connection can be provided by a wireless connection. Wireless connections may be widely varied. For example, the devices may each include a wireless chip set that transmits and/or receives (transceiver) the desired signals between the devices. Examples of wireless signal protocols include Bluetooth™ (which is a trademark owned by Bluetooth Sig, Inc.), 802.11, RF, and the like. Wireless connections may require that wireless capabilities be activated for both the head-mounted device and the portable electronic device. However, such a configuration may not be possible or may be intermittent when the devices are being used in certain locations as, for example, on an airplane.

The communication interface provided by a wired and/or a wireless connection can allow the user to control a portable electronic device using controls provided on a head-mounted device or a remote control. In addition, the communication interface can provide audio out to earphones. As a result, audio from image based content playing on a portable electronic device can be directed to earphones.

Head-mounted device 300 can include earphones 316, which can provide audio directly to the user. In some embodiments, earphones 316 can be earbuds, which can fit comfortably inside the user's ears. In the illustrated embodiment, the earphones are integrated with the eyeglass temples 312.

In some embodiments, head-mounted device 300 can provide controls 318 which can allow the user to control the portable electronic device while wearing head-mounted device 300. Controls 318 can control any suitable feature and/or operation of head-mounted device 300 and/or the portable electronic device. For example, controls 318 can include navigation controls, display controls, volume controls, playback controls, or any other suitable controls. Controls 318 can be located on the side surfaces, front surface, top surface, eyeglass temples 312, or any other accessible location on the periphery of head-mounted device 300.

In one embodiment, head-mounted device 300 may include one or more controls 318 that are functionally mapped to the buttons of the portable electronic device when the portable electronic device is coupled. Alternatively, head-mounted device 300 may include an access opening for the buttons of the portable electronic device.

Any suitable type of controls can be used, such as, for example, wheels, dials, buttons, switches, sliders, and touch sensors. In some embodiments, a volume control can be placed on eyeglass temples 312. For example, a wheel or slider can be placed proximate to one of earphones 316 on eyeglass temples 312. As another example, a longitudinal touch sensor can be placed along eyeglass temples 312 (e.g., the user may increase the volume by sliding a finger along the touch sensor from front to back, and decrease the volume by sliding a finger from back to front). As still another example, touch sensors can also be used for display controls (e.g., brightness and contrast, enlarge/shrink, camera zoom, or any other suitable display control).

In some embodiments, front panel 304 can be a touch surface. For example, head-mounted device 300 can be connected to a portable electronic device, and a user may navigate the screen of the portable electronic device by moving one or more fingers across front panel 304.

Head-mounted device 300 may associate user inputs on front panel 304 with portable electronic device functions using any suitable approach. For example, the user may be looking at the screen of the portable electronic device while wearing head-mounted device 300. When the user slides a finger across front panel 304, head-mounted device 300 can translate this movement to a movement of a cursor or control on the screen of the portable electronic device.

The movement of the user's fingers and the effect on the screen can be related using any suitable approach. For example, this association can be a one-to-one association. As another example, this association can be scaled (e.g., smaller or larger). A smaller association may be possible when a movement on front panel 304 corresponds to a smaller movement on the screen. Such an association can be useful, for example, when a user is navigating a list. A larger association may be possible when a movement on front panel 304 corresponds to a larger movement on the screen. Such an association can be useful, for example, when a user is flipping through pictures in a slideshow.

In some embodiments, head-mounted device 300 can include connectors or jacks 320, which can be one or more external connectors that can be used to connect to other external devices or systems (data and/or power). In one embodiment, head-mounted device 300 may include a secondary audio/video connector 320 when the portable electronic device is situated inside the head-mounted device.

Alternatively, head-mounted device 300 may include a hole for allowing access to the audio/video connector on the portable electronic device.

Head mounted device 300 may include a camera region 306. Camera region 306 can be positioned proximate front panel 304. The camera region may represent a camera that is integrated with the head mounted device and/or it may represent an opening for a camera. An integrated camera may be used in place of or in conjunction with a camera on the portable electronic device. For example, a camera on portable electronic device 202 (FIG. 2) may not be able to capture the user's surroundings when coupled to the head-mounted device. As another example, camera 306 can be used if the portable electronic device does not include a camera of its own (e.g., iPod Touch™ available from Apple Inc. of Cupertino, Calif.).

In cases where the portable electronic device includes a camera, and there is a desire to reduce redundancies (e.g., thereby reducing weight, complexity and cost), front panel 304 can include a camera hole, which can be aligned with a camera of the portable electronic device when the portable electronic device is situated inside head-mounted device 300. The camera hole can allow the camera on the portable electronic device to capture image based content of the user's surroundings. While a hole is not shown, it should be appreciated that it can be placed at any location on the front panel.

In some embodiments, camera(s) associated with camera region 306 can be used to capture image based content (e.g., images and video) of the user's external surroundings. For example, camera(s) can be used when head-mounted device 300 is worn on the user's head to provide image based content to the user. This may allow the user to see what he would not normally be able to because his vision is blocked or impaired by wearing head-mounted device 300. This may advantageously allow the user to wear head-mounted device 300 for extended periods of time.

Head mounted device 300 may include speakers 308. Speakers 308 can be located at various locations on head-mounted device 300 to enhance the user's viewing experience. For example, speakers 308 can be placed around some or all of the periphery (e.g., sides, top, and/or bottom) of frame 302. As another example, speakers can be integrated into strap 310, which can be located at the user's ear level. As still another example, speakers 308 can be placed on eyeglass temples 312, which can fit over or behind the user's ears. Speakers 308 can include a variety of different types of speakers (e.g., mini speakers, piezo electric speakers, and the like), and/or haptic devices.

Haptic devices (e.g., buzzers, or vibrators) can work alone or in combination with speakers. In some cases, the speakers may serve as haptic components. Similarly to the speakers, haptics can be placed around some or all of the periphery (e.g., sides, top, and/or bottom) of frame 302. As another example, haptics can be integrated into strap 310, which can be located at the user's ear level. As still another example, speakers 308 can be placed on eyeglass temples 312, which can fit over or behind the user's ears.

Haptic devices can interface with the user through the sense of touch by applying mechanical stimulations (e.g., forces, vibrations, and motions). For example, while a user is watching image based content, haptic devices can be configured to provide an enhanced surround sound experience by providing impulses corresponding to events in the image based content. As an illustrative example, the user may be watching a movie that shows an airplane flying on the left of the screen. Haptic devices can produce vibrations that simulate the effect (e.g., sound effect, shock wave, or any combination thereof) of the airplane. For example, a series vibration may be provided along the left temple from front to back to simulate the airplane flying to the left and rear of the user. Speakers can also be used in this manner.

Head mounted device may include a variety of ports 314. When portable electronic device is coupled to head-mounted device 300, ports 314 can provide a path for signals (e.g., audio signals) to travel between the portable electronic device and head-mounted device 300. In some embodiments, ports 314 can provide a simple path for signals to travel to the user. For example, ports 314 can be a hole or simple circuitry (e.g., an amplifier) that is directly aligned with a component on the portable electronic device. As a result, sound can travel directly from the portable electronic device to the user. In some embodiments, ports 314 can provide a complex path for signals, in which signals are redirected to a different location on the head-mounted device. For example, head-mounted device 300 can include circuitry that can redirect audio signals from speakers on the portable electronic device to various locations on the head-mounted device (e.g., audio signals can be redirected to speakers 308 and earphones 316). As another example, head-mounted device 300 can include an acoustical port for allowing access to a microphone on the portable electronic device. Alternatively, the head-mounted device may include its own microphone.

In some embodiments, head-mounted device 300 can further include one or more electronic subassemblies 324. The electronic subassemblies 324 can be configured to implement any suitable functionality provided by head-mounted device 300. For example, the electronic subassemblies 324 can include memory (e.g., memory 1318 of FIG. 13), sensors (e.g., sensors 1324 of FIG. 13), processors (e.g., processor 1310 of FIG. 13), communications circuitry (e.g., communications circuitry 1328 of FIG. 13), battery (e.g., battery 1320 of FIG. 13), or any other suitable component. The one or more subassemblies 324 may be placed at various locations within or outside of the head-mounted device 300. For example, the electronic subassemblies may be disposed at internal spaces defined by the main body 303 and possibly the front and rear panels 304 and 305 (without interfering with the internal space provided for the portable electronic device). In one example, they are placed at the lower sections on the right and left of the nose support region of the main body 303. This section would otherwise not be used because of the configuration of the portable electronic device (e.g., substantially rectangular). Additionally or alternatively, the main body 303 and/or the front panel 304 may form enclosed portions that extend outwardly thereby forming internal spaces for placing the electronic subassemblies.

Remote control 322 can be connected to head-mounted device 300 or the portable electronic device using any suitable approach. For example, remote control 322 can be a wired device that is plugged into a connector in connectors 320. As another example, remote control 322 can be a wireless device that can transmit commands to the portable electronic device and head-mounted device 300 via a wireless communications protocol (e.g., Wi-Fi, infrared, Bluetooth™, or any combination thereof). As still yet another example, remote control 322 can be a device that is capable of both wired and wireless communications. The user may use remote control 322 to navigate the portable electronic device and to control the display, volume, and playback options on the portable electronic device. Remote control 322 can include any remote control device, such as, for example, the Apple Remote available from Apple Inc. of Cupertino, Calif.

Figure 4:
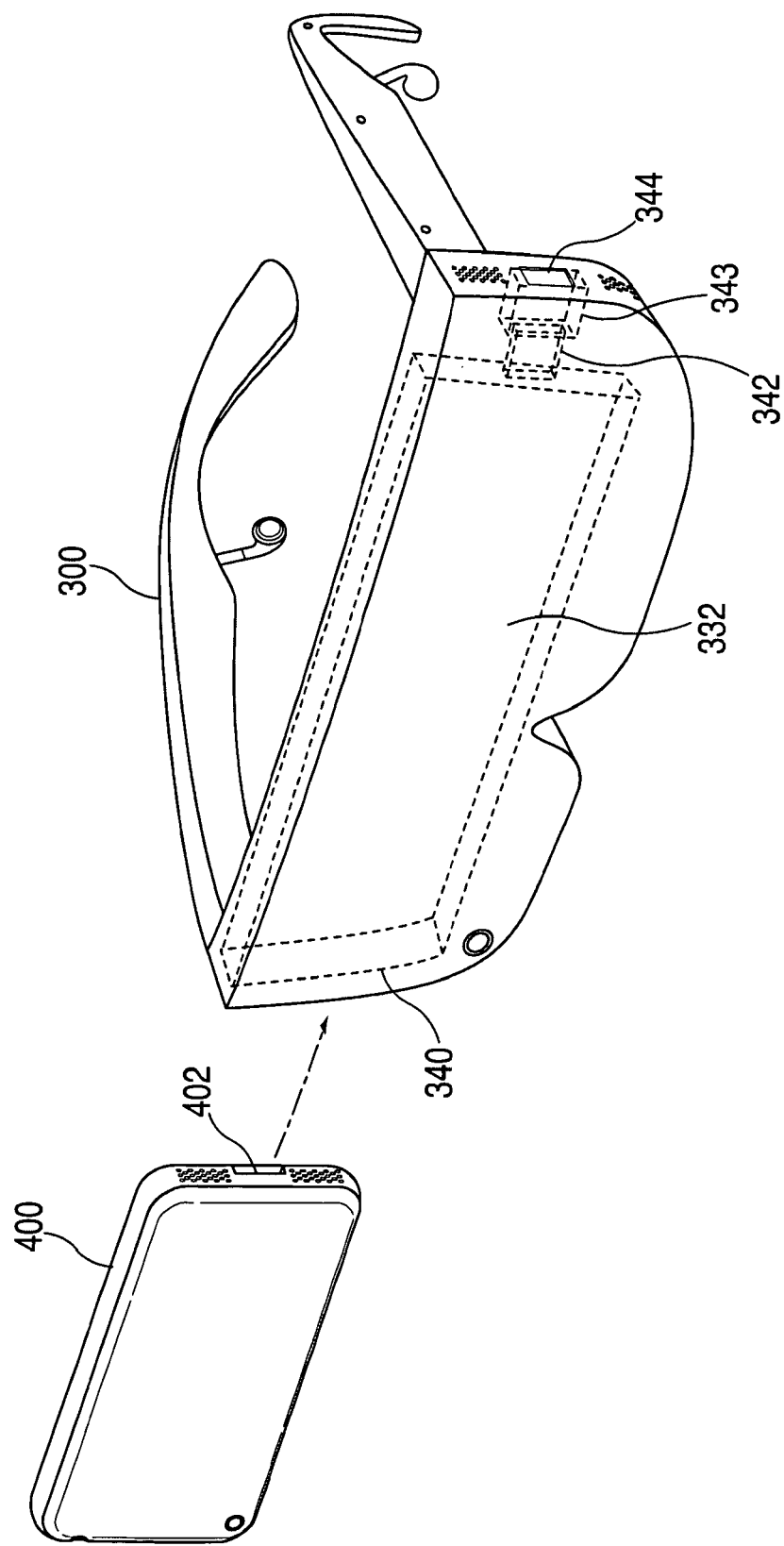
FIG. 4 shows an alternative configuration of a head-mounted device in accordance with embodiments of the invention.

FIG. 4 shows a configuration for sliding a portable electronic device 400 into a head-mounted device 300 in accordance with one embodiment of the invention. Portable electronic device 400 and head-mounted device 300 can correspond to any of those previously described.

In the implementation shown in FIG. 4, the portable electronic device 400 is slid through the slot 340 and into the cavity 332. The slot 340 may be situated opposite a connector 342 such that as the portable electronic device 400 is slid into the cavity 332, a connector 402 of the portable electronic device 400 can begin to mate with connector 342 and can completely mate upon final insertion of the portable electronic device 400 into the cavity 332. In the illustrated embodiment, slot 340 may be configured to receive the bottom end of the portable electronic device 400. During insertion, the walls of the cavity 332 help guide the portable electronic device 400 into place within the cavity 332. In addition, the walls help guide the connector 402 of the portable electronic device 400 to connect with the corresponding connector 342 disposed within the cavity 332.

The connectors 402 and 342 can allow data and/or power communications between head-mounted device 300 and portable electronic device 400. The connectors 402 and 342 may be widely varied, such as, for example, low profile connectors, USB, FireWire, or a 30 pin connector used in iPods™ and iPhones™ manufactured by Apple Inc. of Cupertino, Calif. In some cases, the cavity/connector combination may generally define a docking station for portable electronic device 400. As shown in FIG. 4, the connectors 402 and 342 may be male/female. For example, the portable electronic device may include a female connector while the head-mounted device may include a male connector. The male connector is inserted into the female connector when the devices are coupled together.

Because connector 402 may be blocked once portable electronic device 400 is coupled to head-mounted device 300, portable electronic device 400 may be prevented from interfacing with other devices. To accommodate other devices, head-mounted device 300 can include an adaptor 343 that includes connector 344 on the outside of the head-mounted device 300. As a result, when another device (e.g., a battery) is plugged into connector 344, this device can interface with portable electronic device 400.

After coupling the portable electronic device 400 to the head-mounted device 300, the protocol under which devices communicate may be widely varied. Any suitable communication protocol may be used, such as, for example, a master/slave communication protocol, server/client communication protocol, peer/peer communication protocol, or any combination thereof. For example, using a master/slave communication protocol, one of the devices, the master device, controls the other device, the slave device. For instance, the portable electronic device 400 may become a slave to the head-mounted device 300 such that the head-mounted device controls the operation of the portable electronic device once they are coupled. Alternatively, the head-mounted device 300 can serve as a slave of the portable electronic device 400 by simply implementing actions based on controls from the portable electronic device 400. As another example, using a client/server communication protocol, a server program, operating on either portable electronic device 400 or head-mounted device 300, responds to requests from a client program. As yet another example, using a peer to peer communication protocol, either of the two devices can initiate a communication session.

Generally, the communication session can begin when the two devices are coupled together and powered up. In some cases, the devices may switch immediately into a head-mounted mode once connected. In the head-mounted mode, the size and possibly the resolution of one or more image frames on the screen may be adjusted for viewing at close proximity. In addition, some features can be turned on/off while the settings of other features may be reconfigured differently from normal portable electronic device use. For example, input devices, output devices, sensors, and other electrical systems can be activated or deactivated based on the default settings.

In one embodiment, the user may be provided with an option to set up the head-mounted display system manually. For example, the user may be prompted with a control menu for setting up the head-mounted display system when the devices are coupled together. As another example, the user may be provided with an option to manually set the distance between two image frames that are displayed on the screen (one for each eye). For example, the user may select a control (e.g., rotate a knob) to align the two image frames with his eyes.

Alternatively, if adjustments are difficult for the user, head-mounted device 300 and/or portable electronic device 400 may include mechanisms for automatically configuring the image frame location and size based on default settings. As should be appreciated, each user's eyes are oriented differently. For example, some eyes are located close together while others are more spread out. Thus, either device may include sensors for detecting the distance to the eyes and the position of the eyes. After determining the optimal viewing positions and size of the displayed image frames based on the detected distance and position, the head-mounted display system can adjust the viewing positions. By way of example, the portable electronic device and/or the head-mounted device may include cameras that can reference where the eyes are located relative to the head-mounted device.

The resolution of the displayed image frames can also be adjusted in a similar manner. However, because each user's eyes focus differently, it may be beneficial to allow the user to manually adjust the resolution as this is a more difficult measurement to make.

In one embodiment, the head-mounted display system may include a sensing mechanism for alerting the portable electronic device 400 that the device has been coupled to the head-mounted device 300. As a result, portable electronic device 400 can switch to the head-mounted mode. By way of example, the sensing mechanism may be an electrical connection, a sensor such as a proximity sensor or IR detector, and/or the like. The sensing mechanism may be used instead of or in combination with the communication interface to assist the devices into switching to the head-mounted mode.

In addition, as a result of operatively coupling the devices through wired and/or wireless interfaces, features of the head-mounted device 300 may be extended to the portable electronic device 400, and features of the portable electronic device 400 may be extended to the head-mounted device 300. Furthermore, redundant features may be removed from head-mounted device 300, and enhancement features may be added to head-mounted device 400.

Figure 5:
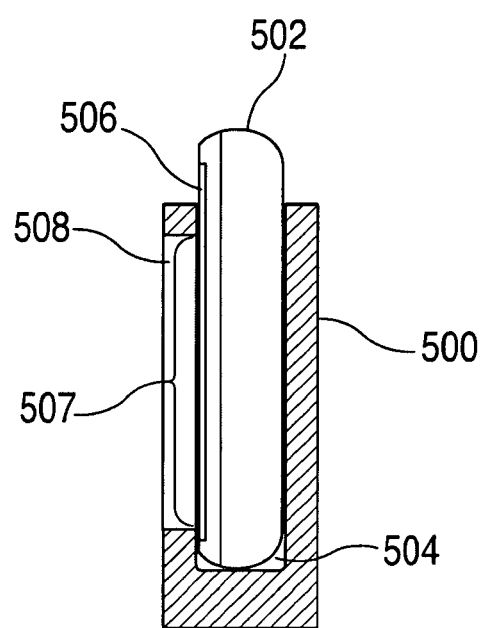
FIG. 5 shows a configuration for sliding a portable electronic device into a head-mounted device in accordance with embodiments of the invention.

FIG. 5 shows a side view of a head-mounted device 500 coupled to a portable electronic device 502 in accordance with an alternate embodiment of the invention. In this embodiment, a portion of the portable electronic device 502 is configured to protrude out of the HMD 500. It can be configured to protrude out of any side including right, left, bottom and top. In the illustrated embodiment, the portable electronic device 502 protrudes out of the top of the HMD 500 (i.e., HMD 500 includes a top slot and a cavity 504 only configured for enclosing a portion of the portable electronic device 502). In this type of configuration, the portion 507 of the display screen 506 positioned behind an opening 508 is utilized for displaying image areas. This is generally not an issue as the size of the image areas is typically much smaller than the overall screen size (i.e., reduced or shrunk so that they can be easily viewed).

Figure 6A:
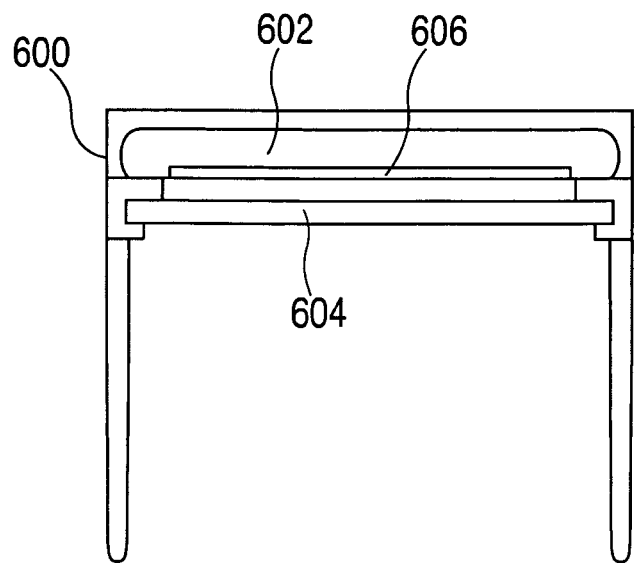
FIGS. 6A and 6B show top views of two exemplary head-mounted display systems in accordance with embodiments of the invention.
Figure 6B:
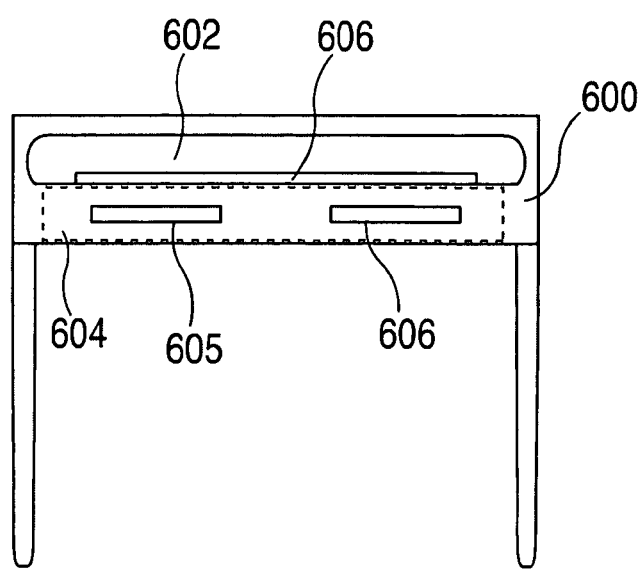

FIGS. 6A and 6B show a top view of a head-mounted device 600 coupled to a portable electronic device 602 in accordance with one embodiment of the invention. This embodiment is similar to the embodiment shown in FIGS. 3 and 4 except that the head mounted device further includes an optical subassembly 604 for helping to provide a better viewing experience. Optical subassembly 604 may be disposed between the screen 606 of the portable electronic device 602 and the user's eyes (e.g., overlaid over at least the viewing portion of the screen). In some cases, the optical subassembly 604 can be located in the region of an opening (e.g., opening 334 of FIG. 3). The optical subassembly 604 may, for example, be disposed behind, within or in front of the opening. The optical subassembly 604 may be supported by a main body (e.g., main body 303 of FIG. 3) and/or a back panel (e.g., back plane 305 of FIG. 3) of the head mounted device 600. For example, the optical subassembly 604 may be attached to the main body via any suitable means including, for example, screws, adhesives, clips, snaps, and the like.

The optical subassembly 604 may be widely varied. For example, the optical subassembly 604 may have a planar configuration. In some cases, the optical subassembly may simply be a transparent window that projects the image based content to the user. The window can be made from any suitable clear material, such as, for example, polycarbonate or glass. In other cases, however, the optical subassembly 604 may be a more complicated system of optical components that may be configured to adjust image based content playing on the portable electronic device so that the image based content can be viewed at close proximity (e.g., help focus the user's eyes on the image based content being displayed on the screen of the portable electronic device)

The optical subassembly 604 may include various optical components that may be static or dynamic components depending on the needs of the system. The optical components may include, for example, lenses, light guides, light sources, mirrors, diffusers, optics, lasers or any other suitable optical component. Specific examples of optical subassemblies may include aspherical and diffractive optical arrangements. Aspherical optical arrangements may include various types of prism and/or lens arrangements (e.g., a coaxial arrangement of lenses, a coaxial arrangement of a set of lenses arranged along a common axis, a concave mirror arrangement, and a free shaped prism arrangement). Diffractive optical arrangements may include various types of arrangements that bend and spread light (e.g., a light-guided optical element, or a binocular light-guided optical element, both of which can be made of planar transparent glass or plastic). A more detailed discussion on processing and displaying image frames using optics in a head-mounted device can be found, for example, in Tang, U.S. Published Patent Application No. 2008/0088529, published Apr. 17, 2008, entitled "Enhanced Image Display in Head-Mounted Displays," which is incorporated by reference in its entirety, and in Tang et al., U.S. Published Patent Application No. 2007/0201737, published Aug. 30, 2007, entitled "Peripheral Treatment for Head-Mounted Displays," which is also incorporated by reference in its entirety. A discussion on the use of laser and optics to process image frames on head-mounted devices can be found in Tang, U.S. Published Patent Application No. 2008/0088937, published Apr. 17, 2008, entitled "Head Mounted Display System," which is hereby incorporated by reference in its entirety.

The optical subassembly 604 may include one or more optical interfaces that may be operative to adjust or modify displayed image frames based on any suitable criteria (e.g., as standalone modules or using a circuit board). For example, the optical subassembly may include a single optical interface (as shown in FIG. 6A). In one implementation, the optical subassembly 604 can be formed as a panel that overlays the opening. The panel may be curvilinear and/or rectilinear. For example, the optical subassembly 604 may be a thin flat panel that can be easily carried by the main body and easily supported on a user's head. As another example, the optical subassembly may include several optical interfaces 605 and 606 (e.g., one for each eye as shown in FIG. 6B).

The optical interface(s) may also be adjustable. For example, the optical interface(s) may be operative to resize or otherwise modify image frame(s) such that the image frame(s) appears to be displayed at a greater distance than the distance between the optical interface(s) and the user's eyes (e.g., the image frame(s) appears to be viewed from 4 meters and not 20 mm). As another example, optical interface(s) may be operative to generate displays that correspond to standard definition or high definition displays.

In some embodiments, left and right optical interfaces 605 and 606 may generate and display different image frames associated with the image based content. For example, left and right optical interfaces 605 and 606 (e.g., upon receiving appropriate instructions from the head-mounted device or portable electronic device) may offset the left and right image frames so that the user is given the illusion of viewing image based content in three dimensions. The left and right optical interfaces 605 and 606 may identify the appropriate left and right image frames using any suitable approach, including, for example, receiving separate left and right image frames from the imaged based content source. Alternatively, the left and right optical interfaces 605 and 606 may generate the left and right image frames from a single image frame provided by the image based content source.

In one implementation, left and right optical interfaces 605 and 606 may adjust the displayed image frames to account for limitations or corrections (e.g., by glasses or contact lens) of the user's eyesight. For example, if a user is myopic in one eye, the optical interface associated with that eye may modify the image frame displayed to correct for the user's myopia. The head-mounted display system may determine the correction required for each eye using any suitable approach. For example, the user may enter a glasses or contact lens prescription that indicates the required correction. As another example, each optical interface may automatically analyze the user's eyes, and determine the adjustment needed based on the analysis. This may allow users who normally wear glasses to use the head-mounted display system without their glasses.

In some embodiments, if the portable electronic device 602 is operative to adjust image based content for viewing at close proximity, the head-mounted device 600 may not include an optical subassembly. In such embodiments, the display screen of head-mounted device can serve as a clear cover for the screen of the portable electronic device. The display capabilities of the head-mounted device and the portable electronic device will be described in more detail in connection with FIGS. 11A-11F.

Figure 7:
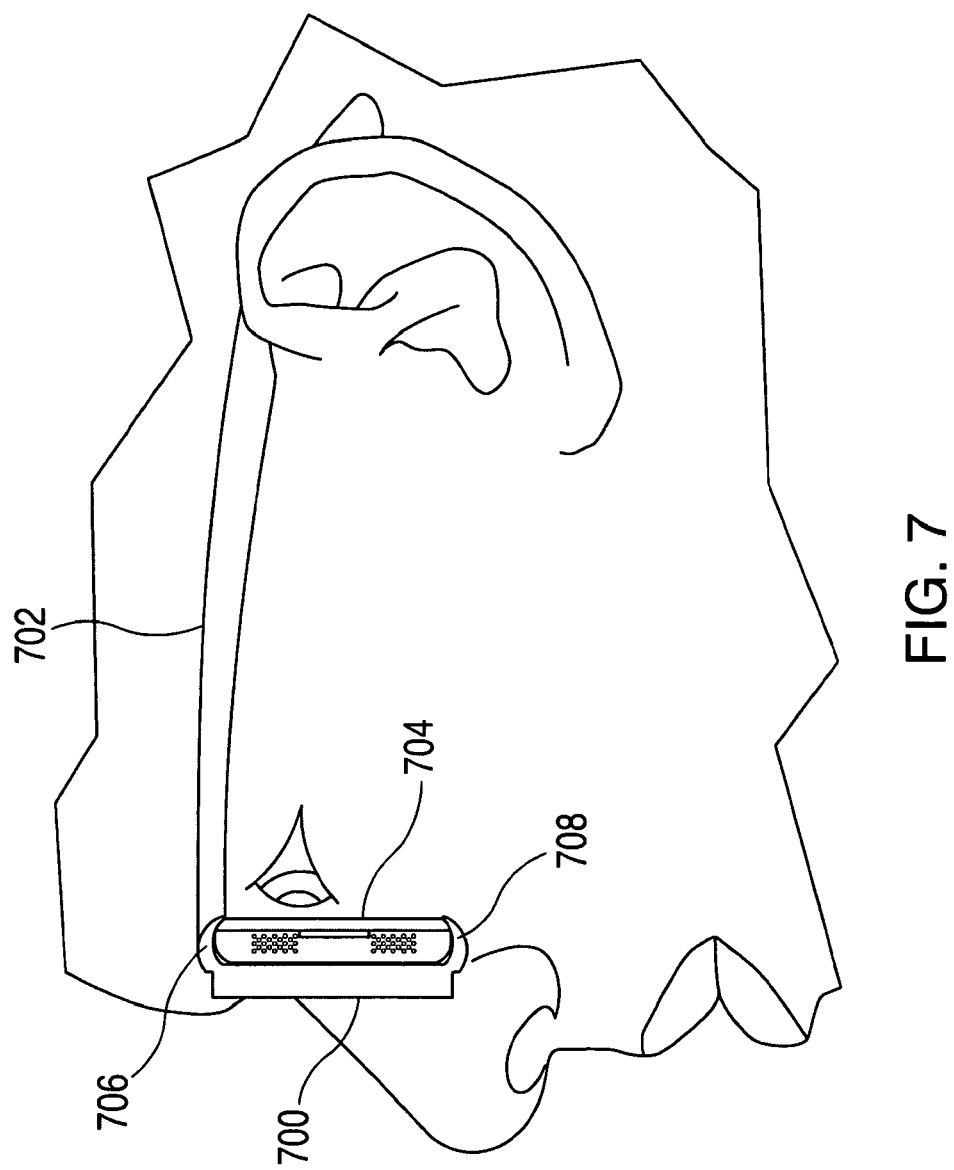
FIG. 7 shows a side view of a head-mounted device coupled to a portable electronic device in accordance with embodiments of the invention.

FIG. 7 shows a side view of a head-mounted device coupled to a portable electronic device in accordance with one embodiment of the invention. Head-mounted device 700 can include eyeglass temples 702, which allows the user to wear head-mounted display system 700 by putting eyeglass temples 702 over his ears. Thus, instead of sliding the portable electronic device 704 into the head-mounted device 700, as shown in the previous embodiment in FIG. 4, the portable electronic device can be coupled to the head-mounted device using clips.

In some embodiments, head-mounted device 700 can include top clip 706 and bottom clip 708 to hold portable electronic device 704 in place in front of the user's eyes. In the embodiment shown in FIG. 7, the screen of portable electronic device 704 may face the user's eyes.

Clips 706 and 708 can be formed from any suitable material, such as for example plastic, rubber, and foam. In some embodiments, clips 706 and 708 can follow the contours of portable electronic device 704. The user may place portable electronic device 704 into head-mounted device 700 by snapping portable electronic device 704 into bottom clip 708. The user can then rotate portable electronic device 704 until the rest of the device fits into clips 706 and 708 (e.g., following an elastic deformation of at least one of clips 706 and 708). In some embodiments, the user may slide portable electronic device 704 into clips 706 and 708.

A side cover (not shown) located on either side of head-mounted device 700 may include a complementary connector that can be coupled to a connector of portable electronic device 704 (e.g., connector 512 of FIG. 5). For example, the side cover may be a door that swings from an open position allowing portable electronic device 704 to be inserted. Once portable electronic device 704 has been inserted, the side cover may close and the complementary connector can be coupled to portable electronic device 704.

Figure 8A:
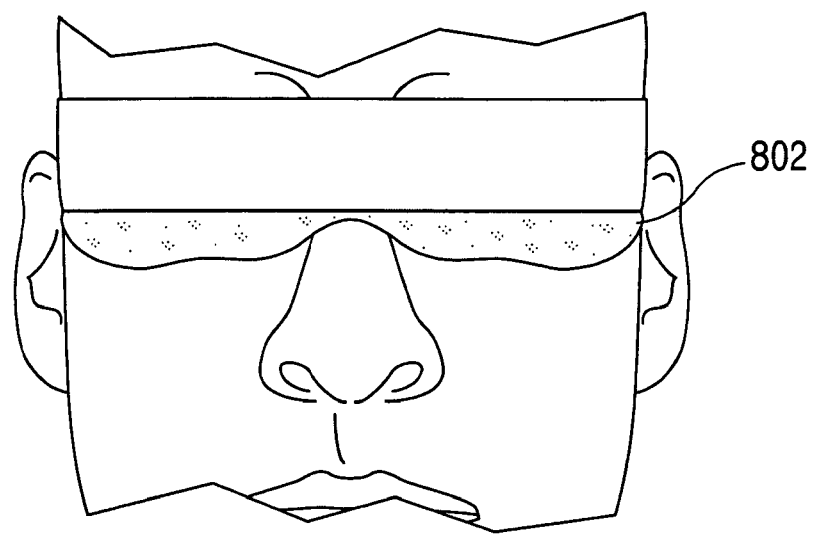
FIGS. 8A-8D show illustrative features for exemplary head-mounted devices in accordance with embodiments of the invention.

The head-mounted device can include any suitable feature for improving the user's comfort or ease of use when the portable electronic device is coupled to the head-mounted device. FIGS. 8A-8D show illustrative features for exemplary head-mounted devices. FIG. 8A shows a head-mounted device that includes foam 802 on at least a lower portion of the device. Foam 802 can be made from any foam or material that can deform or substantially comply with the user's face (e.g., nose) thus improving the user's comfort. In some cases, the foam 802 is placed at the location where the frame engages the nose (e.g., nose cut out). In other cases, the foam is placed continuously or selectively across the entire bottom edge that engages the nose and face. Still further, the foam may be placed continuously or selectively across the entire edge of the frame that engages the nose and face (upper, side and lower portions). In fact, in some implementations, because the material is deformable, the bottom surface of the head-mounted device can be flat when the device is not being worn (e.g., no nose cut out).

Foam 802 can be used to prevent ambient light from entering between the user's face and the head-mounted device (e.g., provides a seal between the frame and the user's face). Additionally, foam 802 can be used to reduce the load on the user's nose because the portable electronic device can be relatively heavy. In some cases, foam 802 can serve to increase a user's comfort with the head-mounted device by helping to center the head-mounted device on the user's face. Alternatively or additionally, the head-mounted device may include a shroud (not shown) that helps enclose the viewing experience. The shroud may, for example, be one or more shaped panels that fill and/or cover the air gaps normally found between the frame and the user's face. In fact, the deformable material may be applied to the shroud.

Figure 8B:
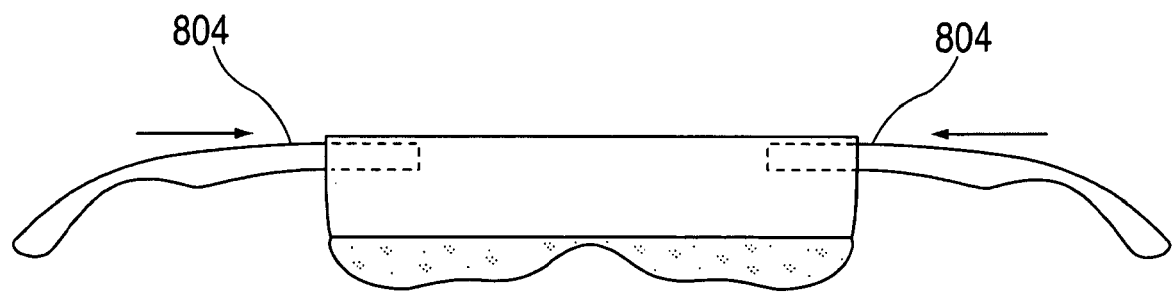

In some embodiments, the head-mounted device can serve a secondary purpose for the portable electronic device. For example, FIG. 8B shows a head-mounted device that has adjustable eyeglass temples. In the embodiment shown in FIG. 8B, eyeglass temples 804 can slide or fold into the frame of the head-mounted device. As a result, the head-mounted device can serve as a case for the portable electronic device. In this embodiment, the frame may include one or more slots for receiving both of the eyeglass temples. The ends of the eyeglass temples may be configured to prevent the temples from exiting the slot, and, at the same time, allow the temples to pivot when the user wants to wear the device. By way of example, the ends of the eyeglass temples may include a pivot pin that is sized larger than the slot opening.

Figure 8C:
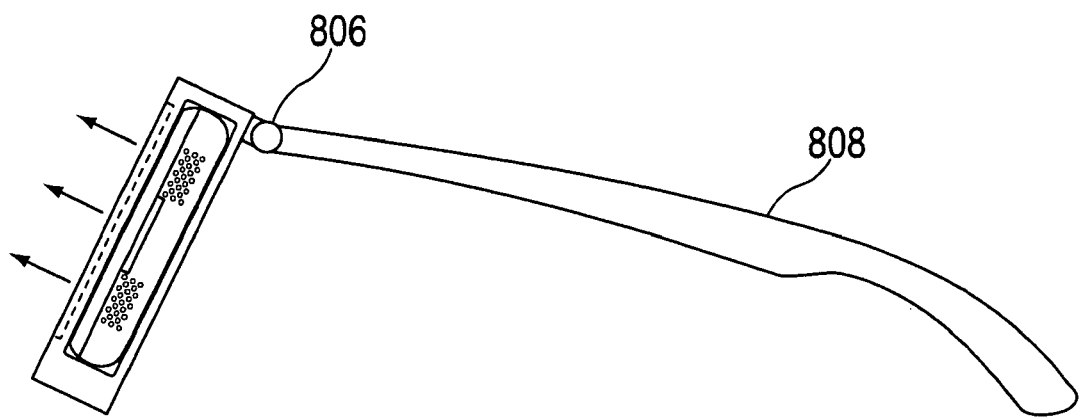

FIG. 8C shows a head-mounted device that has an adjustable frame. In the embodiment shown in FIG. 8C, the frame of the head-mounted device can rotate toward the user. For example, the head-mounted device can have pivot bearing 806 (e.g., hinges) connecting the frame and eyeglass temples 808. Pivot bearing 806 can allow the frame to rotate around eyeglass temples 808. As a result, the head-mounted device can serve as a display stand for the portable electronic device if the user decides not to wear the head-mounted device.

Figure 8D:
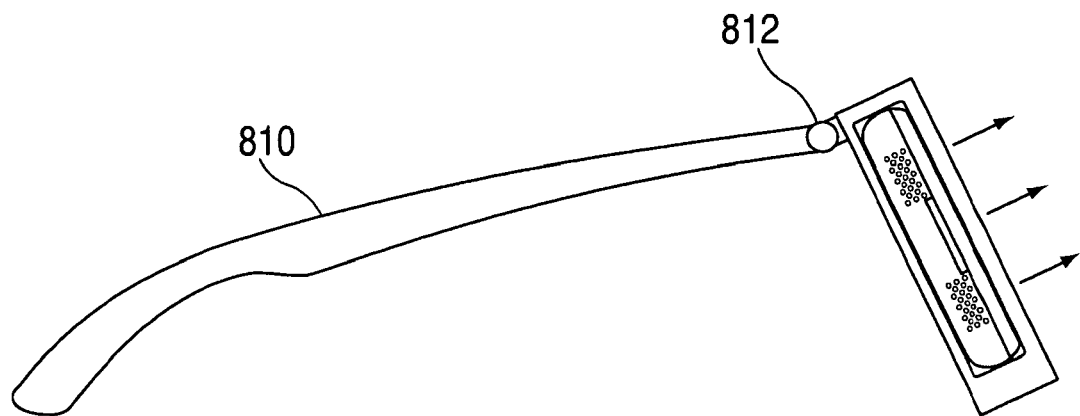

FIG. 8D shows a head-mounted device that has eyeglass temples that can rotate. In the embodiment shown in FIG. 8D, eyeglass temples 810 can rotate around the frame of the head-mounted device so that the head-mounted device can serve as a display stand. For example, the head-mounted device can have pivot bearing 812 (e.g., hinges) connecting the frame and eyeglass temples 810. Pivot bearing 812 can allow eyeglass temples 810 to rotate around the frame.

The head-mounted display system may display image frames in various modes depending on the manner in which it is being used. For example, when the head-mounted device is being worn, the system may adjust the screen for viewing at close proximity (e.g., by splitting the screen into one or more smaller image frames). On the other hand, when the head-mounted device is used as a display stand, the system may provide a single large image frame by maximizing the screen dimensions.

Figure 9A:
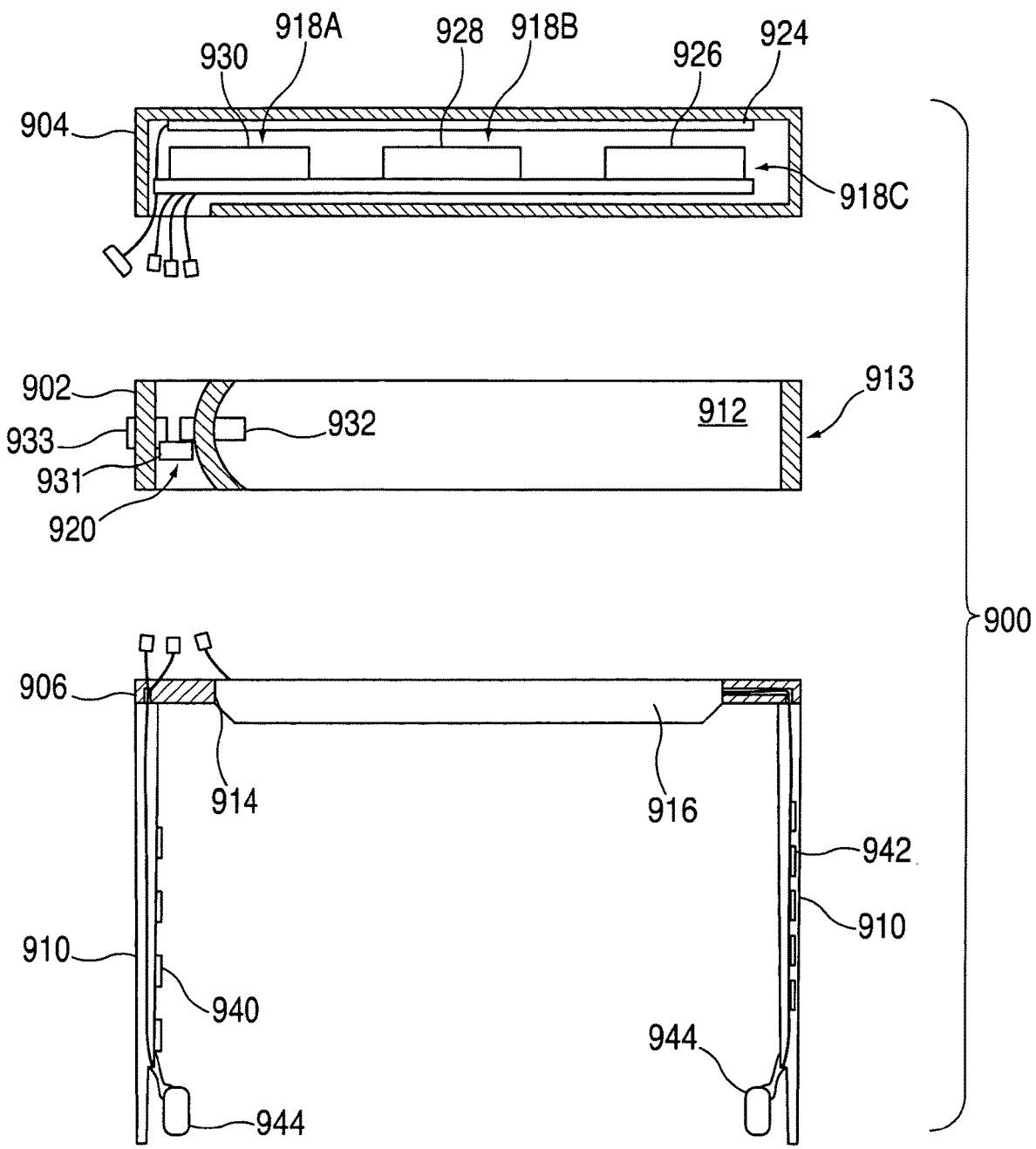
FIGS. 9A-9C show a head-mounted device in accordance with embodiments of the invention.
Figure 9B:
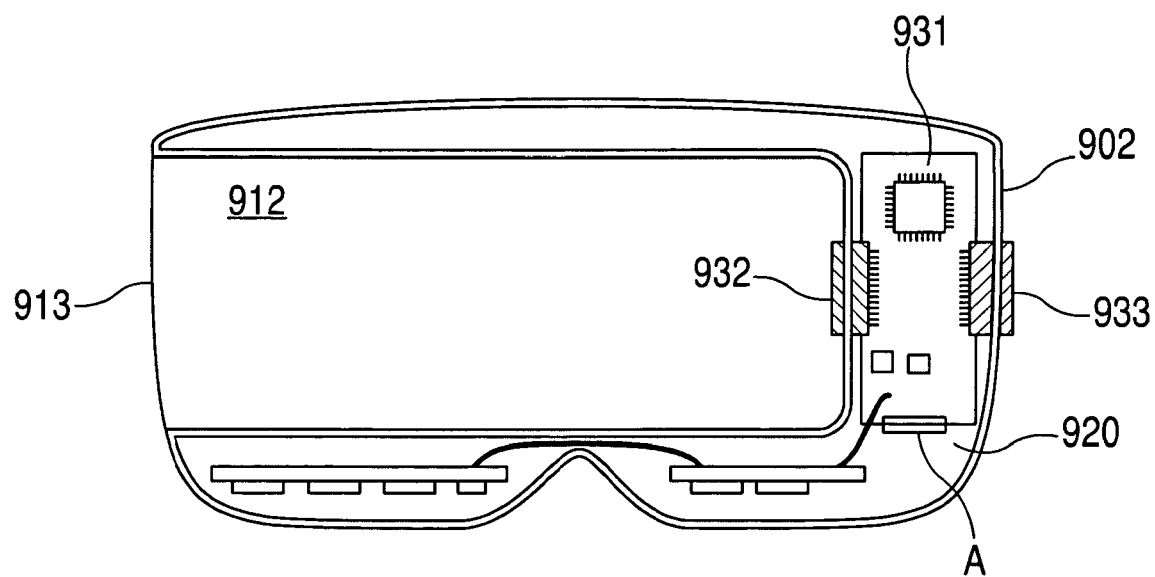
Figure 9C:
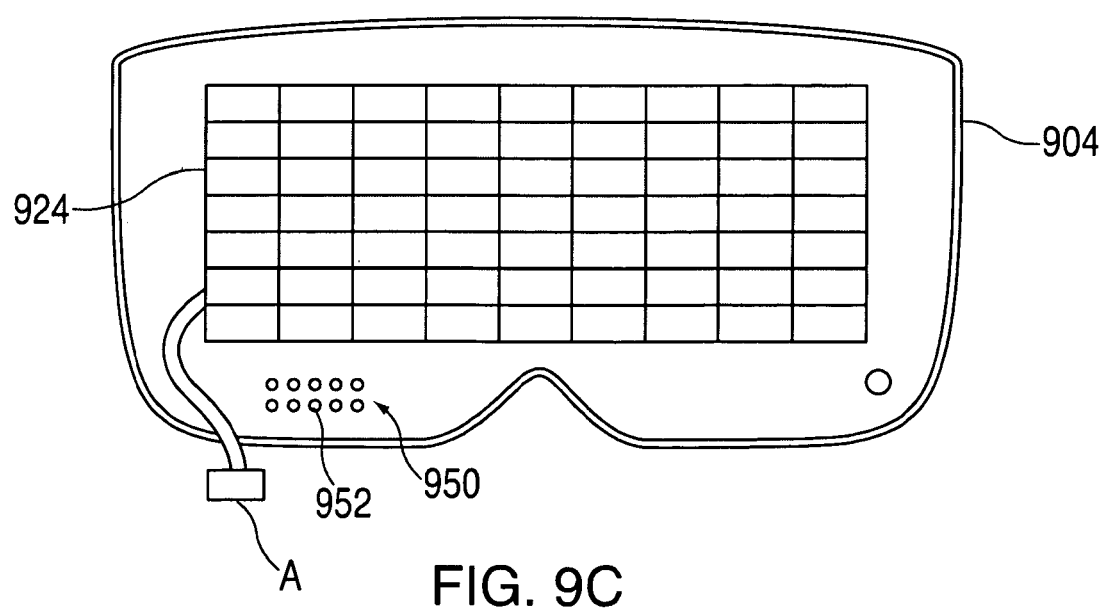

FIGS. 9A-9C illustrate a head-mounted device 900 in accordance with another embodiment of the present invention. The head-mounted device 900 may, for example, correspond to any of those embodiments previously described. In one embodiment, the head-mounted device 900 does not include a primary display and instead relies on the display of a portable electronic device to provide image-based content to a user. The head-mounted device 900 can include a main body 902 to which a front panel 904 and a rear panel 906 are attached to form the frame of the head-mounted device 900. The head-mounted device can also include eyeglass temples 910 for helping support the head-mounted device on the user's head. The eyeglass temples 910 are moveably attached to the frame 902. FIG. 9A is a top elevation view of the entire assembly. FIG. 9B is a front elevation view with the front panel removed. FIG. 9C is a rear elevation view of the front panel.

As shown, the main body 902 defines a cavity 912 and a slot opening 913 for receiving a substantially flat small form factor portable electronic device. The front panel 904, main body 902 and rear panel 906 cooperate to form various enclosed spaces for various electronic components and wiring of the head-mounted device 900. As shown, these members may form at least a front space 918 and a side space 920.

The main body 902 also includes one or more openings 914 through which image based content is displayed when a portable electronic device is disposed within the cavity 912 (e.g., the screen of the portable electronic device is placed behind the opening). The rear panel 906 and/or the main body 902 can be configured to carry an optical subassembly 916 placed in front of the opening 914. The optical subassembly may help in viewing the image based content being displayed by a portable electronic device.

As shown in FIG. 9B, the front space 918 can be broken up into a variety of zones. In this particular implementation, the front space includes three zones 918A, 918B and 918C. Each of these zones can include a variety of electrical and mechanical components including but not limited to batteries, processors, circuit boards, cooling systems, memory, sensors, I/O, and the like. In the illustrated embodiment, the spaces include a touch sensor 924, camera 926, battery 928 and cooling system 930.

As further shown in FIG. 9B, the side space can also include a variety of electrical and mechanical components as mentioned above. In the illustrated embodiment, the side space includes a main circuit board 931 that can be broken up into multiple boards if needed. The main circuit board 931 is configured to carry a connector 932 that protrudes into the cavity 912 opposite the slot opening 913. The main circuit board 931 can also carry a variety of controls 933 that protrude outside the side wall of the main body 902. The main circuit board 931 can also carry a variety of chips including processors, memory (flash) and the like. The main circuit board 931 may be operatively coupled to each of the electrical components via wires, traces and/or flex circuits depending on the needs of the system (these are shown by solid dark lines for ease of illustration)

As shown in FIGS. 9A and 9B, the temples 910 are coupled to the side of the main body 902. Although the location may vary, in the illustrated embodiment, the temples are connected towards the center of the frame in order to better align the optical sub assembly with a user's eyes. The connection point between the ends of the temples 910 and the main body 902 may include a through hole for passing wires, traces and/or flex circuits. These elements connect to various electrical components carried by the temples 910. The electrical components may be widely varied. In the illustrated embodiment, the temples include a series of spaced apart haptic mechanisms 940. The temples 910 can also include a touch sensor 942, which can be used as a control (e.g., controlling the volume by sliding a finger across touch sensor 942). The temples can also include a speaker 944 for each ear. The speakers may be housed within earpieces that fit inside the user's ear. Alternatively, the speakers may include a grill proximate the location of the ear.

As shown in FIG. 9C, the front panel includes a touch sensing layer 924 on its inside surface. The touch sensing layer 924 may be a capacitive touch sensing layer. In this particular embodiment, the front panel may be formed from a dielectric material such as plastic. The touch sensing layer 924 may, for example, be integral with or embedded on a surface layer such as a flex circuit or printed material. The touch sensing layer 924 may couple to the main circuit board 931 through wires, traces and/or flex circuits. It may, for example, include a connector/wire for interfacing with the main circuit board 931. The front panel can also include a vent region 950. The vent region 950 may be a series of ports 952 through which heat may be distributed as, for example, via a cooling mechanism such as a fan.

The front panel, main body and rear panel may couple via any suitable technique including but not limited to adhesives, fasteners, snaps, clips, locks, or any combination thereof.

Figures 10A, 10B:
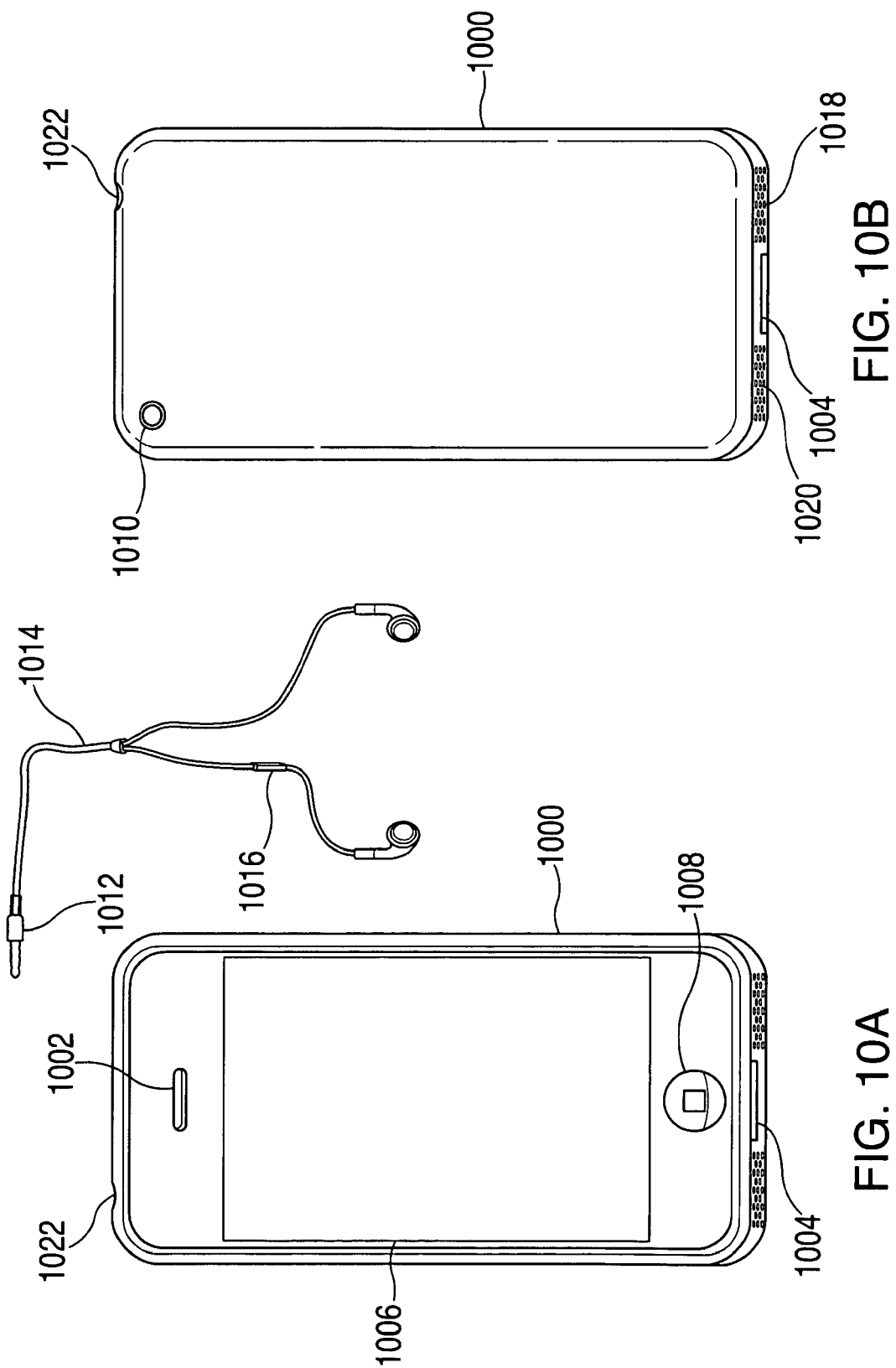
FIGS. 10A and 10B shows an exemplary portable electronic device in accordance with embodiments of the invention.

FIGS. 10A and 10B illustrate an exemplary portable electronic device that may be used in any of the head-mounted devices described herein. It is particularly applicable to the embodiment shown in FIGS. 3-5. In this embodiment, the portable electronic device is a handheld electronic device. Thus, it has a small form factor that can be easily managed by a head-mounted device.

Portable electronic device 1000 can include receiver 1002, which can include any component operative to receive electric signals and convert the signals into sound for a user. For example, a speaker included in receiver 1002 can be used to broadcast sound to the user. A head-mounted device may include an acoustical component that interfaces with the receiver. A head-mounted device may also include a redundant receiver on one of its external surfaces or in an earphone.

Portable electronic device 1000 can include connector 1004, which can be plugged into a complementary connector on another device. Any suitable device can be coupled to portable electronic device 1000, such as, for example, an accessory device, host device, external power source, or any combination thereof. A host device can be, for example, a desktop or laptop computer or data server from which portable electronic device 1000 can receive image based content files. Persons skilled in the art will appreciate that connector 1004 can be any suitable connector, such as USB, FireWire and/or 30-pin connector available from Apple Inc. of Cupertino, Calif. A head-mounted device may include a complimentary connector such that the head-mounted device and the portable electronic device can be operatively coupled when the portable electronic device is mounted relative to the head-mounted device.

Portable electronic device 1000 can include screen 1006 for displaying image based content to a user. Screen 1006 can enable portable electronic device 1000 to play back the video portion of media, display images or command menus, or serve any other suitable display function. Although screen size can be widely varied, in the illustrated embodiment, the screen size is configured to fill a majority of the front surface of the portable electronic device (e.g., substantially full screen). In one embodiment, the screen is a high resolution screen. This may enable head-mounted device viewing. In one example, the screen may operate in a first resolution for portable electronic device viewing (e.g., normal viewing mode) and a second resolution for head-mounted device viewing. The second resolution for head-mounted device viewing may be higher than the first resolution for portable electronic device viewing. For example, head-mounted device viewing may operate in high resolution while portable electronic device viewing may operate in medium resolution. In one particular embodiment, screen 1006 is utilized as the primary screen when the portable electronic device is coupled to the head-mounted device.

In some cases, screen 1006 may be a multi-touch screen that may function as both an integrated display screen and as a user input device. Some embodiments of multi-touch screens are discussed in more detail in commonly assigned Westerman et al., U.S. Pat. No. 6,323,846, issued Nov. 27, 2001, entitled "Method and Apparatus for Integrating Manual Input," which is incorporated by reference herein in its entirety.

Portable electronic device 1000 can include button 1008, which can be used in conjunction with screen 1006. Button 1008 can be used, for example, to turn on screen 1006 or return to a display screen on screen 1006 (e.g., a home screen or springboard) Persons skilled in the art will appreciate that additional buttons and/or other user input devices may be used without departing from the spirit of the present invention.

Portable electronic device 1000 can include camera 1010, which can capture image based content (e.g., images or video) of the outside world. In some embodiments, when camera 1010 is activated, the image based content can be displayed on screen 1006. The user may take a picture or capture a video using any suitable approach, including, for example, by pressing button 1008 or selecting an option on screen 1006.

Portable electronic device 1000 can include speaker 1018, which can be used to provide the user with audio when headphones 1014 are not connected to portable electronic device 1000. For example, in hands-free operation (e.g., speakerphone mode), speaker 1018 can allow the user to hear the voice of the other speaker during a telephone conversation. As another example, speaker 1018 can allow the user to hear the sound of image based content during playback.

Portable electronic device 1000 can include microphone 1020, which can be used to receive sounds when headphones 1014 are not plugged into portable electronic device 1000.

Portable electronic device 1000 can include audio/video connector 1022 for connecting to audio plug 1012. Audio plug 1012 can be used to physically and electrically couple portable electronic device 1000 and headphones 1014 together. For example, once audio plug 1012 is inserted into audio/video connector 1022, audio from portable electronic device 1000 can be transmitted to headphones 1014 instead of receiver 1002. In some embodiments, headphones 1014 can include microphone 1016 for receiving ambient sound. For example, microphone 1016 can be used to receive the user's voice while the user is conducting a telephone conversation while wearing headphones 1014. As another example, microphone 1016 can allow the user to provide voice commands to portable electronic device 1000.

Although not shown, portable electronic device 1000 can include various switches and/or buttons such as, for example, volume switches, hold switches, mute switches and the like. In addition, portable electronic device 1000 can include other input/output devices such as proximity sensors, accelerometers, light sensors and the like. By way of example, a proximity sensor may be used to detect objects that are nearby. As discussed, a head-mounted device may include redundant features such as these, and/or provide access to these features, for example, via openings or holes.

The screen of the portable electronic device may be widely varied and as such so may the head-mounted device configured for receiving the portable electronic device (as mentioned above). In one implementation, the screen of the portable electronic device may be a full screen display that extends across the entire front surface of the device. In another implementation, the screen of the portable electronic device may be a substantially full screen display such that a majority of the screen fills the front surface of the portable electronic device. In yet another implementation, the screen may be a partial screen display. For example, the partial screen display may only be oriented in the upper half of the portable electronic device. As another example, the partial screen display may be symmetrically centered on the front surface, or alternatively the partial screen display may be offset towards one side. In all of these implementations, the entire screen or portions of the screen can be covered to provide the desired screen size and/or shape for enhanced viewing experience.

When the portable electronic device is coupled to the head-mounted device, the distance of the screen relative to the user's eyes may be widely varied. In small form factor head-mounted devices (low profile), the screen of the portable electronic device may be placed fairly close to the user's eyes. The placement of the screen may be controlled by the surfaces of the cavity and, more particularly, the walls of the cavity.

Because the screen may be too large when compared to the viewing distance, the head-mounted display system may be configured to adapt the image based content displayed on the screen so that it can be easily and properly viewed (e.g., image based content stored on the head-mounted device or the portable electronic device, or image based content from a camera).

FIGS. 11A-11F show several examples of creating image frames within a display screen in a head-mounted display system when in a HMD mode.

In FIG. 11A, the head-mounted display system has adjusted the size of the image based content (image frame 1102) to be less than the size of the screen 1104 on portable electronic device 1106. In one implementation, the size of image frame 1102 is configured to fill the entire field of view of the user. In another implementation, the size of image frame 1102 is configured to be less than the field of view of the user.

In some cases, the head-mounted display system may also adjust the resolution of the viewable image based content. For instance, the resolution may be increased or decreased relative to normal portable electronic device viewing to compensate for how close the eyes are to the display screen of the head-mounted device.

Image frame 1102 can also have different aspect ratios depending on the primary application of the displayed content. For example, an aspect ratio of 4×3 (e.g., similar to a television screen) may be used for television programs, whereas an aspect ratio of 16×9 (e.g., similar to a movie theatre screen) may be used for watching feature films.

It should also be emphasized that the head-mounted display system is not limited to displaying one image frame. In some cases, it may be beneficial to provide multiple image frames (e.g., two image frames) to implement stereoscopic imaging (see, for example, FIGS. 11B-11F). Stereoscopic imaging attempts to create depth to the image frames by simulating the angular difference between the image frames viewed by each eye when looking at an object, due to the different positions of the eyes. This angular difference is one of the key parameters the human brain uses in processing images to create depth perception or distance in vision.

In one example, a single source image frame, which can be provided by the head-mounted device, portable electronic device or an external medium, is processed (either by the head-mounted device or the portable electronic device) to generate a left image frame and a right image frame for viewing. As a result, the left and right image frames may be displayed at two locations within the display screen. The timing or image characteristics of these two image frames relative to one another may be varied to provide an enhanced viewing effect and an immersive experience for the user. For example, one image frame can be offset from the other image frame so that the user is given the illusion of viewing image based content in three dimensions. Persons skilled in the art will appreciate that the head-mounted display system can identify the appropriate left and right image frames using any suitable approach. A more detailed discussion of adjusting image frames on a head-mounted device can be found in Prest et al., U.S. patent application Ser. No. 12/114,499, filed on May 2, 2008, entitled "Head-Mounted Display," while is hereby incorporated by reference in its entirety.

FIG. 11B shows a back view of ahead-mounted display system for providing two image frames in accordance with one embodiment of the invention. Head-mounted display system 1108 can provide a primary image frame on the display screen. The primary image frame can include left image frame 1110 and right image frame 1112 opposite the user's left and right eye, respectively.

In some embodiments, a portable electronic device that is coupled to head-mounted device 1114 can create or generate distinct left and right image frames 1110 and 1112 for display by the head-mounted device. The portable electronic device can separate or distinguish left and right image frames 1110 and 1112 using any suitable approach. For example, the portable electronic device can display left and right image frames 1110 and 1112 adjacent on the screen of the portable electronic device (e.g., with no separating element on the screen), such that limitations to the user's field of view (e.g., due to the user's nose) may allow the user to distinguish the image frames. As another example, the portable electronic device can separate left image frame 1110 and right image frame 1112 by displaying a black overlay over an area between or adjacent the periphery of the two image frames (e.g., area 1116). This may enhance a user's experience by giving the user the impression of being in a theater or other optimal environment for viewing image based content. As yet another example, the head-mounted device can include a black stencil defining image frames in the display screen for left image frame 1110 and right image frame 1112. Persons skilled in the art will appreciate that any suitable overlay (e.g., theater walls, textual overlay, or outline of other viewers) can be used in area 1116 to enhance the user's viewing experience. A more detailed discussion on the use of overlays for head-mounted devices can be found, for example, in Tang, U.S. patent application Ser. No. 12/072,762, filed on Feb. 27, 2008, entitled "Adjusting Media Display in a Personal Display System Based on Perspective," which is incorporated by reference in its entirety.

In most cases, left and right image frames 1110 and 1112 and image frame 1102 of FIG. 11A are typically centered within the primary image frame. However, in some cases, it may be desirable to adjust the position of the image frames within the primary image frame in order to better align the image frames to the user's eyes (align or center the displayed image frames relative to where the eyes should be or to where the eyes actually are). As should be appreciated, each user's eyes are oriented differently. For example, some eyes are located close together while others are more spread out.

The alignment may be based on a particular location relative to the head-mounted device and/or based on the position of the user's eyes relative to the screen. For example, the image frames may be centered relative to a nose support of the frame. As another example, either device (the head-mounted device or the portable electronic device) may include sensors (e.g., optical sensors) for detecting the distance to the user's eyes and the location of the user's eyes. By way of example, the portable electronic device and/or the head-mounted device may include cameras that can reference where the user's eyes are located relative to the head-mounted device. Alternatively, the portable electronic device may become a slave to the head-mounted device such that the head-mounted device controls the operation of the portable electronic device once it is inserted into the head-mounted device.

The two image frames may be adjusted in any suitable manner. For example, as shown by arrows in FIG. 11C, the position of the two image frames may be adjusted together. As another example, as shown by arrows in FIG. 11D, the position of the two image frames may be adjusted relative to one another. For instance, one may be adjusted upward while the other may be adjusted to the right.

Figure 11E:
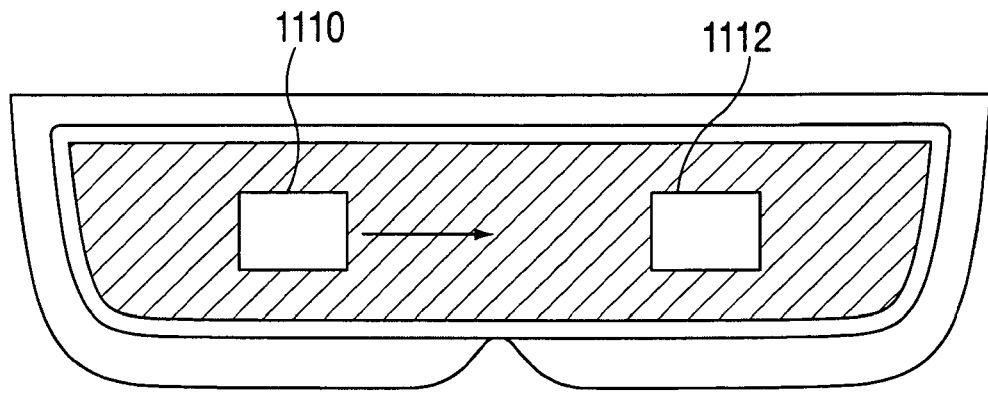
Figure 11F:
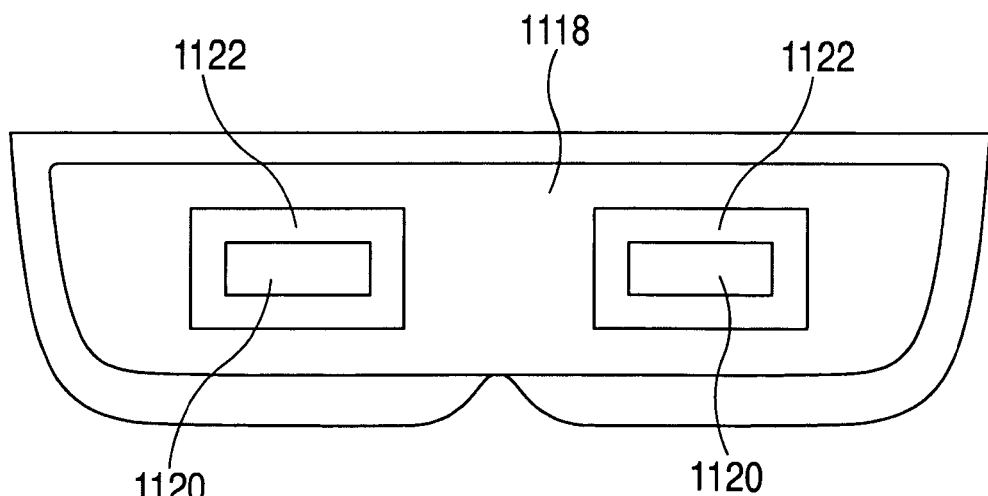

As yet another example, only one of the two image frames may be adjusted (e.g., if the portable electronic device is coupled to the head-mounted device such that the screen of the portable electronic device is aligned with one of the user's eyes). FIG. 11E shows an example where only a portion of the portable electronic device is received by the head-mounted device. In this embodiment, the lower portion of the screen is utilized to show the two image frames within the primary image frame. Furthermore, although not shown, the orientation of each image frame may also be adjusted together or separately (rotation).

If the screen of the portable electronic device is larger than the separation between the user's eyes, the portable electronic device can directly display the image based content to the user without using additional components on the head-mounted device. For example, a sensor on the portable electronic device can detect the location of the user's eyes. Based on the distance, the portable electronic device can align left image frame 1110 with the left eye of the user and right image frame 1112 with the right eye of the user.

If instead the screen of the portable electronic device is smaller than the separation between the user's eyes, an optical subassembly (e.g., optical subassembly 604 of FIG. 6) can be used to adjust the image frames provided by the portable electronic device for viewing at close proximity.

The optical subassembly, which can be located between the user's eyes and the screen of the portable electronic device, can receive one or more image frames from the portable electronic device. For example, the optical subassembly can receive left image frame 1110 and right image frame 1112 from the portable electronic device. A sensor on the head-mounted device can then detect the interpupillary distance between the user's eyes. Based on the interpupillary distance, the optical subassembly can shift at least one of left image frame 1110 and right image frame 1112 to align with the user's eyes.

In some embodiments, the optical subassembly can take a single image received from the portable electronic device and produce two image frames from the single image frame. For example, the optical subassembly can include two optical interfaces (e.g., optical interfaces 605 and 606 of FIG. 6), which are each capable of generating and displaying an image frame (left image frame 1110 or right image frame 1112) from a single image frame. Persons skilled in the art will appreciate that the optical interfaces can be configured to properly align left image frame 1110 and right image frame 1112 with the user's eyes. Persons skilled in the art will also appreciate that the optical interfaces can produce any suitable overlay for area 1116.

Moreover, the resolution of the left and right image frames 1110 and 1112 can also be adjusted. For example, the resolution of each image frame may be increased to compensate for how close the eyes are to the display screen. Additionally, left and right image frames 1110 and 1112 can also have different aspect ratios depending on the primary application of the displayed content.

In some embodiments, the display screen (e.g., the display screen of the head-mounted device or the screen of the portable electronic device) can be utilized to extend the view of the displayed image based content. For example, if the display screen is larger than the reduced sized image frame (s), portions of the display screen surrounding the image frame(s) may be used to extend the feel of the displayed image frame(s) to produce secondary effects (e.g., enhanced viewing effects). The extended portions may be colors associated with the edge of the displayed image frame.

The secondary effect may be continuous or segmented (e.g., the effect may extend from all edges or just corners). The characteristics of the secondary effect, including speed, can also be adjusted to produce distinct effects. Alternatively or additionally, the image frames may be made larger and smaller to produce a viewing effect. Other examples include shaking, shifting, etc. See, for example, FIG. 11F which shows a display screen 1118 broken up into a set of two primary image regions 1120 (e.g., showing the image based content) and a set of secondary visual effect regions 1122. The secondary visual effect regions 1122 surround at least a portion of each of the primary image regions, and extend and provide enhancements to the images displayed in the primary image regions.

In some embodiments, the head-mounted display system can operate in an internal viewing mode in which stored image based content can be provided for the user's viewing pleasure. The internal viewing mode is set up to configure the portable electronic device for playback of stored image based content. For example, the portable electronic device can play back the stored image based content, and the head-mounted device can provide the stored image based content in the left and right image frames (e.g., left image frame 1110 and right image frame 1112 of FIG. 11B).

The head-mounted display system may enable the internal viewing mode at any suitable time. In some embodiments, the head-mounted display system can automatically begin to operate in the internal viewing mode when the portable electronic device is first coupled to the head-mounted device. For example, the head-mounted display system can include a sensing mechanism for alerting the portable electronic device that it has been inserted into a head-mounted device. Once alerted, the portable electronic device can place itself in the internal viewing mode. In some embodiments, the head-mounted display system can enable the internal viewing mode in response to a user instruction (e.g., selecting an appropriate control on the head-mounted device or the portable electronic device).

Typically, while the head-mounted display system is operating in the internal viewing mode, the user may have limited awareness of the outside world. For example, when the user is watching stored image based content on a head-mounted display system, the user may be unaware when someone approaches him and asks a question. As a result, the head-mounted display system may allow the user to interact with his surroundings by operating in an external viewing mode.

In the external viewing mode, a detecting mechanism (e.g., a camera on the portable electronic device such as camera 1010 of FIG. 10B or a separate camera disposed on the outside of the head-mounted device such as camera 306 of FIG. 3A) can provide for viewing outside of the head-mounted device when the user is wearing the device. For example, the detecting mechanism can provide external image based content (e.g., images or video) of the user's surroundings which can be displayed to the user (e.g., in left image 1110 and right image 1112 of FIG. 11B). As a result, the user may see his surroundings while wearing the head-mounted display system.

The head-mounted display system can enable the external viewing mode using any suitable approach. For example, the head-mounted display system can detect when the user has selected an option to view external image based content (e.g., the user may have selected a control, issued a voice command, or made a head movement)

As another example, the head-mounted display system can enable the external viewing mode based on an indication received from the user's surroundings. For example, sensors on the head-mounted device or the portable electronic device may detect objects or sound around the user and direct the head-mounted display system to enable the external viewing mode. For instance, in response to a proximity sensor detecting an object in front of the user, the head-mounted display system can automatically activate the external viewing mode. As another example, in response to an ambient sound detector detecting sound around the user, the head-mounted display system can automatically activate the external viewing mode. To prevent the head-mounted display system from unnecessarily switching to the external viewing mode whenever sound is detected, the activation may only occur when sound is detected above a certain threshold (e.g., 10 dB).

In some embodiments, the ambient sound detector can work together with a voice recognition module. For example, the external viewing mode may activate if words signaling a possible emergency are detected. As another example, the external viewing mode may activate if the voice of a particular person is detected (e.g., voice of a person on the user's contact list). Persons skilled in the art will appreciate that either a processor on the head-mounted device or a processor on the portable electronic device can control the activation of the internal viewing mode and the external viewing mode.

In some embodiments, the head-mounted display system can make adjustments in response to detecting objects or sound. For example, visual cues (e.g., arrows) can be displayed that correspond to the direction of detected sound. After seeing the cues, the user may select an option to stop the head-mounted display system from switching to the external viewing mode.

In addition, the head-mounted display system may enable the external viewing mode at any suitable time. For example, the head-mounted display system can automatically switch to the external viewing mode after waiting for a period of time. As another example, the head-mounted display system can display a selectable external viewing option in response to detecting the appropriate cues. As yet another example, the head-mounted display system can enable the external viewing mode in response to a user instruction received at any other suitable time (e.g., in response to a user selecting an appropriate control on the head-mounted device or the portable electronic device).

In some embodiments, the head-mounted display system can allow the user to hear sounds from the outside world without activating the external viewing mode. For example, a microphone on the exterior of the head-mounted device or the portable electronic device can provide audio through the earphones (e.g., earphones 316 of FIG. 3A) of the head-mounted device. In some embodiments, the head-mounted display system can lower the volume of the image based content that is playing so that the user can hear external sounds. For example, while the user is traveling on an airplane, the ambient sound detector may detect that a flight attendant is asking the user a question. In response to detecting the flight attendant's voice, the head-mounted display system can lower the volume of the stored image based content that is playing so that the user can hear the flight attendant's question. Alternatively, in response to detecting sound, the head-mounted display system can mute the stored image based content, and provide close captioning of the stored image based content on the display screen. As a result, the user can see what is being said in the stored image based content even if the sound is not audible. As another alternative, the head-mounted display system can automatically pause or stop the stored image based content that is currently playing so that the user can hear external sounds. Options can then be provided to either resume playing the stored image based content or activate the external viewing mode.

Figure 12A:
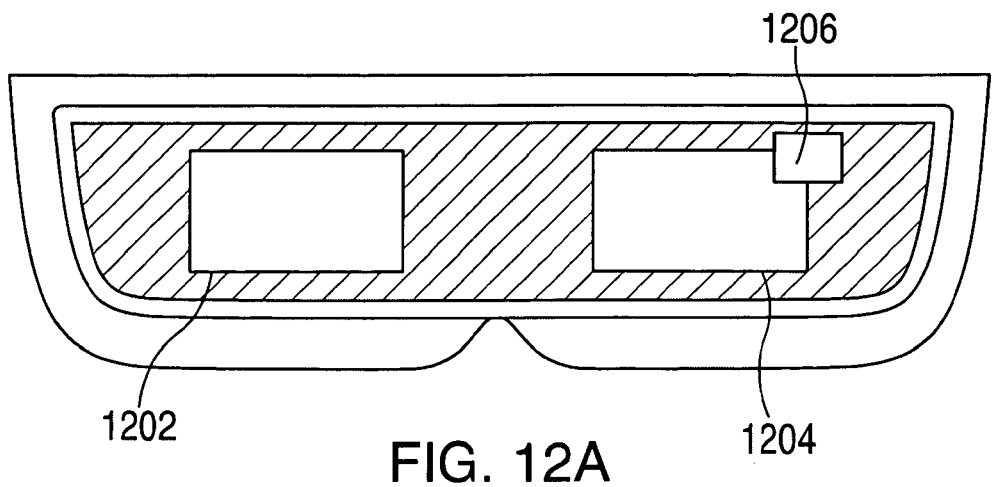
FIGS. 12A-12C show some exemplary display configurations for a head-mounted display system when displaying external and stored image based content in accordance with embodiments of the invention.
Figure 12B:
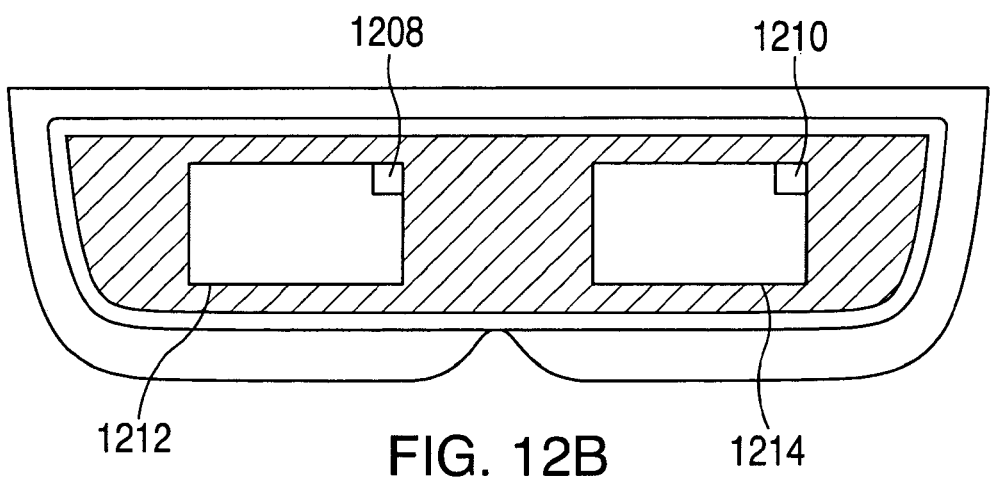
Figure 12C:
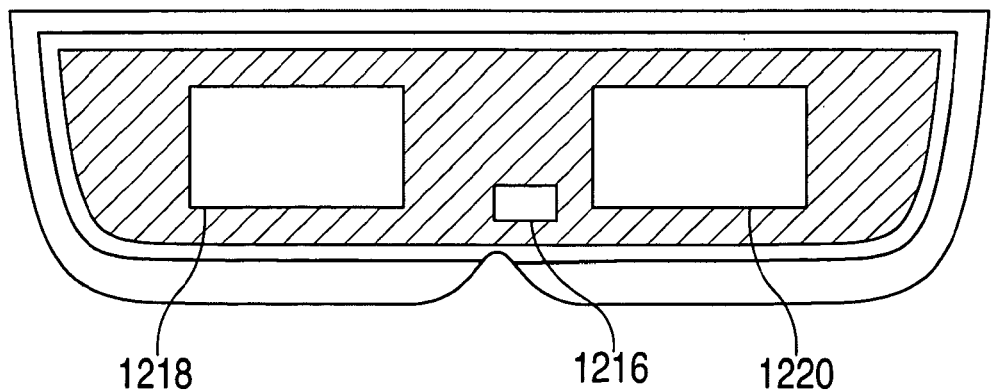

In some embodiments, the head-mounted display system can operate in a picture-in-picture ("PIP") mode, which allows the user to see both external and stored image based content. For example, as shown in FIGS. 12A-12C, the head-mounted display system can display a PIP image frame in addition to the main image frame(s). The PIP image frame may be spaced apart and utilize a different portion of the screen than the main image frame(s) or it may be partially overlaid on top of the main image frame. Furthermore, the PIP image frame(s) may be smaller than the main viewing image frames.

Persons skilled in the art will appreciate that the PIP image frame(s) can vary in size (e.g. 'PIP image 1206 of FIG. 12A can vary from 800×600 pixels to 200×150 pixels). The user may adjust the size of the PIP image frame(s) by selecting an option (e.g. 'using controls 318 or remote control 322 of FIG. 3A).

As shown in FIG. 12A, a single PIP image frame 1206 may be placed in the top right hand corner of the display screen. It may be overlaid over a corner of main image frame 1204 (as shown).

As shown in FIG. 12B, the head-mounted display system can also place a portion of the PIP image frame in each of the main image frames (e.g., PIP image frames 1208 and PIP image frames 1210). PIP image frames 1208 and 1210 can display images in a manner that allows the PIP image frames to be viewed comfortably by the user. For example, PIP image frames 1208 and 1210 can be placed in identical locations in left image frame 1212 and right image frame 1214. As another example, PIP image frames 1208 and 1210 can be offset from each other to adjust for differences in the visual field of each eye.

As shown in FIG. 12C, the head-mounted display system can display a PIP image frame 1216 that is separate from main image frames 1218 and 1220. That is, the PIP image frame 1216 is spatially apart and in a different portion of the display screen.

Because main image frames shown in FIGS. 12A-12C can display stored image based content and the PIP image frame can display image based content from a camera, the user may continuously see activities occurring in the outside world while watching stored image based content on the head-mounted display system. It will be understood that image based content displayed in the main image frame(s) and the image based content displayed in the PIP image frame(s) can be switched. Thus, main image frame(s) can display image based content from the camera and the PIP image frame(s) can display stored image based content playing on the head-mounted device. The head-mounted display system can provide options for the user to switch between these two PIP modes.

In some embodiments, when the head-mounted display system is operating in the PIP mode, the user may select an option to cause the head-mounted display system to operate in the external viewing mode. For example, if the PIP image frame is not providing a good resolution, the user may want to enlarge the PIP image frame to full screen. In response to the user selecting an option to enlarge the PIP image frame, the head-mounted display system can display the image based content from the detecting mechanism in the left and right image frames. The head-mounted display system can then remove the PIP image frame.

The PIP mode can be activated (e.g., PIP image frame(s) placed on the display screen) in various ways. For example, the PIP mode can be activated in response to a user input. Suitable user inputs can include, for example, selecting an option using controls 318 or remote control 322, issuing a voice command, or making a head movement. This allows the head-mounted display system to seamlessly switch from the internal viewing mode or the external viewing mode to the PIP mode. As another example, the PIP mode can be activated when sensors on the head-mounted display system detect sound or objects around the user (e.g., instead of activating the external viewing mode discussed above). Thus, while the head-mounted display system is operating in the PIP mode, the system can display what is occurring in the outside world without interrupting the image based content that is currently playing.

Finally, the PIP mode can be deactivated (e.g., PIP image(s) removed) in response to a user selection or if no user selection is received after a certain period of time.

Figure 13:
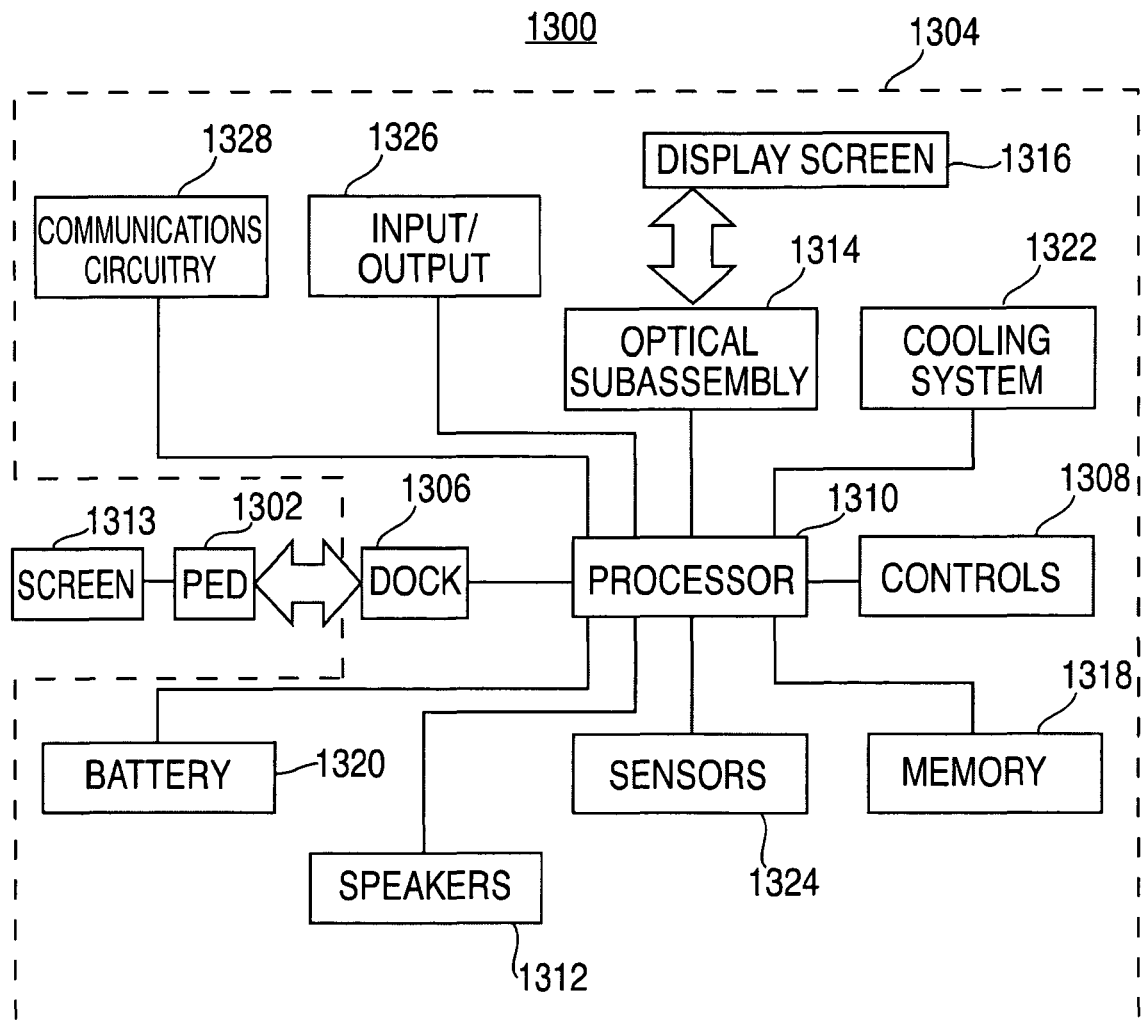
FIG. 13 shows a simplified block diagram of an illustrative head-mounted display system in accordance with embodiments of the invention.

FIG. 13 shows a simplified block diagram of an illustrative head-mounted display system 1300 in accordance with one embodiment of the invention. Head-mounted display system 1300 may include a head-mounted device 1304 that connects to a portable electronic device 1302. The system may, for example, correspond to the systems shown in FIGS. 1-12C.

For the sake of brevity, portable electronic device 1302 will not be described in detail in FIG. 13. It should be appreciated, however, that portable electronic device 1302 may be embodied in a variety of forms including a variety of features, all or some of which can be utilized by head mounted display system 1300 (e.g., input/output, controls, processing, battery, etc.). In most cases, portable electronic device 1302 follows a handheld form factor (e.g., small portable electronic device which is light weight, fits in a pocket, etc.). Although not limited to these, examples include media players, phones (including smart phones), PDAs, computers, and the like. Portable electronic device 1302 may include screen 1303 for presenting the graphical portion of the media to the user. Screen 1303 can be utilized as the primary screen of head-mounted display system 1300.

Referring to head-mounted device 1304, the device can be arranged to be worn on the head of a user. Head-mounted device 1304 may, for example, correspond to glasses, head gear, goggles and/or the like. Head-mounted device 1304 may be configured to receive and carry portable electronic device 1302 when they are operatively coupled together. Thus, head-mounted display system 1300 (including portable electronic device 1302) can be supported on a user's head. Head-mounted device 1304 and/or portable electronic device 1302 may be configured to be small and light weight for this reason.

Head-mounted device 1304 can include dock 1306 operative to receive portable electronic device 1302. In some embodiments, dock 1306 can include a connector (e.g., 30 pin, USB, firewire, power, DVI, etc.), which can be plugged into a complementary connector of portable electronic device 1302. Dock 1306 may include features for helping to align the connectors during engagement and for physically coupling portable electronic device 1302 to head-mounted device 1304. For example, dock 1306 may define a cavity for placement of portable electronic device 1302. Dock 1306 may also include retaining features for securing portable electronic device 1302 within the cavity.

The connector on dock 1306 can function as the communication interface between portable electronic device 1302 and head-mounted device 1304. Thus, once portable electronic device 1302 is physically coupled to head-mounted device 1304, head-mounted device 1304 and portable electronic device can cooperate to form head-mounted display system 1300. By way of example, they can share features and functions with one another. Their relationship with one another can be master/slave, server/client, peer to peer, and the like depending on the desired needs of the system. In one example, head-mounted device 1304 is the controlling device of the system. In another example, portable electronic device 1302 is the controlling device of the system. In yet another example, the controlling device depends on the feature/function being used. In other examples, the devices can work together to control various combined aspects of the system (e.g., peer to peer relationship).

As discussed previously, head-mounted device 1304 can provide additional functionality to portable electronic device 1302. The number of additional features provided by head-mounted device 1304 may be widely varied. In one example, head-mounted device 1304 can include a variety of controls (e.g., controls 1308) that control the system and provide functions to the system as well as access to functions on portable electronic device 1302. Controls 1308 can be in the form of buttons, switches, dials, and touch or near touch sensing devices (e.g., touch sensors).

In some embodiments, controls 1308 can include a voice recognition module, which can detect and process voice commands that can be used to control the portable electronic device. For example, portable electronic device 1302 can use a microphone (e.g., microphone 1016 or microphone 1020 of FIG. 10B) to convert sound into electrical signals. The voice recognition module can then process the electrical signals and identify the signals as commands for head-mounted display system 1300. For example, in response to receiving a voice command to call a contact on a user's contact list, portable electronic device 1302 can automatically dial the contact's phone number. As another example, in response to receiving a voice command to stop playing image based content, portable electronic device 1302 can stop the image based content that is currently playing.

In addition, the voice recognition module can be operative to recognize the voices of multiple people (e.g., family and friends in the user's contact list). For example, the voice recognition module can be trained by using voice samples from each person. The training can improve or expand as head-mounted display system 1300 collects more voice samples over time. Persons skilled in the art will appreciate that any suitable technology can be used to train the voice recognition module, such as hidden Markov models, neural networks, pattern matching algorithms, decision trees, or any combination thereof.

Head-mounted device 1304 may include processor 1310. Processor 1310 can be connected to any component in the system, for example, via a bus, and can be configured to perform any suitable function, such as audio and video processing. For example, processor 1310 can acoustically enhance image based content by configuring speakers 1312 (e.g., haptics) to produce vibrations and other sound effects corresponding to audio events in the image based content. As another example, processor 1310 can convert (and encode/decode, if necessary) data, analog signals, and other signals (e.g., physical contact inputs, physical movements, analog audio signals, etc.) into digital data, and vice-versa.

In some embodiments, processor 1310 can receive user inputs from controls 1308 and execute operations in response to the inputs. For example, processor 1310 can be configured to receive sound from the microphone. In response to receiving the sound, processor 1310 can run the voice recognition module to identify voice commands.

Head-mounted device 1304 can include an optical sub-assembly 1314 configured to help optically adjust and correctly project the image based content being displayed by screen 1303 for close up viewing (as discussed in FIGS. 6A-6B).

Head-mounted device 1304 may include memory 1318. Memory 1318 can be one or more storage mediums, including for example, a hard-drive, cache, flash memory, permanent memory such as read only memory ("ROM"), semi-permanent memory such as random access memory ("RAM"), any other suitable type of storage component, or any combination thereof. In some embodiments, memory 1318 can provide additional storage for image based content that can be played back (e.g., audio, video, and games). For example, when a user couples portable electronic device 1302 into head-mounted device 1304, the user can select to play a movie stored on head-mounted device 1304. In response to the user selecting to play a movie, the movie can be loaded or streamed to portable electronic device 1302, which can play back the movie for the user. In some embodiments, the movie can be copied into memory on portable electronic device 1302. As a result, the user may watch the movie later even after portable electronic device 1302 has been uncoupled from head-mounted device 1304. In some embodiments, the movie can be removed from portable electronic device 1302 as soon as the user selects to stop playing the movie, which can free memory on portable electronic device 1302.

Head-mounted device 1304 can include battery 1320, which can charge and/or power portable electronic device 1302 when portable electronic device 1302 is coupled to head-mounted device 1304. As a result, the battery life of portable electronic device 1302 can be extended.

Head-mounted device 1304 can include cooling system 1322, which can include any suitable component for cooling down portable electronic device 202. Suitable components can include, for example, fans, pipes for transferring heat, vents, apertures, holes, any other component suitable for distributing and diffusing heat, or any combination thereof. Cooling system 1322 may also or instead be manufactured from materials selected for heat dissipation properties. For example, the frame or housing of head-mounted device 1304 may be configured to distribute heat away from portable electronic device 1302 and/or the user.

Head-mounted device 1304 can include one or more sensors 1324 to detect various signals. Suitable sensors can include, for example, ambient sound detectors, proximity sensors, accelerometers, light detectors, cameras, and temperature sensors. An ambient sound detector can aid the user with hearing a particular sound. For example, when the user is watching image based content on head-mounted device 1304, head-mounted device 1304 can automatically adjust the volume of the image based content based on the ambient noise detected by the ambient sound detector. If the volume of the ambient noise is greater than a certain threshold (e.g., 10 dB), head-mounted device 1304 can increase the volume of the image based content. Similarly, if the volume of the ambient noise is below a certain threshold, head-mounted device 1304 can lower the volume of the image based content. By lowering the volume, head-mounted device 1304 can prevent the sound of the image based content from bothering other people sitting near the user. As another example, if the user selects to listen to outside sounds (e.g., by selecting an option on portable electronic device 1302 or head-mounted device 1304), head-mounted device 1304 can lower the volume of the image based content. In some embodiments, the ambient sound detector can detect the direction of voices or other sounds that are near the user.

Since the ambient sound detector may detect many sounds that may simply be random noise, the detector may not transmit the sound to head-mounted device 1304 unless one or more conditions are satisfied. For example, the ambient sound detector can determine to transmit the sound if the volume of the sound is greater than a certain threshold. As another example, the ambient sound detector can work in conjunction with the voice recognition module to transmit the sound when certain words are detected (e.g., words signaling a possible emergency or words corresponding to the user's name). To identify the detected words, the ambient sound detector can attempt to match the words to a stored library of words. In addition, the ambient sound detector can attempt to identify phrases by matching the words to a stored library of phrases. Finally, as yet another example, the sound may be transmitted if the voice matches a stored voiceprint. For example, the voice may match a stored voiceprint that is associated with a person in the user's contact list.

A proximity sensor can detect one or more objects that are around the user (e.g., within a predetermined distance from the user). For example, if the user is wearing head-mounted device 1304 while on an airplane, the proximity sensor can detect when a flight attendant approaches the user.

Accelerometers on head-mounted device 1304 can detect the user's head movements. For example, the user may use certain head movements to control head-mounted display system 1300. In response to receiving a head movement corresponding to a command (e.g., the user tilting his head to the right for a certain period of time), head-mounted device 1304 can execute the associated operation. In some embodiments, head-mounted device 1304 can provide options allowing the user to associate a particular head movement with a command for controlling an operation of head-mounted display system 1300 (e.g., a playback command or a volume command). For example, a head tilt to the right can be associated with a command to stop playback of the image based content.

In some embodiments, because the user may inadvertently make small head movements, head-mounted device 1304 can be operative to ignore small head movements and only respond to larger head movements. A more detailed discussion on controlling a head-mounted device using head movements can be found, for example, in Tang, U.S. patent application Ser. No. 12/072,763, filed on Feb. 27, 2008, entitled "Automatically Adjusting Media Display in a Personal Display System," which is incorporated by reference in its entirety.

Sensors 1324 can include a camera which can capture image based content of the outside world. The camera on head-mounted device 1304 can be similar to the camera on the portable electronic device. In some embodiments, the camera on head-mounted device 1304 may include a bigger lens and provide better resolution than the camera on the portable electronic device (e.g., because more space is available on head-mounted device 1304).

Head-mounted device 1304 can include input/output 1326, which can include any suitable component for connecting head-mounted device 1304 to other devices. Suitable components can include, for example, audio/video jacks, data connectors, or any additional or alternative input/output components.

Head-mounted device 1304 can include communications circuitry 1328 for communicating with one or more servers or other devices using any suitable communications protocol. For example, communications circuitry 1328 can support Wi-Fi (e.g., a 802.11 protocol), Ethernet, Bluetooth™ (which is a trademark owned by Bluetooth Sig, Inc.), high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 1328 can also include an antenna for transmitting and receiving electromagnetic signals.

Alternatively or in addition to a connector on dock 1306, the communication interface can also be supported by communications circuitry 1328, which can wirelessly connect portable electronic device 1302 and head-mounted device 1304. Thus, head-mounted device 1304 can communicate wirelessly with portable electronic device 1302. By way of example, mechanisms such as RF, Bluetooth™, 802.11 and the like can be used.

Communications circuitry 1328 can also use any appropriate communications protocol to communicate with a remote server. The remote server can be a database that stores various types of image based content. When head-mounted device 1304 is connected to the remote server, image based content (e.g., videos and songs) can be downloaded to portable electronic device 1302 or head-mounted device 1304 for playback. The image based content can be stored on portable electronic device 1302, head-mounted device 1304, or any combination thereof. In addition, the stored image based content can be removed once playback has ended.

It should be appreciated that the head-mounted device can include elements in addition to the described elements, such as microphones, secondary displays, and indicators. It should also be appreciated that any combination of the described elements may be provided in the head-mounted device. It should further be appreciated that, in order to prevent redundancies, these elements may alternatively be found in the portable electronic device and therefore may not be provided in the head-mounted device. It should also be appreciated that in some cases redundancies may work to enhance the system. For example, both devices may include cameras that can work together to gather information, or alternatively can work separately to gather and provide different feedback.

Figure 14:
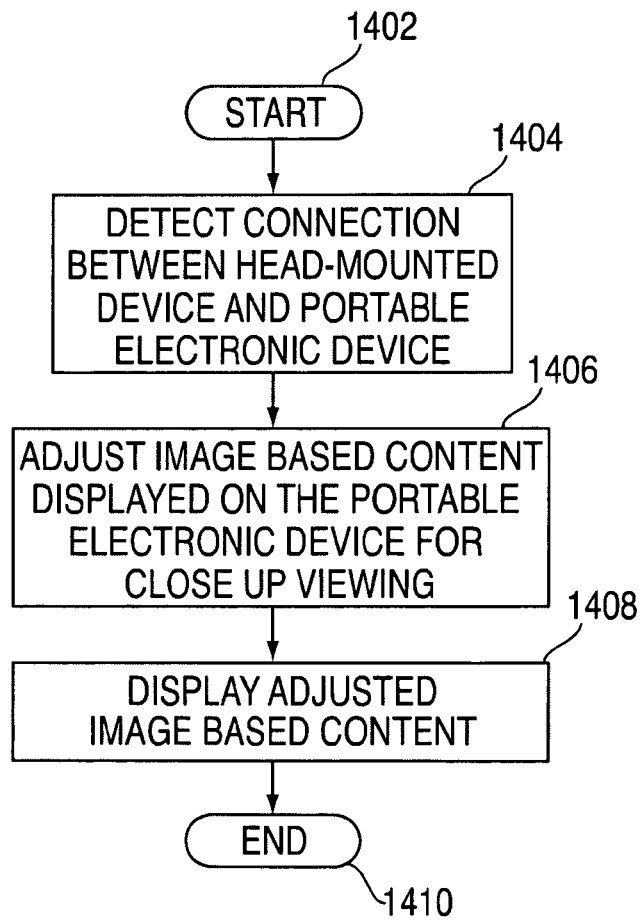
FIG. 14 shows a flowchart of an illustrative process for displaying image based content on a portable electronic device in accordance with embodiments of the invention.

FIG. 14 shows a flowchart of an illustrative process for displaying image based content on a portable electronic device in accordance with one embodiment of the invention. In the discussion below, the head-mounted display system includes a head-mounted device (e.g., head-mounted device 1304 of FIG. 13) and a portable electronic device (e.g., portable electronic device 1302 of FIG. 13) that is coupled to the head-mounted device.

Process 1400 starts at step 1402. At step 1404, the head-mounted display system can detect the connection between the head-mounted device and the portable electronic device. For example, the connection can either be wired (e.g., via a connector on dock 1306 of FIG. 13) or wireless (e.g., via communications circuitry 1328 of FIG. 13). After a connection has been detected, process 1400 moves to step 1406.

At step 1406, the head-mounted display system can adjust image based content displayed on the portable electronic device for close up viewing. Step 1406 will be described in more detail in connection with FIG. 15. After the image based content has been adjusted, process 1400 moves to step 1408.

At step 1408, the head-mounted display system can display the adjusted image based content to the user. For example, a display screen on the head-mounted device can project the adjusted image based content to the user. Process 1400 then ends at step 1410.

Figure 15:
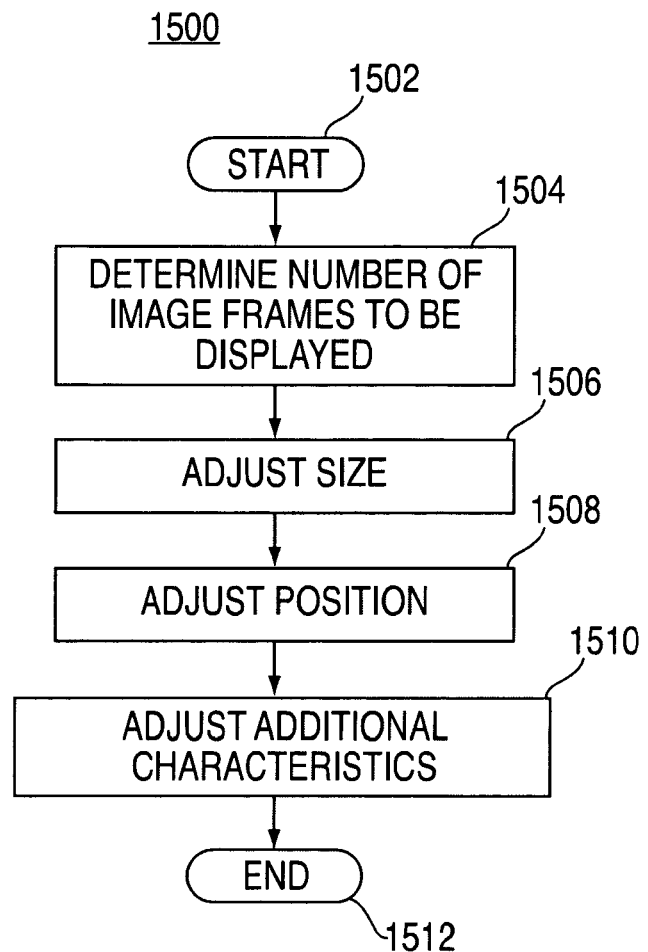
FIG. 15 shows a flowchart of an illustrative process for adjusting image based content displayed on a portable electronic device in accordance with embodiments of the invention.

FIG. 15 shows a flowchart of an illustrative process for adjusting image based content displayed on a portable electronic device in accordance with one embodiment of the invention. In some embodiments, process 1500 can be implemented in step 1406 of process 1400 (FIG. 14). Although steps 1502 to 1510 are shown in a certain order in FIG. 15, the steps may be implemented in any order.

Process 1500 starts at step 1502. At step 1504, the head-mounted display system can determine the number of image frames to be displayed. For example, if multiple image frames are to be displayed, the head-mounted display system can break a single image frame into multiple image frames (see FIG. 11B). Multiple image frames may, for example, be used to implement stereo-like viewing. After properly configuring the number of image frames to be displayed on the portable electronic device, process 1500 moves to step 1506.

At step 1506, the head-mounted display system can adjust the size of the one or more image frames. For example, because the screen of the portable electronic device may be placed fairly close to the user's eyes, the image based content may be adjusted to be less than the size of the screen (see FIG. 11A). After adjusting the size of the one or more image frames, process 1500 moves to step 1508.

At step 1508, the head-mounted display system can adjust the position of the one or more image frames. For example, in order to align the images with the user's eyes, the image frames may be adjusted either together or relative to one another (see FIGS. 11C and 11D). After adjusting the position of the image frames, process 1500 moves to step 1510.

At step 1510, the head-mounted display system can adjust additional characteristics of the image frames. For example, the head-mounted display system can adjust the resolution of the image based content. For instance, the resolution may be increased to compensate for how close the eyes are to the display screen. After the additional characteristics of the images have been adjusted, process 1500 ends at step 1512.

Figure 16:
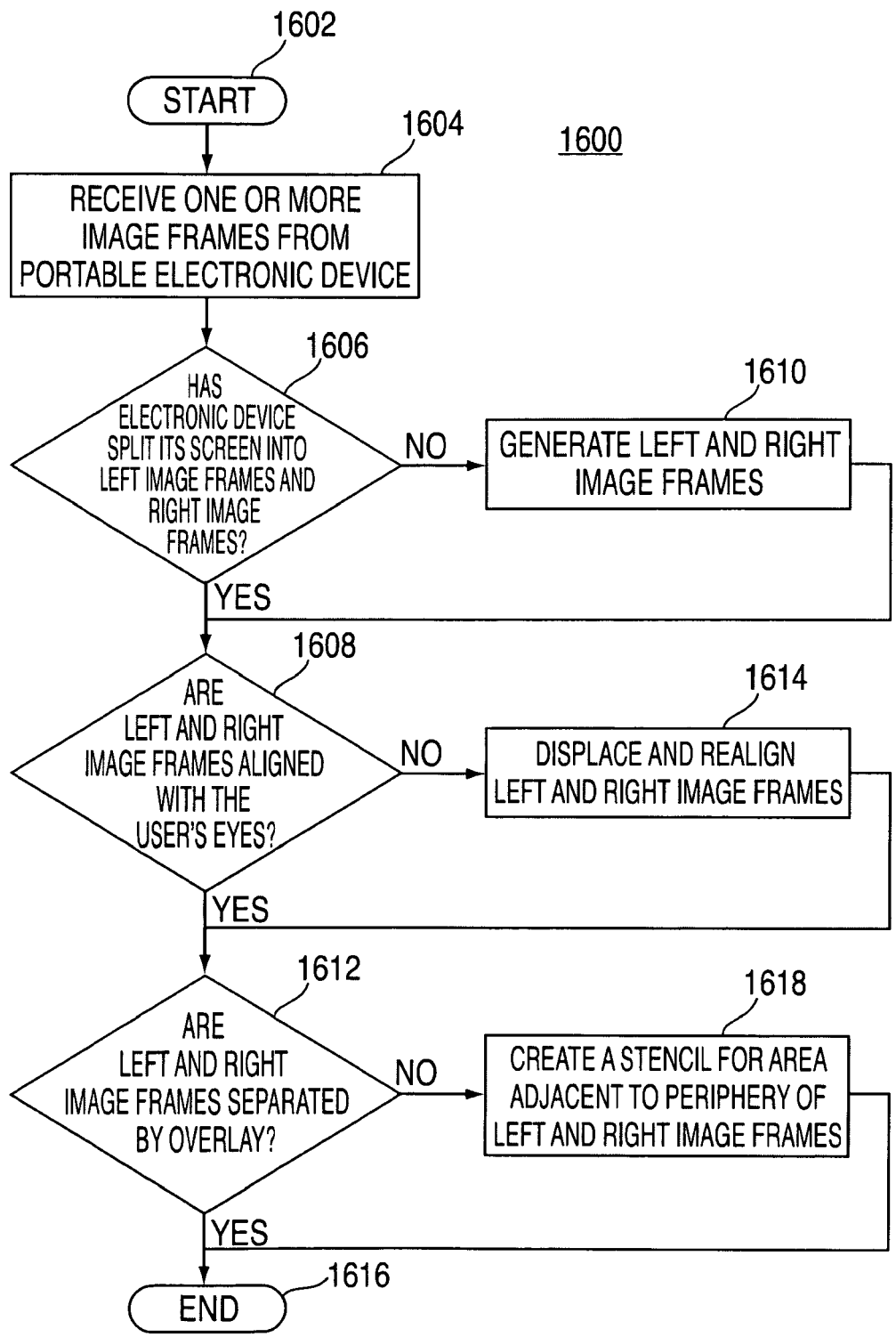
FIG. 16 shows a flowchart of an illustrative process for displaying image based content on a head-mounted device in accordance with embodiments of the invention.

FIG. 16 shows a flowchart of an illustrative process for displaying image based content on a head-mounted device in accordance with one embodiment of the invention. Process 1600 starts at step 1602.

At step 1604, the head-mounted device can receive one or more image frames from the portable electronic device. At step 1606, the head-mounted device can determine whether the portable electronic device has split its screen into a left image frame and a right image frame. If, at step 1606, the head-mounted device determines that the portable electronic device has split its screen into a left image frame and a right image frame, process 1600 moves to step 1608.

If, at step 1606, the head-mounted device instead determines that the portable electronic device has not split its screen into a left image frame and a right image frame, process 1600 moves to step 1610. At step 1610, the head-mounted device can generate left and right image frames from a single image frame received from the portable electronic device. For example, an optical subassembly on the head-mounted device (e.g., optical subassembly 1314 of FIG. 13) can include two optical interfaces. Each optical interface can generate and display an image frame (left image frame or right image frame) associated with the received image frame. After generating the left image frame and the right image frame, process 1600 moves to step 1608.

At step 1608, the head-mounted device can determine whether the left and right image frames are aligned with the user's eyes. For example, the head-mounted device can detect the interpupillary distance between the user's eyes and determine if the separation between the left and right image frames is appropriate. If, at step 1608, the head-mounted device determines that the left and right image frames are aligned with the user's eyes, process 1600 moves to step 1612.

If, at step 1608, the head-mounted device instead determines that the left and right image frames are not aligned with the user's eyes, process 1600 moves to step 1614. At step 1614, the head-mounted device can displace and align the left and right image frames with the user's eyes. For example, the head-mounted device can use the optical subassembly to align the two image frames. As another example, the head-mounted device can direct the portable electronic device to affect the left and right image frames to align with the user's eyes. After aligning the image frames, process 1600 moves to step 1612.

At step 1612, the head-mounted device can determine whether the left and right image frames are separated by an overlay. For example, the portable electronic device may have superimposed a black overlay over an area adjacent to the periphery of the left and right image frames. If, at step 1612, the head-mounted device determines that the left and right image frames are separated by an overlay, process 1600 ends at step 1616.

If, at step 1612, the head-mounted device instead determines that the left and right image frames are not separated by an overlay, process 1600 moves to step 1618. At step 1618, the head-mounted device can include a black stencil defining image frames on the display screen of the head-mounted device for the left image frame and the right image frame. Process 1600 then ends at step 1616.

Figure 17A:
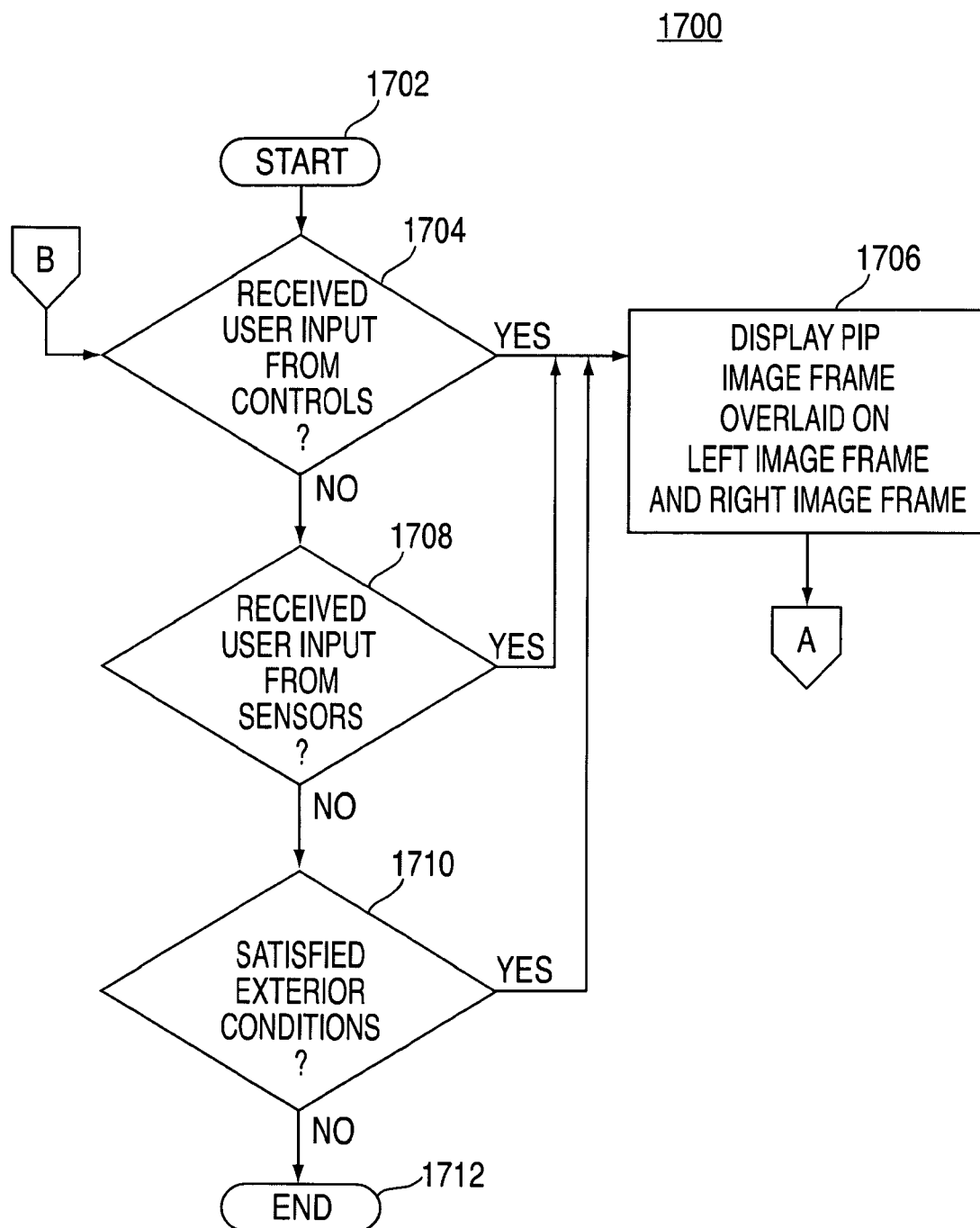
FIGS. 17A and 17B show flowcharts of an illustrative process for displaying external image based content in accordance with embodiments of the invention.
Figure 17B:
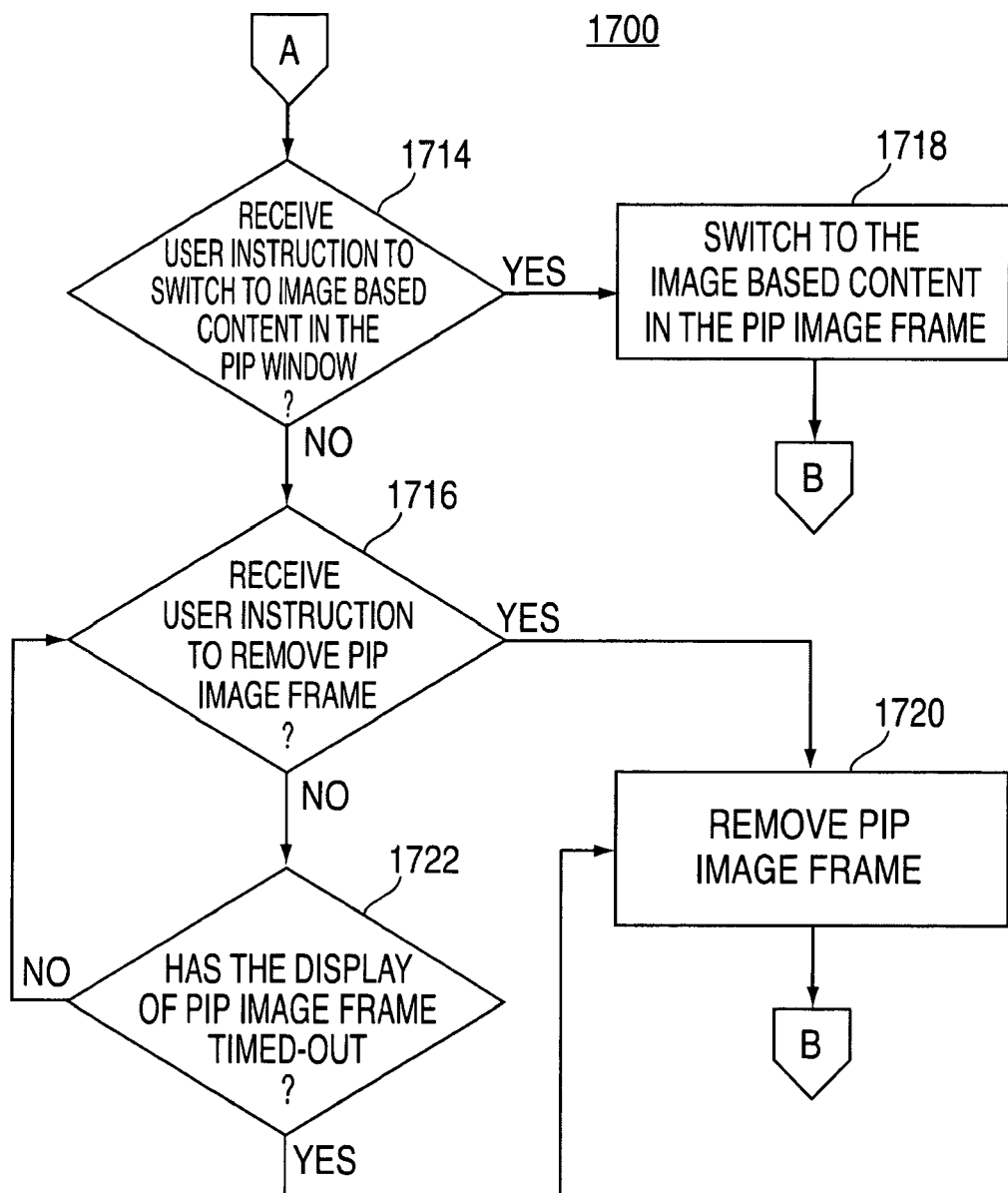

FIGS. 17A and 17B show flowcharts of an illustrative process for displaying external image based content in accordance with one embodiment of the invention. Process 1700 starts at step 1702.

At step 1704, the head-mounted display system can determine whether a user input has been received from controls to display the user's surroundings. For example, the user may have selected controls 318 (FIG. 3A) or remote control 322 (FIG. 3A). As another example, the controls can include a voice recognition module which can be operative to identify if the user has issued a voice command. If, at step 1704, the head-mounted display system determines that a user input has been received from the controls, process 1700 moves to step 1706.

If, at step 1704, the head-mounted display system instead determines that a user input has not been received from the controls, process 1700 moves to step 1708. At step 1708, the head-mounted display system can determine whether a user input has been detected from sensors. For example, accelerometers on the head-mounted display system can detect if the user has made any head movements. Based on the detection of a particular head movement, the head-mounted display system can determine if the head movement is an indication that the user would like to view image based content from the outside world. If, at step 1708, the head-mounted display system determines that a user input has been received from the sensors, process 1700 moves to step 1706.

If, at step 1708, the head-mounted display system instead determines that a user input has not been received from the sensors, process 1700 moves to step 1710.

At step 1710, the head-mounted display system can determine whether an exterior condition has been satisfied for displaying the user's surroundings. For example, proximity sensors on the head-mounted display system may detect one or more objects around the user (e.g., detect the objects within a predetermined distance from the user). As another example, an ambient sound detector may detect sound that is above a certain threshold. As yet another example, the ambient sound detector may work together with the voice recognition module to detect certain words or the voice of a particular person. If, at step 1710, the head-mounted display system determines that an exterior condition has not been satisfied to display image based content of the user's surroundings, process 1700 ends at step 1712.

If, at step 1710, the head-mounted display system instead determines that an exterior condition has been satisfied to display image based content of the user's surroundings, process 1700 moves to step 1706.

At step 1706, a PIP image frame overlaid on at least one of displayed left and right image frames (e.g., PIP mode) can be displayed. For example, the left and right image frames can correspond to stored image based content playing on the portable electronic device, and the PIP image frame (e.g., PIP image frame 1206 or PIP image frames 1208 and 1210 of FIGS. 12A and 12B) can correspond to external image based content received from the user's surroundings. The external image based content can, for example, be captured by a detecting mechanism on the portable electronic device or the head-mounted display system.

In some embodiments, if one or more exterior conditions has been satisfied (e.g., sound has been detected), the head-mounted display system can perform other functions in addition to displaying the PIP image frame. For example, ambient sound sensors on the head-mounted display system can detect that the external sounds are coming from a certain direction. In response to detecting the direction, the head-mounted display system can display arrows corresponding to the direction of the sound. As another example, the volume of the stored image based content can be lowered so that the user can hear external sounds, and a microphone on the exterior of the head-mounted display system can provide audio through the earphones of the head-mounted display system. To ensure that the user does not miss any of the image based content being played back, close captioning corresponding to the stored image based content can be displayed. Alternatively, the stored image based content that is currently playing can be stopped or paused so that the user can hear the external sounds. Process 1700 then moves to step 1714.

At step 1714, the head-mounted display system can determine whether a user instruction to switch to the image based content in the PIP image frame was received. For example, the user may select a control, issue a voice command, or make a head movement. If, at step 1714, the head-mounted display system determines that a user instruction to switch to the image based content in the PIP image frame has not been received, process 1700 moves to step 1716.

If, at step 1714, the head-mounted display system instead determines that a user instruction to switch to the image based content in the PIP image frame has been received, process 1700 moves to step 1718. At step 1718, the head-mounted display system can switch to the image based content in the PIP image frame (e.g., external viewing mode) and remove the PIP image frame. In some embodiments, the head-mounted display system can switch to the image based content in the PIP image frame automatically without waiting for a user selection. For example, after displaying arrows corresponding to the direction of external sounds, the head-mounted display system can immediately switch to the external viewing mode. After switching the image based content, process 1700 moves back to step 1704. At step 1704, the head-mounted display system can determine whether to display the PIP image frame again based on one or more inputs.

At step 1716, the head-mounted display system can determine whether a user instruction to remove the PIP image frame has been received. If, at step 1716, the head-mounted display system determines that a user instruction to remove the PIP image frame has been received, process 1700 moves to step 1720.

If, at step 1716, the head-mounted display system instead determines that a user instruction to remove the PIP image frame has not been received, process 1700 moves to step 1722.

At step 1722, the head-mounted display system can determine if the display of the PIP image frame has timed-out. For example, the head-mounted display system can set a time period to wait for a user instruction to remove the PIP image frame. If, at step 1722, the head-mounted display system determines that the display of the PIP image frame has not timed-out, process 1700 moves back to step 1716.

If, at step 1722, the head-mounted display system instead determines that the display of the PIP image frame has timed-out, process 1700 moves to step 1720. At step 1720, the PIP image frame can be removed, and the head-mounted display system can return to the internal viewing mode. After removing the PIP image frame, process 1700 moves back to step 1704. At step 1704, the head-mounted display system can determine whether to display the PIP image frame again based on one or more inputs. For example, the user may have been preoccupied with watching the stored image based content, and, as a result, was not able to switch to the image based content in the PIP image frame before the image frame was removed. Now, however, the user may want to view the external image based content. As a result, the user may go back and forth between having the PIP image frame displayed and/or removed.

Figures 18, 19:
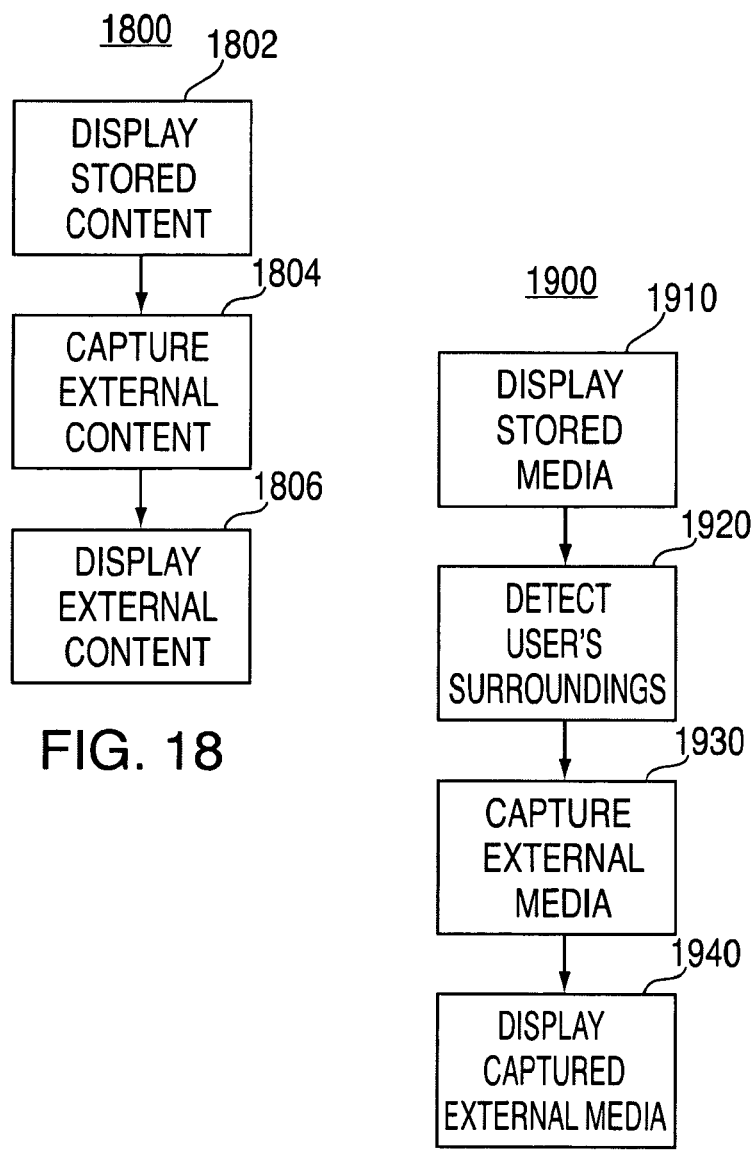
FIG. 18 shows a process for displaying images in a head-mounted display apparatus to a user in accordance with embodiments of the invention.
FIG. 19 shows a process for displaying images in a head-mounted display apparatus to a user in accordance with embodiments of the invention.

FIG. 18 illustrates a process 1800 for displaying images in a head-mounted display apparatus to a user. The method may for example be accomplished via communications between a processor, memory and a display screen of the head mounted display apparatus. In one embodiment, the head mounted display apparatus is a single device that includes its own display. In another embodiment, the head mounted display apparatus may include multiple discrete devices that cooperate together to form a single unit. For example, the head mounted display apparatus may include a portable electronic device such as media player or phone and a head-mounted device that carries the portable electronic device.

Process 1800 starts at step 1802 where stored content such as media content is displayed. For example, stored content can include movies, TV shows, music videos, or software such as applications or operating systems.

After displaying stored image based content, process 1800 moves to step 1804. At step 1804, external content from the user's surroundings can be captured. External content may, for example, include visual or sound content. The external content may be captured using a variety of devices including a camera and/or a microphone.

After capturing external content, process 1800 moves to step 1806. At step 1806, the external content is displayed. For example, visual data captured by a camera may be displayed. In addition, sound data may also be displayed. For example, speech may be converted to displayed text. Alternatively or additionally, visual indicators associated with the sound data may be displayed.

In one embodiment, the external content and the stored content are simultaneously displayed. In one example, the stored content is displayed in a primary image frame while the external content is displayed in a secondary image frame. The secondary image frame may for example be a picture in picture ("PIP") image frame. In another example, the external content is displayed in a primary image frame while the stored content is displayed in a secondary image frame. In another embodiment, the external content interrupts the display of the stored content. For example, the external content may replace the stored content (e.g., the playing of the stored content may be paused while the external content is being captured and displayed).

Various enhancements may be applied to the present invention to further improve the head-mounted device. For example, the invention may provide methods and apparatus for providing a wider field of view and creating a more natural viewing situation for a user of a head-mounted display. This may result in improved comfort and usability for head mounted displays as described in U.S. Published Patent Application No. 2008/0088529, entitled "ENHANCED IMAGE DISPLAY IN HEAD-MOUNTED DISPLAYS", published Apr. 17, 2008, which is incorporated by reference herein in its entirety.

The invention may also provide methods and apparatus for treating the peripheral area of a user's field of view in a head-mounted display. This helps to create improved comfort and usability for head-mounted displays as described in U.S. Published Patent Application No. 2008/0088936, entitled "PERIPHERAL TREATMENT FOR HEAD-MOUNTED DISPLAYS", published on Apr. 17, 2008, which is incorporated by reference herein in its entirety.

FIG. 19 illustrates a process 1900 for displaying images in a head-mounted display apparatus to a user. The process 1900 includes block 1910 where stored media is displayed. The process also includes block 1920 where the user's surroundings are detected and at least one exterior condition is satisfied. The process also includes block 1930 where external media from the user's surroundings is captured in response to detecting the user's surroundings. The process further includes block 1940 where the captured external media is displayed.

In some embodiments, wherein detecting in block 1920 further comprises at least one of: detecting at least one object within a predetermined distance from the user; detecting at least one sound that exceeds a particular threshold; detecting at least voice matching a stored voiceprint (e.g., voiceprint associated with a person in user's contact list); detecting at least one word matching a particular word in a stored library of words (e.g., user's name); and detecting at least one phrase matching a particular phrase in a stored library of phrases.

In some embodiments, block 1910 further includes displaying left and right images corresponding to the stored media.

In some embodiments, displaying the captured external media of block 1940 comprises replacing the stored media with the captured external media. Replacing the stored media may include displaying left and right images corresponding to the captured external media.

In some embodiments, displaying the captured external media further includes displaying the captured external media in a PIP window.

FIG. 20 illustrates a process 2000 performed on a portable electronic device with a screen. The process includes in a first display mode 2010, presenting image based content according to a first format. The first format has a first resolution and configures the screen for normal viewing. The process also includes in a second display mode 2020, presenting image based content according to a second format. Wherein the second format has a second resolution and configures a portion of the screen for close up viewing. The process additionally includes block 2030 which comprises detecting that the portable electronic device is being used for normal viewing and switching to the first display mode. The process further includes block 2040 which comprises detecting that the portable electronic device is being used for close up viewing, and switching to the second display mode.

FIG. 21 is a method for displaying one or more image frames on a screen of a portable electronic device when the portable electronic device is connected to a head-mounted device. The method 2100 includes receiving an image frame (block 2110). The method also includes dividing the image frame into a left image frame and a right image frame (block 2120). The method further includes formatting the left and right image frames for close up viewing (block 2130). The method additionally includes directing the left image frame to the left portion of the screen and directing the right image frame to the right portion of the screen (block 2140).

In some embodiments dividing the image frame (block 2120) includes duplicating the image frame to form the left and right image frames.

In some embodiments, the sizes of the left and right image frames are made smaller than the size of the screen.

The invention may further provide other features of head-mounted devices as described in co-pending U.S. patent application Ser. No. 12/114,499, entitled "HEAD MOUNTED DISPLAY", filed on May 2, 2007, which is incorporated by reference herein in its entirety.

The invention is preferably implemented by hardware, software or a combination of hardware and software. The software can be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

Thus it is seen that systems and methods are provided for allowing users to couple a portable electronic device in the head-mounted device. It is also seen that systems and methods are provided for allowing users to see the outside world while wearing a head-mounted device. Persons skilled in the art will appreciate that the invention can be practiced by other than the described embodiments, which are presented for purposes of illustration and not of limitation, and the present invention is limited only by the claims which follow.

What is claimed is:

1. A head-mounted apparatus comprising:
a support structure;
a display supported by the support structure;
an optical subassembly through which the display is viewable; and
a processor configured to adjust the optical subassembly based on prescription information.

2. The head-mounted apparatus defined in claim 1, wherein the optical subassembly includes a first optical interface for a first eye and a second optical interface for a second eye, wherein the first optical interface includes a first coaxial arrangement of lenses, and wherein the second optical interface includes a second coaxial arrangement of lenses.

3. The head-mounted apparatus defined in claim 2, wherein the first optical interface includes a first dynamic optical component, wherein the second optical interface includes a second dynamic optical component, and wherein the processor is configured to adjust the first and second dynamic optical components based on the prescription information.

4. The head-mounted apparatus defined in claim 1, wherein the optical subassembly comprises at least one dynamic optical component and wherein the processor is configured to adjust the dynamic optical component based on the prescription information.

5. The head-mounted apparatus defined in claim 4, wherein the dynamic optical component comprises an optical component selected from the group consisting of: a lens, a light guide, a light source, a mirror, and a diffuser.

6. The head-mounted apparatus defined in claim 1, wherein the optical subassembly includes a first optical interface for a first eye and a second optical interface for a second eye, wherein the first optical interface includes a first coaxial arrangement of lenses, wherein the second optical interface includes a second coaxial arrangement of lenses, and wherein the processor is configured to adjust the first and second optical interfaces based on the prescription information.

7. The head-mounted apparatus defined in claim 1, wherein the optical subassembly is configured to analyze a viewer's eyes and wherein the processor is configured to adjust the optical subassembly based on the analysis.

8. The head-mounted apparatus defined in claim 1, wherein the prescription information comprises a glasses prescription.

9. The head-mounted apparatus defined in claim 1, wherein the prescription information comprises a contact lens prescription.

10. The head-mounted apparatus defined in claim 1, wherein the processor is configured to adjust the optical subassembly to correct for a user's eyesight based on the prescription information.

11. A head-mounted device that is operable with a removable cellular telephone with a display, the head-mounted device comprising:
a support structure that is configured to support the cellular telephone in a docking area; and
an optical subassembly through which the display of the cellular telephone is viewable when the cellular telephone is in the docking area, wherein the optical subassembly includes an adjustable optical component that is adjusted based on prescription information.

12. The head-mounted device defined in claim 11, wherein the adjustable optical component comprises an adjustable lens.

13. The head-mounted device defined in claim 11, wherein the adjustable optical component comprises an optical component selected from the group consisting of: a light guide, a light source, a mirror, and a diffuser.

14. The head-mounted device defined in claim 11, wherein the prescription information comprises a glasses prescription.

15. The head-mounted device defined in claim 11, wherein the prescription information comprises a contact lens prescription.

16. A system comprising:
a cellular telephone having a display; and
a head-mounted device having:
a support structure that is configured to support the cellular telephone in a docking area;
first and second adjustable lenses through which the display of the cellular telephone is viewable when the cellular telephone is in the docking area; and
a processor configured to adjust the first and second adjustable lenses based on prescription information.

17. The system defined in claim 16, wherein the first adjustable lens is part of a first coaxial arrangement of lenses and wherein the second adjustable lens is part of a second coaxial arrangement of lenses.

18. The system defined in claim 17, wherein the first and second coaxial arrangements of lenses are configured to modify images from the display to appear to be displayed at a greater distance from a user than the images are actually displayed.

19. The system defined in claim 16, wherein the prescription information comprises a glasses prescription.

20. The system defined in claim 16, wherein the prescription information comprises a contact lens prescription.

* * * * *